US012580668B2

(12) United States Patent
Ren et al.

(10) Patent No.: US 12,580,668 B2
(45) Date of Patent: Mar. 17, 2026

(54) CROSS LINK INTERFERENCE MEASUREMENT RESOURCE CONFIGURATION AND REPORTING WITH AN INTELLIGENT REFLECTIVE SURFACE FOR INTERFERENCE MITIGATION

(71) Applicant: QUALCOMM Incorporated, San Diego, CA (US)

(72) Inventors: Yuwei Ren, Beijing (CN); Huilin Xu, Temecula, CA (US); Qunfeng He, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 259 days.

(21) Appl. No.: 18/557,025

(22) PCT Filed: Jun. 28, 2021

(86) PCT No.: PCT/CN2021/102635
§ 371 (c)(1),
(2) Date: Oct. 24, 2023

(87) PCT Pub. No.: WO2023/272418
PCT Pub. Date: Jan. 5, 2023

(65) Prior Publication Data
US 2024/0223291 A1 Jul. 4, 2024

(51) Int. Cl.
*H04W 24/10* (2009.01)
*H04B 7/04* (2017.01)
*H04B 17/336* (2015.01)

(52) U.S. Cl.
CPC ....... *H04B 17/336* (2015.01); *H04B 7/04013* (2023.05); *H04W 24/10* (2013.01)

(58) Field of Classification Search
CPC .. H04B 17/336; H04B 7/04013; H04W 24/10
See application file for complete search history.

(56) References Cited

U.S. PATENT DOCUMENTS

| | | | |
|---|---|---|---|
| 2012/0243503 A1* | 9/2012 | Mochida | H04W 28/04 370/329 |
| 2016/0080063 A1* | 3/2016 | Sahara | H04B 7/0639 370/329 |
| 2021/0168619 A1* | 6/2021 | Park | H04W 72/0453 |

FOREIGN PATENT DOCUMENTS

| | | |
|---|---|---|
| WO | 2020143706 | 7/2020 |

OTHER PUBLICATIONS

International Search Report and Written Opinion—PCT/CN2021/102635—ISA/EPO—Dec. 23, 2021.

(Continued)

*Primary Examiner* — Phuc H Tran

(74) *Attorney, Agent, or Firm* — Paul M. McAdams; Loza & Loza, LLP

(57) ABSTRACT

A method of wireless communication at a user equipment (UE) is provided. The method includes receiving, from a scheduling entity, an indication of at least two different cross link interference (CLI) measurement resources of a message for transmission from a transmission source. The method also includes receiving, from an intelligent reflecting surface (IRS), a reflected transmission of the message originating from the transmission source, wherein the reflected transmission of the message is reflected by the IRS based on one or more IRS coefficients. The method further includes determining one or more CLI measurement parameters to generate a report. The method includes transmitting, to the scheduling entity, a CLI measurement report. The method also includes receiving, from the IRS, another reflected transmission of the message originating from the transmission source using one or more configured IRS coefficients that are configured based on the CLI measurement report.

30 Claims, 17 Drawing Sheets

(56) References Cited

OTHER PUBLICATIONS

Samith, A., et al., "Inintelligent Reflecting Surface: Practical Phase Shift Model and Beamforrning Optimization", ICC 2020—2020 IEEE International Conference on Communications (ICC), IEEE, Jun. 7, 2020 (Jun. 7, 2020), XP033797979, pp. 1-6, DOI: 10.1109/ ICC40277.2020.9148961 [retrieved on Jul. 24, 2020] the whole document.

* cited by examiner

Figure 15:
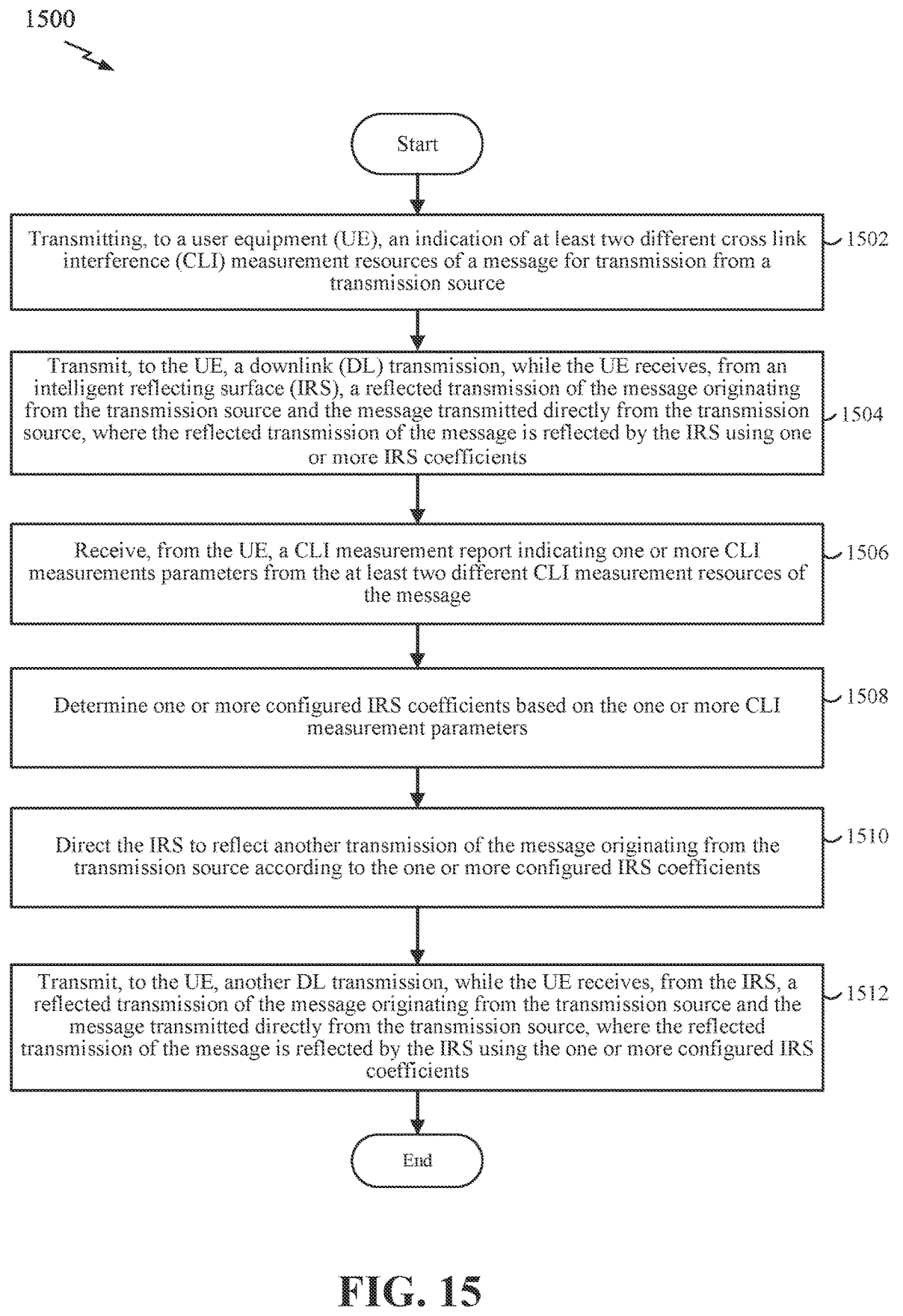

1500

```
              ┌─────────┐
              │  Start  │
              └─────────┘
                   │
                   ▼
┌──────────────────────────────────────────────────────────────┐
│ Transmitting, to a user equipment (UE), an indication of at   │ ── 1502
│ least two different cross link interference (CLI) measurement  │
│ resources of a message for transmission from a                 │
│ transmission source                                            │
└──────────────────────────────────────────────────────────────┘
                   │
                   ▼
┌──────────────────────────────────────────────────────────────┐
│ Transmit, to the UE, a downlink (DL) transmission, while the   │
│ UE receives, from an intelligent reflecting surface (IRS), a   │
│ reflected transmission of the message originating from the     │ ── 1504
│ transmission source and the message transmitted directly from  │
│ the transmission source, where the reflected transmission of   │
│ the message is reflected by the IRS using one or more IRS      │
│ coefficients                                                   │
└──────────────────────────────────────────────────────────────┘
                   │
                   ▼
┌──────────────────────────────────────────────────────────────┐
│ Receive, from the UE, a CLI measurement report indicating one  │ ── 1506
│ or more CLI measurements parameters from the at least two      │
│ different CLI measurement resources of the message             │
└──────────────────────────────────────────────────────────────┘
                   │
                   ▼
┌──────────────────────────────────────────────────────────────┐
│ Determine one or more configured IRS coefficients based on the │ ── 1508
│ one or more CLI measurement parameters                         │
└──────────────────────────────────────────────────────────────┘
                   │
                   ▼
┌──────────────────────────────────────────────────────────────┐
│ Direct the IRS to reflect another transmission of the message  │ ── 1510
│ originating from the transmission source according to the one  │
│ or more configured IRS coefficients                            │
└──────────────────────────────────────────────────────────────┘
                   │
                   ▼
┌──────────────────────────────────────────────────────────────┐
│ Transmit, to the UE, another DL transmission, while the UE     │
│ receives, from the IRS, a reflected transmission of the        │
│ message originating from the transmission source and the       │ ── 1512
│ message transmitted directly from the transmission source,     │
│ where the reflected transmission of the message is reflected   │
│ by the IRS using the one or more configured IRS coefficients   │
└──────────────────────────────────────────────────────────────┘
                   │
                   ▼
              ┌─────────┐
              │   End   │
              └─────────┘
```

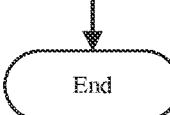

```
        ┌──────────────┐
        │    Start     │
        └──────┬───────┘
               │
               ▼
```

Receive, from a scheduling entity, an indication of at least two different cross link interference (CLI) measurement resources of a message for transmission from a transmission source          ⟋1702

Receive, from an intelligent reflecting surface (IRS), a reflected transmission of the message originating from the transmission source, while also receiving the message transmitted directly from the transmission source and a downlink (DL) transmission from the scheduling entity, where the reflected transmission of the message is reflected by the IRS using one or more IRS coefficients          ⟋1704

Determine one or more CLI measurement parameters using the at least two different CLI measurement resources of the message          ⟋1706

Transmit, to the scheduling entity, a CLI measurement report indicating the one or more CLI measurements parameters from the at least two different CLI measurement resources          ⟋1708

Receive, from the IRS, another reflected transmission of the message originating from the transmission source, while also receiving the message transmitted directly from the transmission source and the DL transmission from the scheduling entity, where the reflected transmission of the message is reflected by the IRS using one or more configured IRS coefficients that are configured based on the one or more CLI measurement parameters          ⟋1710

```
        ┌──────────────┐
        │     End      │
        └──────────────┘
```

CROSS LINK INTERFERENCE MEASUREMENT RESOURCE CONFIGURATION AND REPORTING WITH AN INTELLIGENT REFLECTIVE SURFACE FOR INTERFERENCE MITIGATION

CROSS-REFERENCE TO RELATED APPLICATION(S)

This application is the U.S. national stage of PCT patent application number PCT/CN2021/102635 filed on Jun. 28, 2021.

TECHNICAL FIELD

The technology discussed below relates generally to wireless communication systems, and more particularly, to cross link interference (CLI) measurement resource configuration and reporting with an intelligent reflective surface (IRS) for interference mitigation.

INTRODUCTION

In wireless communication between a base station and user equipment (UE), simultaneous transmission and reception may be accomplished using different frequencies resources for uplink and downlink transmissions. This may be called frequency division duplexing (FDD). Additionally, or alternatively, simultaneous transmission and reception between a base station and a UE may be accomplished using different time resources for uplink (UL) and downlink (DL) transmissions. This may be called time division duplexing (TDD). Generally, FDD networks may have separate UL and DL frequency bands while TDD networks may utilize the same bandwidth, but may also allocate different time slots for UL and DL transmissions. Base station and UE transmissions may interference with each other creating cross link interference (CLI) when those transmissions occupy overlapping time slots in a same frequency band.

BRIEF SUMMARY OF SOME EXAMPLES

The following presents a summary of one or more aspects of the present disclosure, in order to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present some concepts of one or more aspects of the disclosure in a form as a prelude to the more detailed description that is presented later.

A method of wireless communication at a user equipment (UE) is provided. The method includes receiving, from a scheduling entity, an indication of at least two different cross link interference (CLI) measurement resources of a message for transmission from a transmission source. The method also includes receiving, from an intelligent reflecting surface (IRS), a reflected transmission of the message originating from the transmission source, while also receiving the message transmitted directly from the transmission source and a downlink (DL) transmission from the scheduling entity, wherein the reflected transmission of the message is reflected by the IRS based on one or more IRS coefficients. The method further includes determining one or more CLI measurement parameters using the at least two different CLI measurement resources of the message. In addition, the method includes transmitting, to the scheduling entity, a CLI measurement report indicating the one or more CLI measurements parameters from the at least two different CLI measurement resources. The method also includes receiving, from the IRS, another reflected transmission of the message originating from the transmission source, while also receiving the message transmitted directly from the transmission source and the DL transmission from the scheduling entity, wherein the reflected transmission of the message is reflected by the IRS based on one or more configured IRS coefficients that are configured using the one or more CLI measurement parameters.

In some aspects, the indication may further comprise one or more patterns of the one or more IRS coefficients. The CLI measurement report may be configured based on the one or more patterns of the one or more IRS coefficients. The one or more patterns of the one or more IRS coefficients may be provided using one or more IRS pattern identifications (IDs), and wherein the CLI measurement report indicates the one or more CLI measurement parameters from the at least two different CLI measurement resources according to the one or more patterns indicated by the one or more IRS pattern IDs. Each of the at least two different CLI measurement resources may be associated with at least one pattern for evaluating a plurality of different IRS coefficients. At least one pattern of the one or more patterns may be associated with one or more different occasions of a CLI measurement resource. At least one pattern of the one or more patterns may be indicated by at least one pattern identification (ID). The at least one pattern ID may be indexed to one IRS pattern. At least one pattern of the one or more patterns may be associated with a plurality of IRS coefficients for at least one CLI measurement resource. The at least one pattern may comprise at least one of a periodicity of a repetition of different IRS coefficients, a number of different IRS coefficients, or an offset of a first instance of CLI for each IRS coefficient. At least one pattern of the one or more patterns may indicate a pattern of CLI instances for which measurements are collected and applied to a same filter associated with a specific IRS coefficient. The one or more configured IRS coefficients may comprise a plurality of the configured IRS coefficients, and wherein each of the at least two different CLI measurement resources is associated with at least one pattern of the one or more patterns for determining at least two different configured IRS coefficients of the plurality of configured IRS coefficients. Before receiving, from the IRS, the other reflected transmission of the message originating from the transmission source, while also receiving the message transmitted directly from the transmission source and the DL transmission from the scheduling entity, the UE may further receive, from the scheduling entity, another indication of at least two different CLI measurement resources of the message for transmission from the transmission source for measuring one or more CLI measurement parameters.

A user equipment (UE) is provided. The UE includes a wireless transceiver, a memory, and a processor communicatively coupled to the wireless transceiver and the memory. The processor and the memory are configured to receive, from a scheduling entity, an indication of at least two different cross link interference (CLI) measurement resources of a message for transmission from a transmission source, receive, from an intelligent reflecting surface (IRS), a reflected transmission of the message originating from the transmission source, while also receiving the message transmitted directly from the transmission source and a downlink (DL) transmission from the scheduling entity, wherein the reflected transmission of the message is reflected by the IRS based on one or more IRS coefficients, determine one or more CLI measurement parameters using the at least two different CLI measurement resources of the message, transmit, to the scheduling entity, a CLI measurement report indicating the one or more CLI measurements parameters from the at least two different CLI measurement resources, and receive, from the IRS, another reflected transmission of the message originating from the transmission source, while also receiving the message transmitted directly from the transmission source and the DL transmission from the scheduling entity, wherein the reflected transmission of the message is reflected by the IRS based on one or more configured IRS coefficients that are configured using the one or more CLI measurement parameters.

A non-transitory, computer readable storage medium of a user equipment (UE) storing one or more electronically executable instructions is provided. When the one or more electronically executable instructions are executed by at least one processor, the at least one processor is configured to receive, from a scheduling entity, an indication of at least two different cross link interference (CLI) measurement resources of a message for transmission from a transmission source, receive, from an intelligent reflecting surface (IRS), a reflected transmission of the message originating from the transmission source, while also receiving the message transmitted directly from the transmission source and a downlink (DL) transmission from the scheduling entity, wherein the reflected transmission of the message is reflected by the IRS based on one or more IRS coefficients, determine one or more CLI measurement parameters using the at least two different CLI measurement resources of the message, transmit, to the scheduling entity, a CLI measurement report indicating the one or more CLI measurements parameters from the at least two different CLI measurement resources, and receive, from the IRS, another reflected transmission of the message originating from the transmission source, while also receiving the message transmitted directly from the transmission source and the DL transmission from the scheduling entity, wherein the reflected transmission of the message is reflected by the IRS based on one or more configured IRS coefficients that are configured using the one or more CLI measurement parameters.

A user equipment (UE) is provided. The UE includes means for receiving, from a scheduling entity, an indication of at least two different cross link interference (CLI) measurement resources of a message for transmission from a transmission source, means for receiving, from an intelligent reflecting surface (IRS), a reflected transmission of the message originating from the transmission source, while also receiving the message transmitted directly from the transmission source and a downlink (DL) transmission from the scheduling entity, wherein the reflected transmission of the message is reflected by the IRS based on one or more IRS coefficients, means for determining one or more CLI measurement parameters using the at least two different CLI measurement resources of the message, means for transmitting, to the scheduling entity, a CLI measurement report indicating the one or more CLI measurements parameters from the at least two different CLI measurement resources, means for receiving, from the IRS, another reflected transmission of the message originating from the transmission source, while also receiving the message transmitted directly from the transmission source and the DL transmission from the scheduling entity, wherein the reflected transmission of the message is reflected by the IRS based on one or more configured IRS coefficients that are configured using the one or more CLI measurement parameters.

A method of wireless communication at a scheduling entity is provided. The method includes transmitting, to a user equipment (UE), an indication of at least two different cross link interference (CLI) measurement resources of a message for transmission from a transmission source. The method also includes transmitting, to the UE, a downlink (DL) transmission, while the UE receives, from an intelligent reflecting surface (IRS), a reflected transmission of the message originating from the transmission source and the message transmitted directly from the transmission source, wherein the reflected transmission of the message is reflected by the IRS based on one or more IRS coefficients. The method further includes receiving, from the UE, a CLI measurement report indicating one or more measurements parameters from the at least two different CLI measurement resources of the message. In addition, the method includes directing the IRS to reflect another reflected transmission of the message originating from the transmission source to the UE according to one or more configured IRS coefficients, while the UE also receives the message transmitted directly from the transmission source and the DL transmission from the scheduling entity, wherein the one or more configured IRS coefficients are configured based on the one or more CLI measurement parameters.

In some aspects, the indication may further comprise one or more patterns of the one or more IRS coefficients. The CLI measurement report may be configured based on the one or more patterns of the one or more IRS coefficients. The one or more patterns of the one or more IRS coefficients may be provided using one or more IRS pattern identifications (IDs), and wherein the CLI measurement report indicates the one or more CLI measurement parameters from the at least two different CLI measurement resources according to the one or more patterns indicated by the one or more IRS pattern IDs. Each of the at least two different CLI measurement resources may be associated with at least one pattern for evaluating a plurality of different IRS coefficients. At least one pattern of the one or more patterns may be associated with one or more different occasions of a CLI measurement resource. At least one pattern of the one or more patterns may be indicated by at least one pattern identification (ID). The at least one pattern ID may be indexed to one IRS pattern. At least one pattern of the one or more patterns may be associated with a plurality of IRS coefficients for at least one CLI measurement resource. The at least one pattern comprises at least one of a periodicity of a repetition of different IRS coefficients, a number of different IRS coefficients, or an offset of a first instance of CLI for each IRS coefficient. At least one pattern of the one or more patterns may indicate a pattern of CLI instances for which measurements are collected and applied to a same filter associated with a specific IRS coefficient. The one or more configured IRS coefficients may comprise a plurality of the configured IRS coefficients, and wherein each of the at least two different CLI measurement resources is associated with at least one pattern of the one or more patterns for determining at least two different configured IRS coefficients of the plurality of configured IRS coefficients. The one or more CLI measurements parameters of the CLI measurement report may indicate at least one of a minimum CLI measurement strength or a maximum CLI measurement strength for each CLI measurement resource. The CLI measurement report may be transmitted in response to one or more CLI measurement parameters being beyond a threshold measurement parameter.

A scheduling entity is provided. The scheduling entity includes a wireless transceiver, a memory, and a processor communicatively coupled to the wireless transceiver and the memory. The processor and the memory are configured to transmit, to a user equipment (UE), an indication of at least two different cross link interference (CLI) measurement resources of a message for transmission from a transmission source, transmit, to the UE, a downlink (DL) transmission, while the UE receives, from an intelligent reflecting surface (IRS), a reflected transmission of the message originating from the transmission source and the message transmitted directly from the transmission source, wherein the reflected transmission of the message is reflected by the IRS based on one or more IRS coefficients, receive, from the UE, a CLI measurement report indicating one or more measurements parameters from the at least two different CLI measurement resources of the message, and direct the IRS to reflect another reflected transmission of the message originating from the transmission source to the UE according to one or more configured IRS coefficients, while the UE also receives the message transmitted directly from the transmission source and the DL transmission from the scheduling entity, wherein the one or more configured IRS coefficients are configured based on the one or more CLI measurement parameters.

A non-transitory, computer readable storage medium of a user equipment (UE) storing one or more electronically executable instructions is provided. When the one or more electronically executable instructions are executed by at least one processor, the at least one processor is configured to transmit, to a user equipment (UE), an indication of at least two different cross link interference (CLI) measurement resources of a message for transmission from a transmission source, transmit, to the UE, a downlink (DL) transmission, while the UE receives, from an intelligent reflecting surface (IRS), a reflected transmission of the message originating from the transmission source and the message transmitted directly from the transmission source, wherein the reflected transmission of the message is reflected by the IRS based on one or more IRS coefficients, receive, from the UE, a CLI measurement report indicating one or more measurements parameters from the at least two different CLI measurement resources of the message, and direct the IRS to reflect another reflected transmission of the message originating from the transmission source to the UE according to one or more configured IRS coefficients, while the UE also receives the message transmitted directly from the transmission source and the DL transmission from the scheduling entity, wherein the one or more configured IRS coefficients are configured based on the one or more CLI measurement parameters.

A scheduling entity is provided. The scheduling entity includes means for transmitting, to a user equipment (UE), an indication of at least two different cross link interference (CLI) measurement resources of a message for transmission from a transmission source, means for transmitting, to the UE, a downlink (DL) transmission, while the UE receives, from an intelligent reflecting surface (IRS), a reflected transmission of the message originating from the transmission source and the message transmitted directly from the transmission source, wherein the reflected transmission of the message is reflected by the IRS based on one or more IRS coefficients, means for receiving, from the UE, a CLI measurement report indicating one or more measurements parameters from the at least two different CLI measurement resources of the message, and means for directing the IRS to reflect another reflected transmission of the message originating from the transmission source to the UE according to one or more configured IRS coefficients, while the UE also receives the message transmitted directly from the transmission source and the DL transmission from the scheduling entity, wherein the one or more configured IRS coefficients are configured based on the one or more CLI measurement parameters.

These and other aspects of the invention will become more fully understood upon a review of the detailed description, which follows. Other aspects, features, and embodiments will become apparent to those of ordinary skill in the art, upon reviewing the following description of specific, exemplary embodiments in conjunction with the accompanying figures. While features may be discussed relative to certain embodiments and figures below, all embodiments can include one or more of the advantageous features discussed herein. In other words, while one or more embodiments may be discussed as having certain advantageous features, one or more of such features may also be used in accordance with the various embodiments discussed herein. In similar fashion, while exemplary embodiments may be discussed below as device, system, or method embodiments it should be understood that such exemplary embodiments can be implemented in various devices, systems, and methods.

BRIEF DESCRIPTION OF THE DRAWINGS

FIG. 15 is a flow chart of a method for CLI mitigation according to some aspects.

FIG. 17 is a flow chart of a method for CLI mitigation according to some aspects.

DETAILED DESCRIPTION

Figure 1:
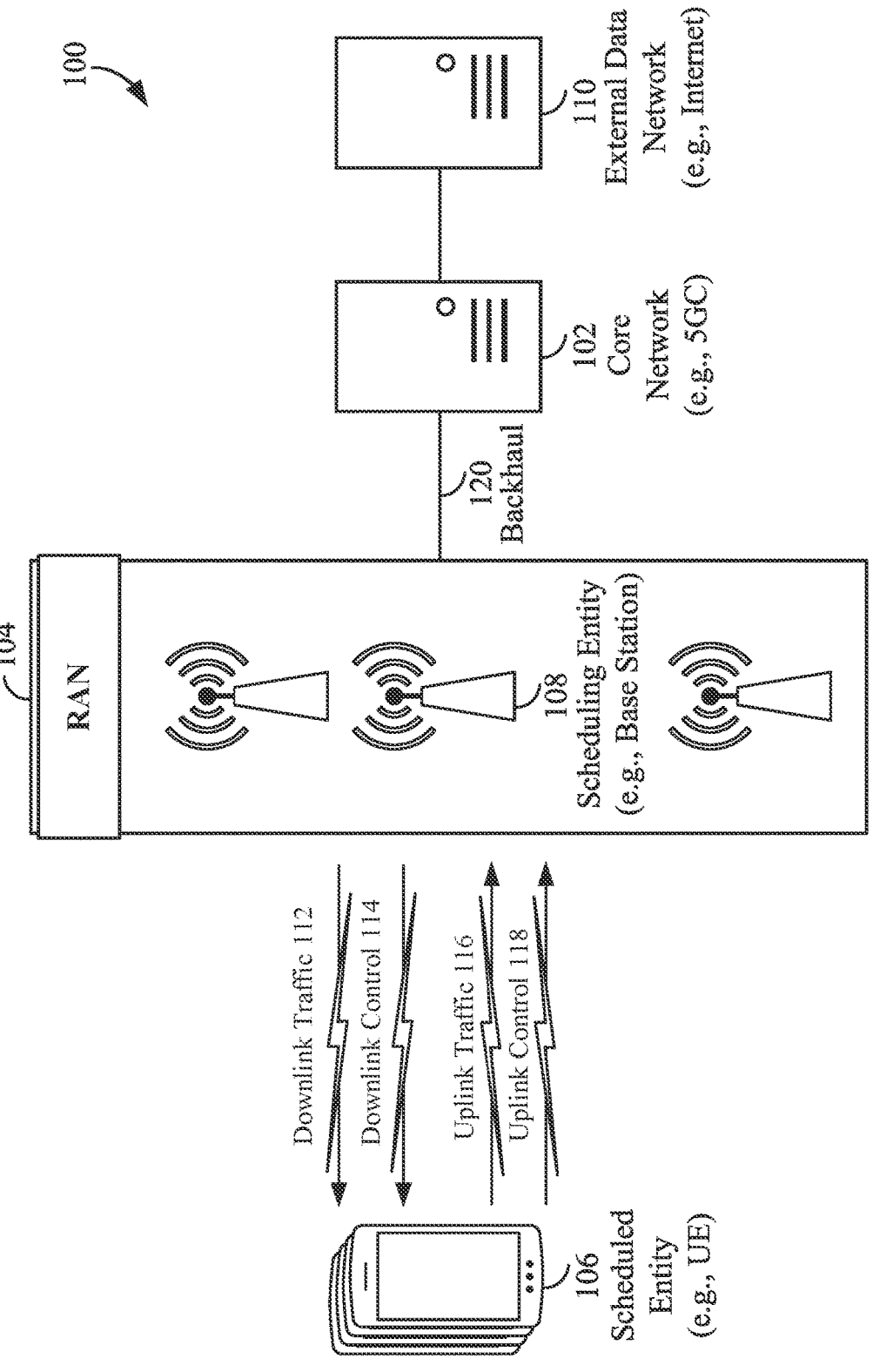
FIG. 1 is a schematic illustration of a wireless communication system according to some aspects.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

In wireless communication between a base station and user equipment (UE), simultaneous transmission and reception may be accomplished using different frequencies resources for uplink and downlink transmissions. This may be called frequency division duplexing (FDD). Additionally, or alternatively, simultaneous transmission and reception between a base station and a UE may be accomplished using different time resources for uplink (UL) and downlink (DL) transmissions. This may be called time division duplexing (TDD). Generally, FDD networks may have separate UL and DL frequency bands while TDD networks may utilize the same bandwidth, but may also allocate different time slots for UL and DL transmissions. Base station and UE transmissions may interference with each other creating cross link interference (CLI) when those transmissions occupy overlapping time slots in a same frequency band.

In some aspects, CLI may occur when a network configures different TDD UL transmission and DL transmission slot formats to nearby user equipment (UEs). When an aggressor UE is transmitting an UL transmission, a victim UE may receive the UL transmission as CLI in the DL symbols if the aggressor UE's UL symbol collides with at least one DL symbol of the victim UE. In some aspects, CLI may occur between two or more UEs on the same cell or on different cells. In Release-16 New Radio (NR), the signaling procedure for a victim UE may be to measure CLI from an aggressor UE. The aggressor UE may not transmit a slot that is dedicated for CLI measurement by a victim UE and may not be aware that its UL transmission is measured by the victim UE. The network may configure one or more CLI measurement resources for the victim UE to measure the CLI of the UL transmission from the aggressor UE. A CLI measurement may be a periodic measurement based on one or more channel quality indications (CQIs). In some aspects, a CQI may include at least one of a sounding reference signal (SRS), a received signal references power (RSRP), a received signal strength indicator (RSSI), or the like. After recording (e.g., measuring) one or more CLI measurements using the one or more CLI measurement resources of the UL transmission from the aggressor UE, the victim UE may transmit a CLI measurement report containing the one or more CLI measurements to the network so that the network may manage the scheduling of the aggressor UE and the victim UE to balance the throughput of both the aggressor UE and the victim UE.

In some aspects, to improve CLI measurement accuracy, dedicated tracking loops (e.g., an automatic gain control (AGC) tracking loop, a time tracking loop (TTL), a frequency tracking loop (FTL)) may be used to measure CLI measurement resources. Using dedicated tracking loops, a victim UE may be able to distinguish between different CLI measurement resource based on differences in power, timing, frequency, and the like. In some aspects, a network may indicate to a victim UE that certain properties of a CLI measurement resource are sufficiently different so that the victim UE may use different tracking loops to receive these CLI measurement resources.

In some aspects, a network (e.g., a scheduling entity) may configure a slot duration for CLI measurement (e.g., CLI-RSSI measurement) and may correspond with one value of a periodicity among a periodicity set (e.g., {10 ms, 20 ms, 40 ms, 80 ms, 160 ms, 320 ms, 640 ms}). Periodicity set may be provided in TS 38.331. For example, a periodicity may be 10 ms where a CLI measurement resource (e.g., an RSSI resource) exists for a layer 3 (L3) measurement configuration. In some aspects, under periodicity and offset for RSSI Layer 3 (L3) Measurement Configuration under TS 38.331, the value range may be integers from 0 to 9 for 10 slots, the value range may be integers 0 to 19 for 20 slots, the value range may be integers 0 to 30 for 40 slots, the value range may be integers 0 to 79 for 80 slots, the value range may be integers 0 to 159 for 160 slots, the value range may be integers 0 to 319 for 320 slots, the value range may be integers 0 to 639 for 640 slots, and/or the like. These values may be UE specific and may be included in CLI-RSSI measurement resources configurations.

In some aspects, a network (e.g., a scheduling entity) may configure a slot duration for CLI measurement (e.g., CLI-SRS-RSRP resources). In some aspects, only periodic may be applicable for resource type for SRS-RSRP measurement resources. In some aspects, periodicity and offset for an SRS resource may correspond with a value indicating a number of slots. For example, a value of sl1 (e.g., sl1 NULL) may correspond to periodicity of 1 slot, a value of sl2 (e.g., sl2 INTEGER(0 . . . 1)) may correspond to periodicity of 2 slots, a value of sl4 (e.g., sl4 INTEGER(0 . . . 3)) may correspond to periodicity of 4 slots, a value of sl5 (e.g., sl5 INTEGER(0 . . . 4)) may correspond to periodicity of 5 slots, a value of sl8 (e.g., sl8 INTEGER(0 . . . 7)) may correspond to periodicity of 8 slots, a value of sl10 (e.g., sl10 INTE-GER(0 . . . 9)) may correspond to periodicity of 10 slots, a value of sl16 (e.g., sl16 INTEGER(0 . . . 15)) may correspond to periodicity of 16 slots, a value of sl20 (e.g., sl20 INTEGER(0 . . . 19)) may correspond to periodicity of 20 slots, a value of sl32 (e.g., sl32 INTEGER(0 . . . 31)) may correspond to periodicity of 32 slots, a value of sl40 (e.g., sl40 INTEGER(0 . . . 39)) may correspond to periodicity of 40 slots, a value of sl64 (e.g., sl64 INTEGER(0 . . . 63)) may correspond to periodicity of 64 slots, a value of sl80 (e.g., sl80 INTEGER(0 . . . 79)) may correspond to periodicity of 80 slots, a value of sl160 (e.g., sl160 INTEGER(0 . . . 159)) may correspond to periodicity of 160 slots, a value of sl320 (e.g., sl320 INTEGER(0 . . . 319)) may correspond to periodicity of 320 slots, a value of sl640 (e.g., sl640 INTE-GER(0 . . . 639)) may correspond to periodicity of 640 slots, and the like. For each periodicity, the corresponding offset may be given in a number of slots. For example, for periodicity sl1, the offset may be zero (0) slots. As another example, for periodicity sl4, the offset may be 2 slots. These value may be UE specific and may be included in SRS-RSRP measurement resources configurations.

In some aspects, an L3 measurement with one filter may be used to enhance measurement within a same resource. An example filter may be found in TS 38.331. In some aspects, a UE may use the same filter to measure each CLI resources. In some aspects, the a UE may measure a CLI resource using the following equation:

$$F_a = (1-a)(F_{a-1}) + (a)(M_a) \qquad [1]$$

where, $M_a$ is the latest received measurement result from the physical layer;

$F_n$ is the updated filter measurement result, that is used for evaluating of reporting criteria or for measurement reporting;

$F_{n-1}$ is the older filtered measurement result, where $F_0$ is set to $M_1$ when the first measurement result from the physical layer is received; and $a = (\frac{1}{2})^{k/4}$, where k is the filtercoefficient for the corresponding measurement quantity received by the quantityConfig.

Intelligent reflective surfaces (IRSs) (and similarly a reconfigurable intelligent surface (RIS)) may be used to mitigate CLI. An IRS may include a plurality of reconfigurable elements for receiving a signal having a first phase and/or a first amplitude and reflecting the signal so that the signal a second different phase and/or a second different amplitude. In some aspects, a scheduling entity may configure one or more of the reconfigurable elements to reflect a signal so that the phase and/or amplitude of the signal mitigates CLI at a UE. In some aspects, reflection may be passive with amplitude of each element in [0,1] and phase shift in [0, 27π]. In some aspects, when an aggressor UE transmits an uplink (UL) signal, a victim UE may receive that UL signal. Additionally, an IRS may also receive the UL signal from the aggressor UE. Using one or more reconfigurable element of the IRS, a scheduling entity may cause a reflection of the signal off the IRS and the victim UE so that signal has a phase shift and/or an amplitude change to reduce the CLI caused by the UL at the victim UE, when the victim UE is receiving a downlink (DL) transmission from the scheduling entity. In some cases, an IRS may be used to increase a reception power of a transmission. In some cases, the IRS may create an additional wireless transmission path for a scheduling entity to transmit a DL transmission to a UE in order to bypass an obstruction between the scheduling entity and the UE. In some aspects, an IRS may be used to enhance coverage and avoid a cellular dead zone, enhance network throughput based on hybrid deployment of active base stations and access points and/or passive IRSs, enhance physical layer security by canceling a signal of an eavesdropper, wireless information and/or power transfer in an internet of things (IoT) network, and/or the like.

As described herein, a scheduling entity may be in electronic communication with an IRS and may configure the IRS to create a reflection of a CLI originating from an aggressor UE and reflected towards a victim UE. The aggressor UE may also transmit the same CLI directly to the victim UE. The scheduling entity may configure the IRS by selecting one or more reflection coefficients to change an amplitude or phase of the reflected CLI to cancel or degrade the CLI received directly from the aggressor UE. To facilitate the configuration of the IRS and cancelation or degradation of the CLI, the scheduling entity may configure special or dedicated CLI measurement resources. The scheduling entity may configure the special or dedicated CLI measurement resources for the UE to measure CLI measurements. The CLI measurements may be provided in a measurement report from the victim UE to the scheduling entity for evaluating different IRS coefficients for configuring the IRS.

While aspects and embodiments are described in this application by illustration to some examples, those skilled in the art will understand that additional implementations and use cases may come about in many different arrangements and scenarios. Innovations described herein may be implemented across many differing platform types, devices, systems, shapes, sizes, and packaging arrangements. For example, embodiments and/or uses may come about via integrated chip embodiments and other non-module-component based devices (e.g., end-user devices, vehicles, communication devices, computing devices, industrial equipment, retail/purchasing devices, medical devices, AI-enabled devices, etc.). While some examples may or may not be specifically directed to use cases or applications, a wide assortment of applicability of described innovations may occur. Implementations may range a spectrum from chip-level or modular components to non-modular, non-chip-level implementations and further to aggregate, distributed, or OEM devices or systems incorporating one or more aspects of the described innovations. In some practical settings, devices incorporating described aspects and features may also necessarily include additional components and features for implementation and practice of claimed and described embodiments. For example, transmission and reception of wireless signals necessarily includes a number of components for analog and digital purposes (e.g., hardware components including antenna, RF-chains, power amplifiers, modulators, buffer, processor(s), interleaver, adders/summers, etc.). It is intended that innovations described herein may be practiced in a wide variety of devices, chip-level components, systems, distributed arrangements, end-user devices, etc. of varying sizes, shapes and constitution.

The various concepts presented throughout this disclosure may be implemented across a broad variety of telecommunication systems, network architectures, and communication standards. Referring now to FIG. 1, as an illustrative example without limitation, various aspects of the present disclosure are illustrated with reference to a wireless communication system 100. The wireless communication system 100 includes three interacting domains: a core network 102, a radio access network (RAN) 104, and a user equipment (UE) 106. By virtue of the wireless communication system 100, the UE 106 may be enabled to carry out data communication with an external data network 110, such as (but not limited to) the Internet.

The RAN 104 may implement any suitable wireless communication technology or technologies to provide radio access to the UE 106. As one example, the RAN 104 may operate according to 3rd Generation Partnership Project (3GPP) New Radio (NR) specifications, often referred to as 5G. As another example, the RAN 104 may operate under a hybrid of 5G NR and Evolved Universal Terrestrial Radio Access Network (eUTRAN) standards, often referred to as Long-Term Evolution (LTE). The 3GPP refers to this hybrid RAN as a next-generation RAN, or NG-RAN. Of course, many other examples may be utilized within the scope of the present disclosure.

As illustrated, the RAN 104 includes a plurality of base stations 108 (e.g., a RAN entity, RAN node, or the like). Broadly, a base station is a network element in a radio access network responsible for radio transmission and reception in one or more cells to or from a UE. In different technologies, standards, or contexts, a base station may variously be referred to by those skilled in the art as a base transceiver station (BTS), a radio base station, a radio transceiver, a transceiver function, a basic service set (BSS), an extended service set (ESS), an access point (AP), a Node B (NB), an eNode B (eNB), a gNode B (gNB), a transmission and reception point (TRP), or some other suitable terminology. In some examples, a base station may include two or more TRPs that may be collocated or non-collocated. Each TRP may communicate on the same or different carrier frequency within the same or different frequency band.

The radio access network 104 is further illustrated supporting wireless communication for multiple mobile apparatuses. A mobile apparatus may be referred to as user equipment (UE) in 3GPP standards, but may also be referred to by those skilled in the art as a mobile station (MS), a subscriber station, a mobile unit, a subscriber unit, a wireless unit, a remote unit, a mobile device, a wireless device, a wireless communications device, a remote device, a mobile subscriber station, an access terminal (AT), a mobile terminal, a wireless terminal, a remote terminal, a handset, a terminal, a user agent, a mobile client, a client, or some other suitable terminology. A UE may be an apparatus that provides a user with access to network services.

Within the present document, a "mobile" apparatus need not necessarily have a capability to move and may be stationary. The term mobile apparatus or mobile device broadly refers to a diverse array of devices and technologies. UEs may include a number of hardware structural components sized, shaped, and arranged to help in communication; such components can include antennas, antenna arrays, RF chains, amplifiers, one or more processors, etc. electrically coupled to each other. For example, some non-limiting examples of a mobile apparatus include a mobile, a cellular (cell) phone, a smart phone, a session initiation protocol (SIP) phone, a laptop, a personal computer (PC), a notebook, a netbook, a smartbook, a tablet, a personal digital assistant (PDA), and a broad array of embedded systems, e.g., corresponding to an "Internet of Things" (IoT). A mobile apparatus may additionally be an automotive or other transportation vehicle, a remote sensor or actuator, a robot or robotics device, a satellite radio, a global positioning system (GPS) device, an object tracking device, a drone, a multi-copter, a quad-copter, a remote control device, a consumer and/or wearable device, such as eyewear, a wearable camera, a virtual reality device, a smart watch, a health or fitness tracker, a digital audio player (e.g., MP3 player), a camera, a game console, etc. A mobile apparatus may additionally be a digital home or smart home device such as a home audio, video, and/or multimedia device, an appliance, a vending machine, intelligent lighting, a home security system, a smart meter, etc. A mobile apparatus may additionally be a smart energy device, a security device, a solar panel or solar array, a municipal infrastructure device controlling electric power (e.g., a smart grid), lighting, water, an industrial automation and enterprise device, a logistics controller, agricultural equipment, etc. Still further, a mobile apparatus may provide for connected medicine or telemedicine support, e.g., health care at a distance. Telehealth devices may include telehealth monitoring devices and telehealth administration devices, whose communication may be given preferential treatment or prioritized access over other types of information, e.g., in terms of prioritized access for transport of critical service data, and/or relevant QoS for transport of critical service data.

Wireless communication between a RAN 104 and a UE 106 may be described as utilizing an air interface. Transmissions over the air interface from a base station (e.g., base station 108) to one or more UEs (e.g., UE 106) may be referred to as downlink (DL) transmission. In accordance with certain aspects of the present disclosure, the term downlink may refer to a point-to-multipoint transmission originating at a scheduling entity (described further below; e.g., base station 108). Another way to describe this scheme may be to use the term broadcast channel multiplexing. Transmissions from a UE (e.g., UE 106) to a base station (e.g., base station 108) may be referred to as uplink (UL) transmissions. In accordance with further aspects of the present disclosure, the term uplink may refer to a point-to-point transmission originating at a scheduled entity (described further below; e.g., UE 106).

In some examples, access to the air interface may be scheduled, wherein a scheduling entity (e.g., a base station 108) allocates resources for communication among some or all devices and equipment within its service area or cell. Within the present disclosure, as discussed further below, the scheduling entity may be responsible for scheduling, assigning, reconfiguring, and releasing resources for one or more scheduled entities. That is, for scheduled communication, UEs 106, which may be scheduled entities, may utilize resources allocated by the scheduling entity 108.

As illustrated in FIG. 1, a scheduling entity 108 may broadcast downlink traffic 112 to one or more scheduled entities 106. Broadly, the scheduling entity 108 is a node or device responsible for scheduling traffic in a wireless communication network, including the downlink traffic 112 and, in some examples, uplink traffic 116 from one or more scheduled entities 106 to the scheduling entity 108. On the other hand, the scheduled entity 106 is a node or device that receives downlink control information 114, including but not limited to scheduling information (e.g., a grant), synchronization or timing information, or other control information from another entity in the wireless communication network such as the scheduling entity 108.

In addition, the uplink and/or downlink control information and/or traffic information may be time-divided into frames, subframes, slots, and/or symbols. As used herein, a symbol may refer to a unit of time that, in an orthogonal frequency division multiplexed (OFDM) waveform, carries one resource element (RE) per sub-carrier. A slot may carry 7 or 14 OFDM symbols. A subframe may refer to a duration of 1 ms. Multiple subframes or slots may be grouped together to form a single frame or radio frame. Of course, these definitions are not required, and any suitable scheme for organizing waveforms may be utilized, and various time divisions of the waveform may have any suitable duration.

In general, base stations 108 may include a backhaul interface for communication with a backhaul portion 120 of the wireless communication system. The backhaul 120 may provide a link between a base station 108 and the core network 102. Further, in some examples, a backhaul network may provide interconnection between the respective base stations 108. Various types of backhaul interfaces may be employed, such as a direct physical connection, a virtual network, or the like using any suitable transport network.

The core network 102 may be a part of the wireless communication system 100, and may be independent of the radio access technology used in the RAN 104. In some examples, the core network 102 may be configured according to 5G standards (e.g., 5GC). In other examples, the core network 102 may be configured according to a 4G evolved packet core (EPC), or any other suitable standard or configuration.

Figure 2:
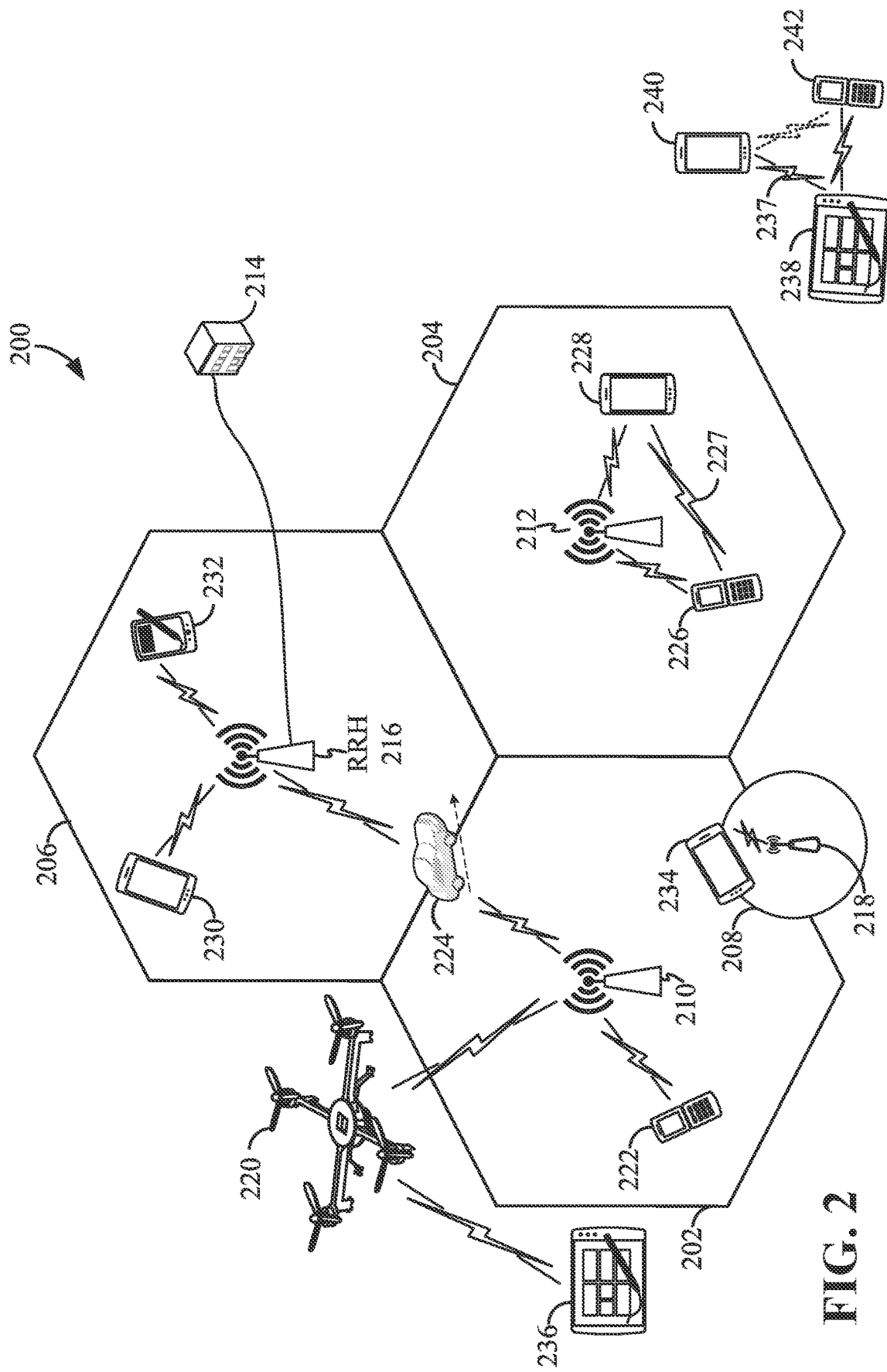
FIG. 2 is a conceptual illustration of an example of a radio access network according to some aspects.

Referring now to FIG. 2, by way of example and without limitation, a schematic illustration of a RAN 200 is provided. In some examples, the RAN 200 may be the same as the RAN 104 described above and illustrated in FIG. 1. The geographic area covered by the RAN 200 may be divided into cellular regions (cells) that can be uniquely identified by a user equipment (UE) based on an identification broadcasted from one access point or base station. FIG. 2 illustrates macrocells 202, 204, and 206, and a small cell 208, each of which may include one or more sectors (not shown). A sector is a sub-area of a cell. All sectors within one cell are served by the same base station. A radio link within a sector can be identified by a single logical identification belonging to that sector. In a cell that is divided into sectors, the multiple sectors within a cell can be formed by groups of antennas with each antenna responsible for communication with UEs in a portion of the cell.

Various base station arrangements can be utilized. For example, in FIG. 2, two base stations 210 and 212 are shown in cells 202 and 204; and a third base station 214 is shown controlling a remote radio head (RRH) 216 in cell 206. That is, a base station can have an integrated antenna or can be connected to an antenna or RRH by feeder cables. In the illustrated example, the cells 202, 204, and 206 may be referred to as macrocells, as the base stations 210, 212, and 214 support cells having a large size. Further, a base station 218 is shown in the small cell 208 (e.g., a microcell, picocell, femtocell, home base station, home Node B, home eNode B, etc.) which may overlap with one or more macrocells. In this example, the cell 208 may be referred to as a small cell, as the base station 218 supports a cell having a relatively small size. Cell sizing can be done according to system design as well as component constraints.

It is to be understood that the radio access network 200 may include any number of wireless base stations and cells. Further, a relay node may be deployed to extend the size or coverage area of a given cell. The base stations 210, 212, 214, 218 provide wireless access points to a core network for any number of mobile apparatuses. In some examples, the base stations 210, 212, 214, and/or 218 may be the same as the base station/scheduling entity 108 described above and illustrated in FIG. 1.

Within the RAN 200, the cells may include UEs that may be in communication with one or more sectors of each cell. Further, each base station 210, 212, 214, and 218 may be configured to provide an access point to a core network (e.g., as illustrated in FIGS. 1 and/or 2) for all the UEs in the respective cells. For example, UEs 222 and 224 may be in communication with base station 210; UEs 226 and 228 may be in communication with base station 412; UEs 230 and 232 may be in communication with base station 214 by way of RRH 216; and UE 234 may be in communication with base station 218. In some examples, the UEs 222, 224, 226, 228, 230, 232, 234, 238, 240, and/or 242 may be the same as the UE/scheduled entity 106 described above and illustrated in FIG. 1.

In some examples, an unmanned aerial vehicle (UAV) 220, which may be a drone or quadcopter, can be a mobile network node and may be configured to function as a UE. For example, the UAV 220 may operate within cell 202 by communicating with base station 210.

Base stations 210, 212, 214, 218 may operate as scheduling entities, scheduling resources for communication among the UEs within their service areas or cells 202, 204,

206, 208, respectively. However, base stations are not the only entities that may function as a scheduling entity. That is, in some examples, a UE may function as a scheduling entity, scheduling resources for one or more scheduled entities (e.g., one or more other UEs). For example, two or more UEs (e.g., UEs 238, 240, and 242) may communicate with each other using peer to peer (P2P) or sidelink signals 237 without relaying that communication through a base station. In some examples, the UEs 238, 240, and 242 may each function as a scheduling entity or transmitting sidelink device and/or a scheduled entity or a receiving sidelink device to schedule resources and communicate sidelink signals 237 therebetween without relying on scheduling or control information from a base station. In other examples, two or more UEs (e.g., UEs 226 and 228) within the coverage area of a base station (e.g., base station 212) may also communicate sidelink signals 227 over a direct link (sidelink) without conveying that communication through the base station 246. In this example, the base station 212 may allocate resources to the UEs 226 and 228 for the sidelink communication. In either case, such sidelink signaling 227 and 237 may be implemented in a P2P network, a device-to-device (D2D) network, vehicle-to-vehicle (V2V) network, a vehicle-to-everything (V2X), a mesh network, or other suitable direct link network.

In the RAN 200, the ability for a UE to communicate while moving, independent of its location, is referred to as mobility. The various physical channels between the UE and the radio access network are generally set up, maintained, and released under the control of an AMF.

A RAN 200 may utilize DL-based mobility or UL-based mobility to enable mobility and handovers (e.g., the transfer of a UE's connection from one radio channel to another). In a network configured for DL-based mobility, during a call with a scheduling entity, or at any other time, a UE may monitor various parameters of the signal from its serving cell as well as various parameters of neighboring cells. Depending on the quality of these parameters, the UE may maintain communication with one or more of the neighboring cells. During this time, if the UE moves from one cell to another, or if signal quality from a neighboring cell exceeds that from the serving cell for a given amount of time, the UE may undertake a handoff or handover from the serving cell to the neighboring (target) cell. For example, UE 224 (illustrated as a vehicle, although any suitable form of UE may be used) may move from the geographic area corresponding to its serving cell 202 to the geographic area corresponding to a neighbor cell 206. When the signal strength or quality from the neighbor cell 206 exceeds that of its serving cell 202 for a given amount of time, the UE 224 may transmit a reporting message to its serving base station 210 indicating this condition. In response, the UE 224 may receive a handover command, and the UE may undergo a handover to the cell 206.

In a network configured for UL-based mobility, UL reference signals from each UE may be utilized by the network to select a serving cell for each UE. In some examples, the base stations 210, 212, and 214/216 may broadcast unified synchronization signals (e.g., unified Primary Synchronization Signals (PSSs), unified Secondary Synchronization Signals (SSSs) and unified Physical Broadcast Channels (PBCH)). The UEs 222, 224, 226, 228, 230, and 232 may receive the unified synchronization signals, derive the carrier frequency and slot timing from the synchronization signals, and in response to deriving timing, transmit an uplink pilot or reference signal. The uplink pilot signal transmitted by a UE (e.g., UE 224) may be concurrently received by two or more cells (e.g., base stations 210 and 214/216) within the radio access network 200. Each of the cells may measure a strength of the pilot signal, and the radio access network (e.g., one or more of the base stations 210 and 214/216 and/or a central node within the core network) may determine a serving cell for the UE 224. As the UE 224 moves through the radio access network 200, the network may continue to monitor the uplink pilot signal transmitted by the UE 224. When the signal strength or quality of the pilot signal measured by a neighboring cell exceeds that of the signal strength or quality measured by the serving cell, the network 200 may handover the UE 224 from the serving cell to the neighboring cell, with or without informing the UE 224.

Although the synchronization signal transmitted by the base stations 210, 212, and 214/216 may be unified, the synchronization signal may not identify a particular cell, but rather may identify a zone of multiple cells operating on the same frequency and/or with the same timing. The use of zones in 5G networks or other next generation communication networks enables the uplink-based mobility framework and improves the efficiency of both the UE and the network, since the number of mobility messages that need to be exchanged between the UE and the network may be reduced.

In various implementations, the air interface in the radio access network 200 may utilize licensed spectrum, unlicensed spectrum, or shared spectrum. Licensed spectrum provides for exclusive use of a portion of the spectrum, generally by virtue of a mobile network operator purchasing a license from a government regulatory body. Unlicensed spectrum provides for shared use of a portion of the spectrum without need for a government-granted license. While compliance with some technical rules is generally still required to access unlicensed spectrum, generally, any operator or device may gain access. Shared spectrum may fall between licensed and unlicensed spectrum, wherein technical rules or limitations may be required to access the spectrum, but the spectrum may still be shared by multiple operators and/or multiple RATs. For example, the holder of a license for a portion of licensed spectrum may provide licensed shared access (LSA) to share that spectrum with other parties, e.g., with suitable licensee-determined conditions to gain access.

The air interface in the radio access network 200 may utilize one or more multiplexing and multiple access algorithms to enable simultaneous communication of the various devices. For example, 5G NR specifications provide multiple access for UL transmissions from UEs 222 and 224 to base station 210, and for multiplexing for DL transmissions from base station 210 to one or more UEs 222 and 224, utilizing orthogonal frequency division multiplexing (OFDM) with a cyclic prefix (CP). In addition, for UL transmissions, 5G NR specifications provide support for discrete Fourier transform-spread-OFDM (DFT-s-OFDM) with a CP (also referred to as single-carrier FDMA (SC-FDMA)). However, within the scope of the present disclosure, multiplexing and multiple access are not limited to the above schemes, and may be provided utilizing time division multiple access (TDMA), code division multiple access (CDMA), frequency division multiple access (FDMA), sparse code multiple access (SCMA), resource spread multiple access (RSMA), or other suitable multiple access schemes. Further, multiplexing DL transmissions from the base station 210 to UEs 222 and 224 may be provided utilizing time division multiplexing (TDM), code division multiplexing (CDM), frequency division multiplexing (FDM), orthogonal frequency division multiplexing (OFDM), sparse code multiplexing (SCM), or other suitable multiplexing schemes.

The air interface in the radio access network 200 may further utilize one or more duplexing algorithms. Duplex refers to a point-to-point communication link where both endpoints can communicate with one another in both directions. Full-duplex means both endpoints can simultaneously communicate with one another. Half-duplex means only one endpoint can send information to the other at a time. Half-duplex emulation is frequently implemented for wireless links utilizing time division duplex (TDD). In TDD, transmissions in different directions on a given channel are separated from one another using time division multiplexing. That is, at some times the channel is dedicated for transmissions in one direction, while at other times the channel is dedicated for transmissions in the other direction, where the direction may change very rapidly, e.g., several times per slot. In a wireless link, a full-duplex channel generally relies on physical isolation of a transmitter and receiver, and suitable interference cancellation technologies. Full-duplex emulation is frequently implemented for wireless links by utilizing frequency division duplex (FDD) or spatial division duplex (SDD). In FDD, transmissions in different directions may operate at different carrier frequencies (e.g., within paired spectrum). In SDD, transmissions in different directions on a given channel are separated from one another using spatial division multiplexing (SDM). In other examples, full-duplex communication may be implemented within unpaired spectrum (e.g., within a single carrier bandwidth), where transmissions in different directions occur within different sub-bands of the carrier bandwidth. This type of full-duplex communication may be referred to herein as sub-band full duplex (SBFD), also known as flexible duplex.

Figure 3:
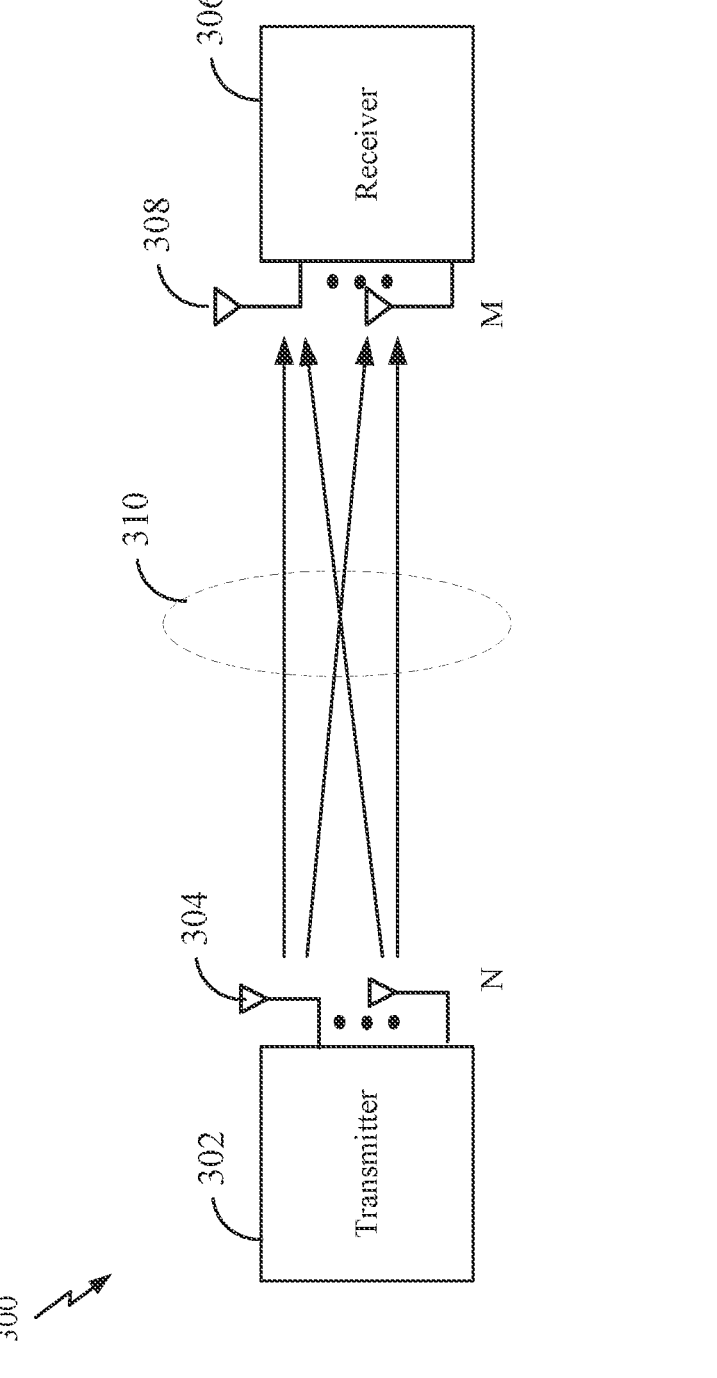
FIG. 3 is a block diagram illustrating a wireless communication system supporting multiple-input multiple-output (MIMO) communication according to some aspects.

In some aspects of the disclosure, the scheduling entity and/or scheduled entity may be configured for beamforming and/or multiple-input multiple-output (MIMO) technology. FIG. 3 illustrates an example of a wireless communication system 300 supporting MIMO. In a MIMO system, a transmitter 302 includes multiple transmit antennas 304 (e.g., N transmit antennas) and a receiver 306 includes multiple receive antennas 308 (e.g., M receive antennas). Thus, there are N×M signal paths 310 from the transmit antennas 304 to the receive antennas 308. Each of the transmitter 302 and the receiver 306 may be implemented, for example, within a scheduling entity 108, a scheduled entity 106, or any other suitable wireless communication device.

The use of such multiple antenna technology enables the wireless communication system to exploit the spatial domain to support spatial multiplexing, beamforming, and transmit diversity. Spatial multiplexing may be used to transmit different streams of data, also referred to as layers, simultaneously on the same time-frequency resource. The data streams may be transmitted to a single UE to increase the data rate or to multiple UEs to increase the overall system capacity, the latter being referred to as multi-user MIMO (MU-MIMO). This is achieved by spatially precoding each data stream (e.g., multiplying the data streams with different weighting and phase shifting) and then transmitting each spatially precoded stream through multiple transmit antennas on the downlink. The spatially precoded data streams arrive at the UE(s) with different spatial signatures, which enables each of the UE(s) to recover the one or more data streams destined for that UE. On the uplink, each UE transmits a spatially precoded data stream, which enables the base station to identify the source of each spatially precoded data stream.

The number of data streams or layers corresponds to the rank of the transmission. In general, the rank of the MIMO system 300 is limited by the number of transmit or receive antennas 304 or 308, whichever is lower. In addition, the channel conditions at the UE, as well as other considerations, such as the available resources at the base station, may also affect the transmission rank. For example, the rank (and therefore, the number of data streams) assigned to a particular UE on the downlink may be determined based on the rank indicator (RI) transmitted from the UE to the base station. The RI may be determined based on the antenna configuration (e.g., the number of transmit and receive antennas) and a measured signal-to-interference-and-noise ratio (SINR) on each of the receive antennas. The RI may indicate, for example, the number of layers that may be supported under the current channel conditions. The base station may use the RI, along with resource information (e.g., the available resources and amount of data to be scheduled for the UE), to assign a transmission rank to the UE.

In Time Division Duplex (TDD) systems, the UL and DL are reciprocal, in that each uses different time slots of the same frequency bandwidth. Therefore, in TDD systems, the base station may assign the rank for DL MIMO transmissions based on UL SINR measurements (e.g., based on a Sounding Reference Signal (SRS) transmitted from the UE or other pilot signal). Based on the assigned rank, the base station may then transmit the CSI-RS with separate C-RS sequences for each layer to provide for multi-layer channel estimation. From the CSI-RS, the UE may measure the channel quality across layers and resource blocks and feedback the CQI and RI values to the base station for use in updating the rank and assigning REs for future downlink transmissions.

In the simplest case, as shown in FIG. 3, a rank-2 spatial multiplexing transmission on a 2×2 MIMO antenna configuration will transmit one data stream from each transmit antenna 304. Each data stream reaches each receive antenna 308 along a different signal path 310. The receiver 306 may then reconstruct the data streams using the received signals from each receive antenna 308.

Beamforming is a signal processing technique that may be used at the transmitter 302 or receiver 306 to shape or steer an antenna beam (e.g., a transmit beam or receive beam) along a spatial path between the transmitter 302 and the receiver 306. Beamforming may be achieved by combining the signals communicated via antennas 304 or 308 (e.g., antenna elements of an antenna array module) such that some of the signals experience constructive interference while others experience destructive interference. To create the desired constructive/destructive interference, the transmitter 302 or receiver 306 may apply amplitude and/or phase offsets to signals transmitted or received from each of the antennas 304 or 308 associated with the transmitter 302 or receiver 306. A beam may be formed by, but not limited to, an antenna, an antenna port, an antenna element, a group of antennas, a group of antenna ports or a group of antenna elements. The beam may be alternatively made with a certain reference signal resource. The beam may be equivalent to a spatial domain filtering by which an electromagnetic (EM) radiation is transmitted.

In 5G New Radio (NR) systems, particularly for mmWave systems, beamformed signals may be utilized for most downlink channels, including the physical downlink control channel (PDCCH) and physical downlink shared channel (PDSCH). In addition, broadcast information, such as the SSB, CSI-RS, slot format indicator (SFI), and paging information, may be transmitted in a beam-sweeping manner to enable all scheduled entities (UEs) in the coverage area of a transmission and reception point (TRP) (e.g., a gNB) to receive the broadcast information. In addition, for UEs configured with beamforming antenna arrays, beamformed signals may also be utilized for uplink channels, including the physical uplink control channel (PUCCH) and physical uplink shared channel (PUSCH).

Figure 4:
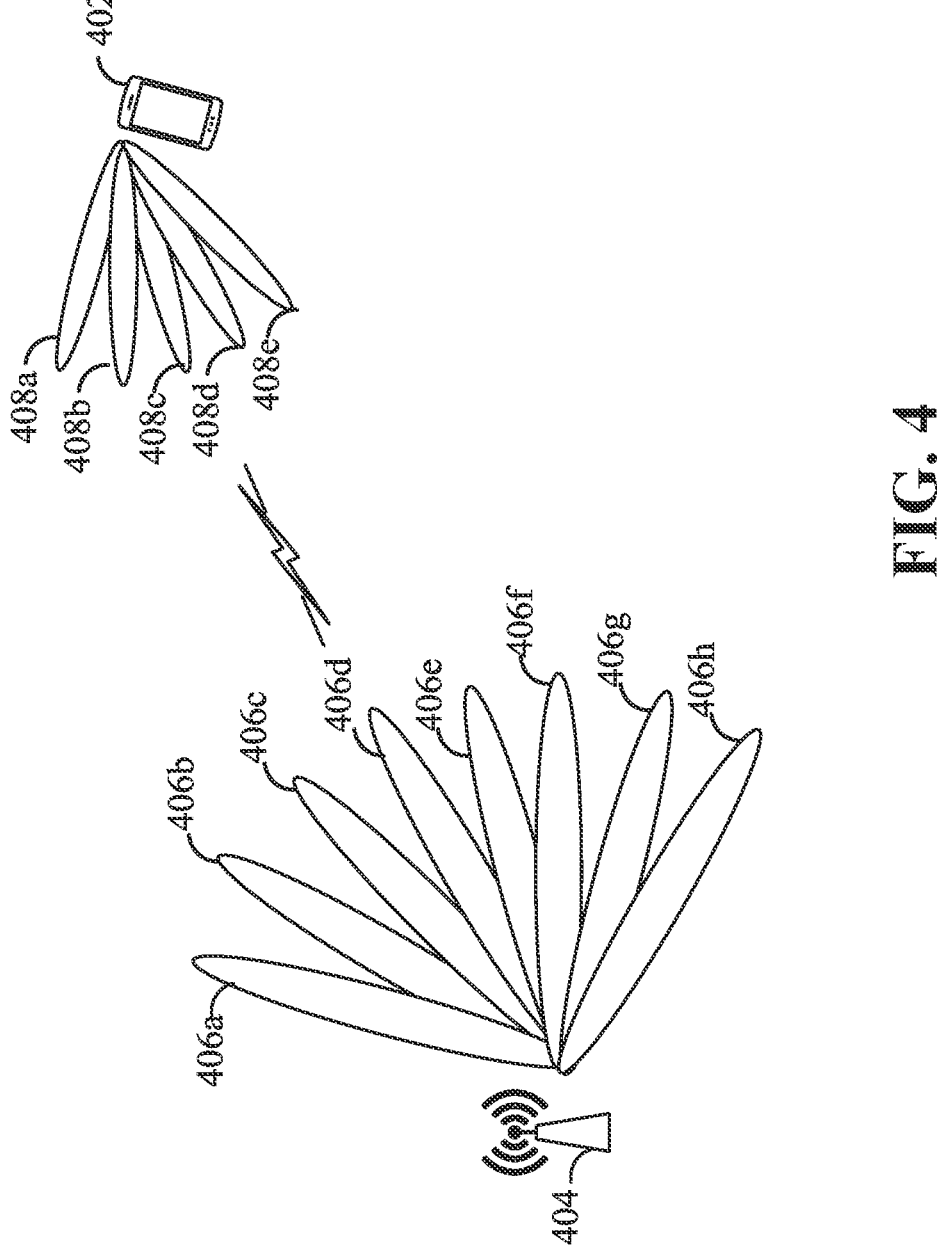
FIG. 4 is a diagram illustrating an example of communication between a base station and at least two user equipment (UEs) using beamforming according to some aspects.

FIG. 4 is a diagram illustrating communication between a base station 404 and a UE 402 using beamformed signals according to some aspects. The base station 404 may be any of the base stations (e.g., gNBs) or scheduling entities illustrated in FIGS. 1-3, and the UE 402 may be any of the UEs or scheduled entities illustrated in FIGS. 1-3.

The base station 404 may generally be capable of communicating with the UE 402 using one or more transmit beams, and the UE 402 may further be capable of communicating with the base station 404 using one or more receive beams. As used herein, the term transmit beam refers to a beam on the base station 404 that may be utilized for downlink or uplink communication with the UE 402. In addition, the term receive beam refers to a beam on the UE 402 that may be utilized for downlink or uplink communication with the base station 404.

In the example shown in FIG. 4, the base station 404 is configured to generate a plurality of transmit beams 406a, 406b, 406c, 406d, 406e, 406f, 406g, and 406h (406a-406h), each associated with a different spatial direction. In addition, the UE 402 is configured to generate a plurality of receive beams 408a, 408b, 408c, 408d, and 408e (408a-408e), each associated with a different spatial direction. It should be noted that while some beams are illustrated as adjacent to one another, such an arrangement may be different in different aspects. For example, transmit beams 406a-406h transmitted during a same symbol may not be adjacent to one another. In some examples, the base station 404 and UE 402 may each transmit more or less beams distributed in all directions (e.g., 360 degrees) and in three-dimensions. In addition, the transmit beams 406a-406h may include beams of varying beam width. For example, the base station 404 may transmit certain signals (e.g., synchronization signal blocks (SSBs)) on wider beams and other signals (e.g., CSI-RSs) on narrower beams.

The base station 404 and UE 402 may select one or more transmit beams 406a-406h on the base station 404 and one or more receive beams 408a-408e on the UE 402 for communication of uplink and downlink signals therebetween using a beam management procedure. In one example, during initial cell acquisition, the UE 402 may perform a P1 beam management procedure to scan the plurality of transmit beams 406a-406h on the plurality of receive beams 408a-408e to select a beam pair link (e.g., one of the transmit beams 406a-406h and one of the receive beams 408a-408e) for a physical random access channel (PRACH) procedure for initial access to the cell. For example, periodic SSB beam sweeping may be implemented on the base station 404 at certain intervals (e.g., based on the SSB periodicity). Thus, the base station 404 may be configured to sweep or transmit an SSB on each of a plurality of wider transmit beams 406a-406h during the beam sweeping interval. The UE may measure the reference signal received power (RSRP) of each of the SSB transmit beams on each of the receive beams of the UE and select the transmit and receive beams based on the measured RSRP. In an example, the selected receive beam may be the receive beam on which the highest RSRP is measured and the selected transmit beam may have the highest RSRP as measured on the selected receive beam.

After completing the PRACH procedure, the base station 404 and UE 402 may perform a P2 beam management procedure for beam refinement at the base station 404. For example, the base station 404 may be configured to sweep or transmit a CSI-RS on each of a plurality of narrower transmit beams 406a-406h. Each of the narrower CSI-RS beams may be a sub-beam of the selected SSB transmit beam (e.g., within the spatial direction of the SSB transmit beam). Transmission of the CSI-RS transmit beams may occur periodically (e.g., as configured via radio resource control (RRC) signaling by the gNB), semi-persistently (e.g., as configured via RRC signaling and activated/deactivated via medium access control—control element (MAC-CE) signaling by the gNB), or aperiodically (e.g., as triggered by the gNB via downlink control information (DCI)). The UE 402 is configured to scan the plurality of CSI-RS transmit beams 406a-406h on the plurality of receive beams 408a-408e. The UE 402 then performs beam measurements (e.g., RSRP, SINR, etc.) of the received CSI-RSs on each of the receive beams 408a-408e to determine the respective beam quality of each of the CSI-RS transmit beams 406a-406h as measured on each of the receive beams 408a-408e.

The UE 402 can then generate and transmit a Layer 1 (Li) measurement report, including the respective beam index (e.g., CSI-RS resource indicator (CRI)) and beam measurement (e.g., RSRP or SINR) of one or more of the CSI-RS transmit beams 406a-406h on one or more of the receive beams 408a-408e to the base station 404. The base station 404 may then select one or more CSI-RS transmit beams on which to communicate downlink and/or uplink control and/or data with the UE 402. In some examples, the selected CSI-RS transmit beam(s) have the highest RSRP from the Li measurement report. Transmission of the Li measurement report may occur periodically (e.g., as configured via RRC signaling by the gNB), semi-persistently (e.g., as configured via RRC signaling and activated/deactivated via MAC-CE signaling by the gNB), or aperiodically (e.g., as triggered by the gNB via DCI).

The UE 402 may further select a corresponding receive beam on the UE 402 for each selected serving CSI-RS transmit beam to form a respective beam pair link (BPL) for each selected serving CSI-RS transmit beam. For example, the UE 402 can utilize the beam measurements obtained during the P2 procedure or perform a P3 beam management procedure to obtain new beam measurements for the selected CSI-RS transmit beams to select the corresponding receive beam for each selected transmit beam. In some examples, the selected receive beam to pair with a particular CSI-RS transmit beam may be the receive beam on which the highest RSRP for the particular CSI-RS transmit beam is measured.

In some examples, in addition to performing CSI-RS beam measurements, the base station 404 may configure the UE 402 to perform SSB beam measurements and provide an Li measurement report containing beam measurements of SSB transmit beams 406a-406h. For example, the base station 404 may configure the UE 402 to perform SSB beam measurements and/or CSI-RS beam measurements for beam failure detection (BRD), beam failure recovery (BFR), cell reselection, beam tracking (e.g., for a mobile UE 402 and/or base station 404), or other beam optimization purpose.

In addition, when the channel is reciprocal, the transmit and receive beams may be selected using an uplink beam management scheme. In an example, the UE 402 may be configured to sweep or transmit on each of a plurality of receive beams 408a-408e. For example, the UE 402 may transmit an SRS on each beam in the different beam directions. In addition, the base station 404 may be configured to receive the uplink beam reference signals on a plurality of transmit beams 406a-406h. The base station 404 then performs beam measurements (e.g., RSRP, SINR, etc.) of the beam reference signals on each of the transmit beams 406a-406h to determine the respective beam quality of each of the receive beams 408a-408e as measured on each of the transmit beams 406a-406h.

The base station 404 may then select one or more transmit beams on which to communicate downlink and/or uplink control and/or data with the UE 402. In some examples, the selected transmit beam(s) have the highest RSRP. The UE 402 may then select a corresponding receive beam for each selected serving transmit beam to form a respective beam pair link (BPL) for each selected serving transmit beam, using, for example, a P3 beam management procedure, as described above.

In one example, a single CSI-RS transmit beam (e.g., beam 406d) on the base station 404 and a single receive beam (e.g., beam 408c) on the UE may form a single BPL used for communication between the base station 404 and the UE 402. In another example, multiple CSI-RS transmit beams (e.g., beams 406c, 406d, and 406e) on the base station 404 and a single receive beam (e.g., beam 408c) on the UE 402 may form respective BPLs used for communication between the base station 404 and the UE 402. In another example, multiple CSI-RS transmit beams (e.g., beams 406c, 406d, and 406e) on the base station 404 and multiple receive beams (e.g., beams 408c and 408d) on the UE 402 may form multiple BPLs used for communication between the base station 404 and the UE 402. In this example, a first BPL may include transmit beam 406c and receive beam 408c, a second BPL may include transmit beam 408d and receive beam 408c, and a third BPL may include transmit beam 408e and receive beam 408d.

Various aspects of the present disclosure will be described with reference to an OFDM waveform, schematically illustrated in FIG. 5. It should be understood by those of ordinary skill in the art that the various aspects of the present disclosure may be applied to an SC-FDMA waveform in substantially the same way as described herein below. That is, while some examples of the present disclosure may focus on an OFDM link for clarity, it should be understood that the same principles may be applied as well to SC-FDMA waveforms.

Figure 5:
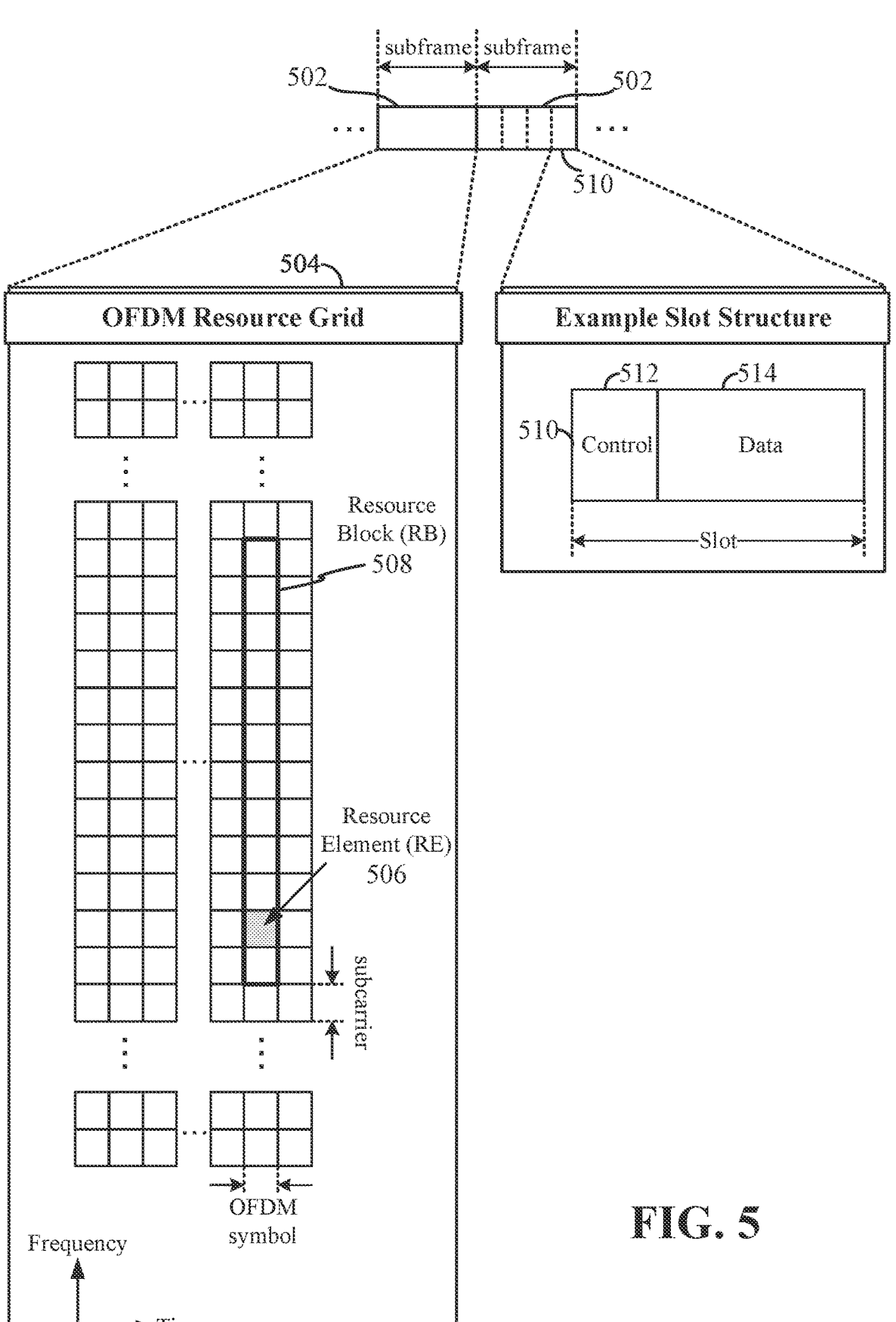
FIG. 5 is a schematic illustration of an organization of wireless resources in an air interface utilizing orthogonal frequency divisional multiplexing (OFDM) according to some aspects.

Referring now to FIG. 5, an expanded view of an exemplary DL subframe 502 is illustrated, showing an OFDM resource grid. However, as those skilled in the art will readily appreciate, the PHY transmission structure for any particular application may vary from the example described here, depending on any number of factors. Here, time is in the horizontal direction with units of OFDM symbols; and frequency is in the vertical direction with units of subcarriers.

The resource grid 504 may be used to schematically represent time-frequency resources for a given antenna port. That is, in a multiple-input-multiple-output (MIMO) implementation with multiple antenna ports available, a corresponding multiple number of resource grids 504 may be available for communication. The resource grid 504 is divided into multiple resource elements (REs) 506. An RE, which is 1 subcarrier×1 symbol, is the smallest discrete part of the time-frequency grid, and contains a single complex value representing data from a physical channel or signal. Depending on the modulation utilized in a particular implementation, each RE may represent one or more bits of information. In some examples, a block of REs may be referred to as a physical resource block (PRB) or a resource block (RB) 508, which contains any suitable number of consecutive subcarriers in the frequency domain. In one example, an RB may include 12 subcarriers, a number independent of the numerology used. In some examples, depending on the numerology, an RB may include any suitable number of consecutive OFDM symbols in the time domain. Within the present disclosure, it is assumed that a single RB such as the RB 508 entirely corresponds to a single direction of communication (either transmission or reception for a given device).

Scheduling of UEs (e.g., scheduled entities) for downlink or uplink transmissions typically involves scheduling one or more resource elements 506 within one or more sub-bands. Thus, a UE generally utilizes only a subset of the resource grid 504. In some examples, an RB may be the smallest unit of resources that can be allocated to a UE. Thus, the more RBs scheduled for a UE, and the higher the modulation scheme chosen for the air interface, the higher the data rate for the UE.

In this illustration, the RB 508 is shown as occupying less than the entire bandwidth of the subframe 502, with some subcarriers illustrated above and below the RB 508. In a given implementation, the subframe 502 may have a bandwidth corresponding to any number of one or more RBs 508. Further, in this illustration, the RB 508 is shown as occupying less than the entire duration of the subframe 502, although this is merely one possible example.

Each 1 ms subframe 502 may consist of one or multiple adjacent slots. In the example shown in FIG. 5, one subframe 502 includes four slots 510, as an illustrative example. In some examples, a slot may be defined according to a specified number of OFDM symbols with a given cyclic prefix (CP) length. For example, a slot may include 7 or 14 OFDM symbols with a nominal CP. Additional examples may include mini-slots, sometimes referred to as shortened transmission time intervals (TTIs), having a shorter duration (e.g., one to three OFDM symbols). These mini-slots or shortened transmission time intervals (TTIs) may in some cases be transmitted occupying resources scheduled for ongoing slot transmissions for the same or for different UEs. Any number of resource blocks may be utilized within a subframe or slot.

An expanded view of one of the slots 510 illustrates the slot 510 including a control region 512 and a data region 514. In general, the control region 512 may carry control channels, and the data region 514 may carry data channels. Of course, a slot may contain all DL, all UL, or at least one DL portion and at least one UL portion. The structure illustrated in FIG. 5 is merely exemplary in nature, and different slot structures may be utilized, and may include one or more of each of the control region(s) and data region(s).

Although not illustrated in FIG. 5, the various REs 506 within a RB 508 may be scheduled to carry one or more physical channels, including control channels, shared channels, data channels, etc. Other REs 506 within the RB 508 may also carry pilots or reference signals. These pilots or reference signals may provide for a receiving device to perform channel estimation of the corresponding channel, which may enable coherent demodulation/detection of the control and/or data channels within the RB 508.

In some examples, the slot 510 may be utilized for broadcast or unicast communication. For example, a broad-cast, multicast, or groupcast communication may refer to a point-to-multipoint transmission by one device (e.g., a base station, UE, or other similar device) to other devices. Here, a broadcast communication is delivered to all devices, whereas a multicast communication is delivered to multiple intended recipient devices. A unicast communication may refer to a point-to-point transmission by a one device to a single other device.

In an example of cellular communication over a cellular carrier via a Uu interface, for a DL transmission, the scheduling entity (e.g., a base station) may allocate one or more REs 506 (e.g., within the control region 512) to carry DL control information including one or more DL control channels, such as a physical downlink control channel (PDCCH), to one or more scheduled entities (e.g., UEs). The PDCCH carries downlink control information (DCI) including but not limited to power control commands (e.g., one or more open loop power control parameters and/or one or more closed loop power control parameters), scheduling information, a grant, and/or an assignment of REs for DL and UL transmissions. The PDCCH may further carry HARQ feedback transmissions such as an acknowledgment (ACK) or negative acknowledgment (NACK). HARQ is a technique well-known to those of ordinary skill in the art, wherein the integrity of packet transmissions may be checked at the receiving side for accuracy, e.g., utilizing any suitable integrity checking mechanism, such as a checksum or a cyclic redundancy check (CRC). If the integrity of the transmission is confirmed, an ACK may be transmitted, whereas if not confirmed, a NACK may be transmitted. In response to a NACK, the transmitting device may send a HARQ retransmission, which may implement chase combining, incremental redundancy, etc.

The base station may further allocate one or more REs 506 (e.g., in the control region 512 or the data region 514) to carry other DL signals, such as a demodulation reference signal (DMRS); a phase-tracking reference signal (PT-RS); a channel state information (CSI) reference signal (CSI-RS); and a synchronization signal block (SSB). SSBs may be broadcast at regular intervals based on a periodicity (e.g., 5, 10, 20, 40, 80, or 140 ms). An SSB includes a primary synchronization signal (PSS), a secondary synchronization signal (SSS), and a physical broadcast control channel (PBCH). A UE may utilize the PSS and SSS to achieve radio frame, subframe, slot, and symbol synchronization in the time domain, identify the center of the channel (system) bandwidth in the frequency domain, and identify the physical cell identity (PCI) of the cell.

The PBCH in the SSB may further include a master information block (MIB) that includes various system information, along with parameters for decoding a system information block (SIB). The SIB may be, for example, a SystemInformationType 1 (SIB1) that may include various additional system information. Examples of system information transmitted in the MIB may include, but are not limited to, a subcarrier spacing, system frame number, a configuration of a PDCCH control resource set (CORESET) (e.g., PDCCH CORESET0), and a search space for SIB1. Examples of additional system information transmitted in the SIB1 may include, but are not limited to, a random access search space, downlink configuration information, and uplink configuration information. The MIB and SIB1 together provide the minimum system information (SI) for initial access.

In an UL transmission, the scheduled entity (e.g., UE) may utilize one or more REs 506 to carry UL control information (UCI) including one or more UL control channels, such as a physical uplink control channel (PUCCH), to the scheduling entity. UCI may include a variety of packet types and categories, including pilots, reference signals, and information configured to enable or assist in decoding uplink data transmissions. Examples of uplink reference signals may include a sounding reference signal (SRS) and an uplink DMRS. In some examples, the UCI may include a scheduling request (SR), e.g., request for the scheduling entity to schedule uplink transmissions. Here, in response to the SR transmitted on the UCI, the scheduling entity may transmit downlink control information (DCI) that may schedule resources for uplink packet transmissions. UCI may also include HARQ feedback, channel state feedback (CSF), such as a CSI report, or any other suitable UCI.

In addition to control information, one or more REs 506 (e.g., within the data region 514) may be allocated for data traffic. Such data traffic may be carried on one or more traffic channels, such as, for a DL transmission, a physical downlink shared channel (PDSCH); or for an UL transmission, a physical uplink shared channel (PUSCH). In some examples, one or more REs 506 within the data region 514 may be configured to carry other signals, such as one or more SIBs and DMRSs.

In an example of sidelink communication over a sidelink carrier via a proximity service (ProSe) PC5 interface, the control region 512 of the slot 510 may include a physical sidelink control channel (PSCCH) including sidelink control information (SCI) transmitted by an initiating (transmitting) sidelink device (e.g., V2X or other sidelink device) towards a set of one or more other receiving sidelink devices. The data region 514 of the slot 510 may include a physical sidelink shared channel (PSSCH) including sidelink data traffic transmitted by the initiating (transmitting) sidelink device within resources reserved over the sidelink carrier by the transmitting sidelink device via the SCI. Other information may further be transmitted over various REs 506 within slot 510. For example, HARQ feedback information may be transmitted in a physical sidelink feedback channel (PSFCH) within the slot 510 from the receiving sidelink device to the transmitting sidelink device. In addition, one or more reference signals, such as a sidelink SSB and/or a sidelink CSI-RS, may be transmitted within the slot 510.

These physical channels described above are generally multiplexed and mapped to transport channels for handling at the medium access control (MAC) layer. Transport channels carry blocks of information called transport blocks (TB). The transport block size (TBS), which may correspond to a number of bits of information, may be a controlled parameter, based on the modulation and coding scheme (MCS) and the number of RBs in a given transmission.

The channels or carriers described herein are not necessarily all of the channels or carriers that may be utilized between a scheduling entity and scheduled entities, and those of ordinary skill in the art will recognize that other channels or carriers may be utilized in addition to those illustrated, such as other traffic, control, and feedback channels.

In OFDM, to maintain orthogonality of the subcarriers or tones, the subcarrier spacing may be equal to the inverse of the symbol period. A numerology of an OFDM waveform refers to its particular subcarrier spacing and cyclic prefix (CP) overhead. A scalable numerology refers to the capability of the network to select different subcarrier spacings, and accordingly, with each spacing, to select the corresponding symbol duration, including the CP length. With a scalable numerology, a nominal subcarrier spacing (SCS) may be scaled upward or downward by integer multiples. In this manner, regardless of CP overhead and the selected SCS, symbol boundaries may be aligned at certain common multiples of symbols (e.g., aligned at the boundaries of each 1 ms subframe). The range of SCS may include any suitable SCS. For example, a scalable numerology may support a SCS ranging from 15 kHz to 480 kHz.

Figure 6:
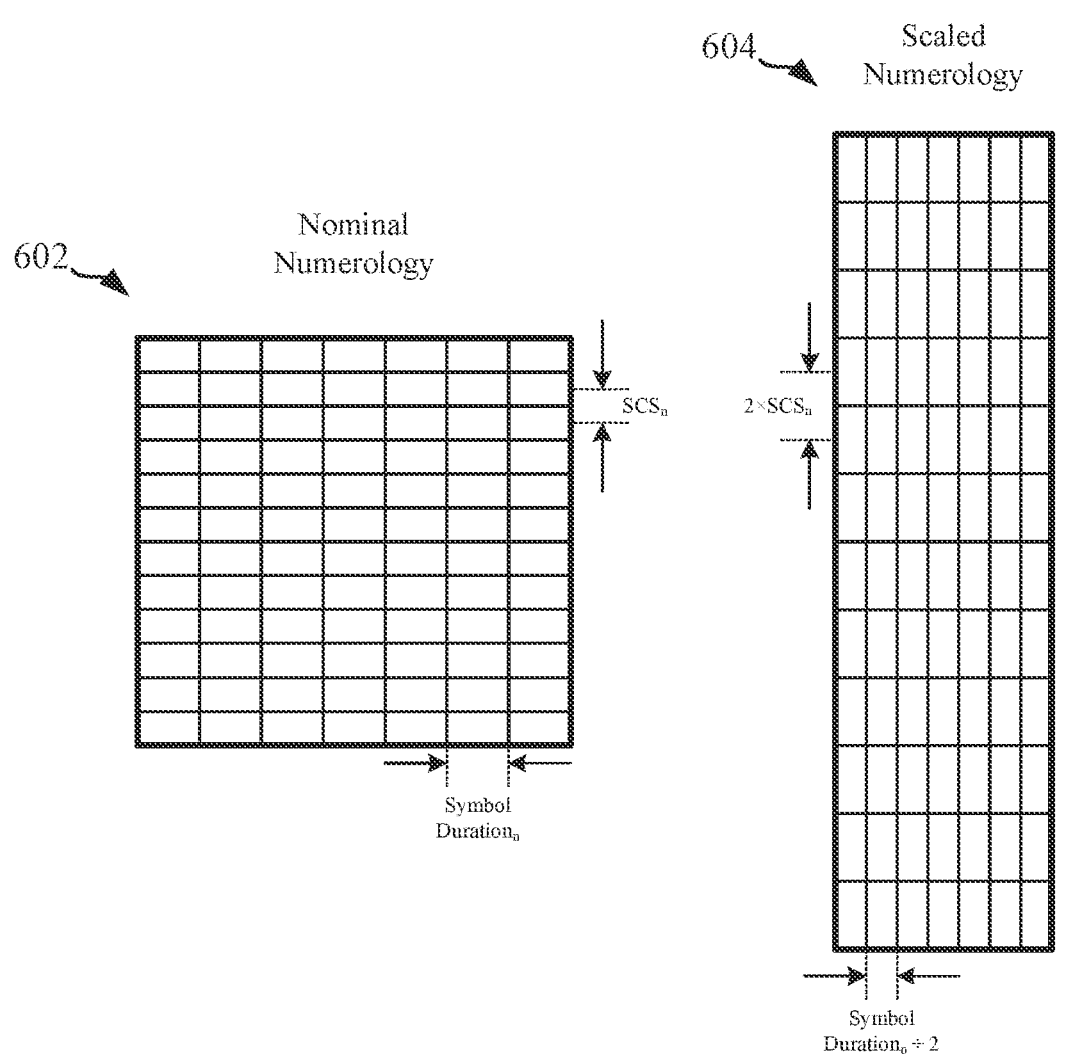
FIG. 6 is a schematic illustration of an OFDM air interface utilizing a scalable numerology according to some aspects.

To illustrate this concept of a scalable numerology, FIG. 6 shows a first RB 602 having a nominal numerology, and a second RB 604 having a scaled numerology. As one example, the first RB 602 may have a 'nominal' subcarrier spacing ($SCS_n$) of 30 kHz, and a 'nominal' symbol duration$_a$ of 333 μs. Here, in the second RB 604, the scaled numerology includes a scaled SCS of double the nominal SCS, or $2 \times SCS_n = 60$ kHz. Because this provides twice the bandwidth per symbol, it results in a shortened symbol duration to carry the same information. Thus, in the second RB 604, the scaled numerology includes a scaled symbol duration of half the nominal symbol duration, or (symbol duration$_n$)÷2= 167 s.

As described herein, CLI may occur when a network configures different TDD UL transmission and DL transmission slot formats to nearby user equipment (UEs). When an aggressor UE is transmitting an UL transmission, a victim UE may receive the UL transmission as CLI in the DL symbols if the aggressor UE's UL symbol collides with at least one DL symbol of the victim UE. In some aspects, CLI may occur between two or more UEs on the same cell or on different cells. In Release-16 New Radio (NR), the signaling procedure for a victim UE may be to measure CLI from an aggressor UE. The aggressor UE may not transmit a slot that is dedicated for CLI measurement by a victim UE and may not be aware that its UL transmission is measured by the victim UE. The network may configure one or more CLI measurement resources for the victim UE to measure the CLI of the UL transmission from the aggressor UE. After recording (e.g., measuring) one or more CLI measurements using the one or more CLI measurement resources of the UL transmission from the aggressor UE, the victim UE may transmit a CLI measurement report containing the one or more CLI measurements to the network so that the network may manage the scheduling of the aggressor UE and the victim UE to balance the throughput of both the aggressor UE and the victim UE.

Intelligent reflective surfaces (IRSs) may be used to mitigate CLI. An IRS may include a plurality of reconfigurable elements for receiving a signal having a first phase and/or a first amplitude and reflecting the signal so that the signal a second different phase and/or a second different amplitude. In some aspects, a scheduling entity may configure one or more of the reconfigurable elements to reflect a signal so that the phase and/or amplitude of the signal mitigates CLI at a UE. In some aspects, reflection may be passive with amplitude of each element in [0,1] and phase shift in [0, 2π]. In some aspects, when an aggressor UE transmits an uplink (UL) signal, a victim UE may receive that UL signal. Additionally, an IRS may also receive the UL signal from the aggressor UE. Using one or more reconfigurable element of the IRS, a scheduling entity may cause a reflection of the signal off the IRS and the victim UE so that signal has a phase shift and/or an amplitude change to reduce the CLI caused by the UL at the victim UE, when the victim UE is receiving a downlink (DL) transmission from the scheduling entity. In some cases, an IRS may be used to increase a reception power of a transmission. In some cases, the IRS may create an additional wireless transmission path for a scheduling entity to transmit a DL transmission to a UE in order to bypass an obstruction between the scheduling entity and the UE. In some aspects, an IRS may be used to enhance coverage and avoid a cellular dead zone, enhance network throughput based on hybrid deployment of active base stations and access points and/or passive IRSs, enhance physical layer security by canceling a signal of an eavesdropper, wireless information and/or power transfer in an internet of things (IoT) network, and/or the like.

In some aspects, a scheduling entity may be in electronic communication with an IRS and may configure the IRS to create a reflection of a CLI originating from an aggressor UE and reflected towards a victim UE. The aggressor UE may also transmit the same CLI directly to the victim UE. The scheduling entity may configure the IRS by selecting one or more reflection coefficients to change an amplitude or phase of the reflected CLI to cancel or degrade the CLI received directly from the aggressor UE. To facilitate the configuration of the IRS and cancelation or degradation of the CLI, the scheduling entity may configure special or dedicated CLI measurement resources. The scheduling entity may configure the special or dedicated CLI measurement resources for the UE to measure CLI measurements. The CLI measurements may be provided in a measurement report from the victim UE to the scheduling entity for evaluating different IRS coefficients for configuring the IRS.

Intelligent reflective surfaces (IRSs) may be used to mitigate CLI. An IRS may include a plurality of reconfigurable elements for receiving a signal having a first phase and/or a first amplitude and reflecting the signal so that the signal a second different phase and/or a second different amplitude. The scheduling entity may configure one or more of the reconfigurable elements to reflect a signal so that the phase and/or amplitude of the signal mitigates CLI at a UE. In some aspects, reflection may be passive with amplitude of each element in [0,1] and phase shift in [0, $2\pi$]. In some aspects, when an aggressor UE transmits an uplink (UL) signal, a victim UE may receive that UL signal. Additionally, an IRS may also receive the UL signal from the aggressor UE. Using one or more reconfigurable element of the IRS, a scheduling entity may cause a reflection of the signal off the IRS and the victim UE so that signal has a phase shift and/or an amplitude change to reduce the CLI caused by the UL at the victim UE, when the victim UE is receiving a downlink (DL) transmission from the scheduling entity. In some cases, an IRS may be used to increase a reception power of a transmission. In some cases, the IRS may create an additional wireless transmission path for a scheduling entity to transmit a DL transmission to a UE in order to bypass an obstruction between the scheduling entity and the UE. In some aspects, an IRS may be used to enhance coverage and avoid a cellular dead zone, enhance network throughput based on hybrid deployment of active base stations and access points and/or passive IRSs, enhance physical layer security by canceling a signal of an eavesdropper, wireless information and/or power transfer in an internet of things (IoT) network, and/or the like.

As described herein, a scheduling entity may be in electronic communication with an IRS and may configure the IRS to create a reflection of a CLI originating from an aggressor UE and reflected towards a victim UE. The aggressor UE may also transmit the same CLI directly to the victim UE. The scheduling entity may configure the IRS by selecting one or more reflection coefficients to change an amplitude or phase of the reflected CLI to cancel or degrade the CLI received directly from the aggressor UE. To facilitate the configuration of the IRS and cancelation or degradation of the CLI, the scheduling entity may configure special or dedicated CLI measurement resources. The scheduling entity may configure the special or dedicated CLI measurement resources for the UE to measure CLI measurements. The CLI measurements may be provided in a measurement report from the victim UE to the scheduling entity for evaluating different IRS coefficients for configuring the IRS.

Figure 7:
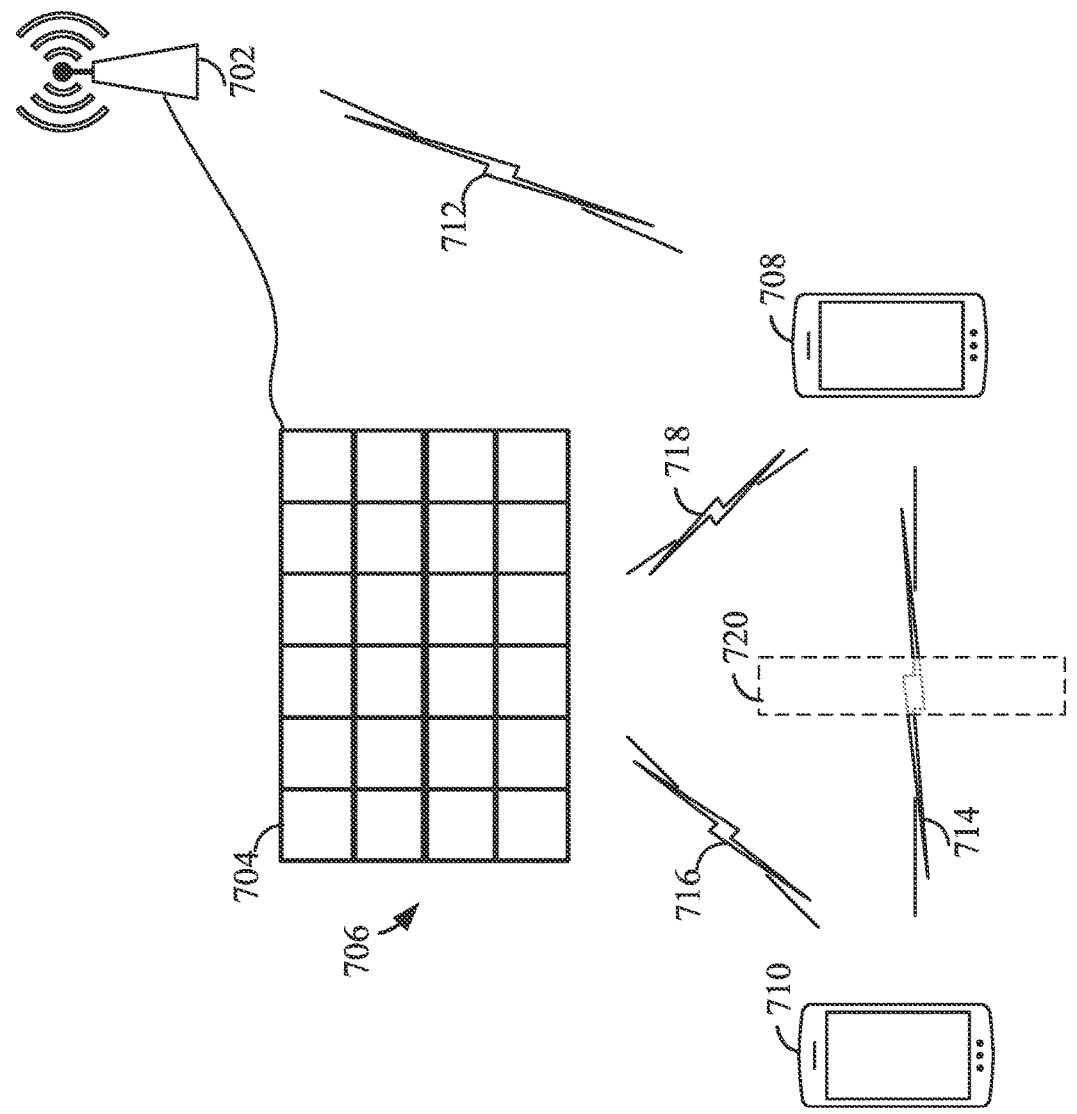
FIG. 7 is a conceptual diagram illustrating an example environment for CLI mitigation according to some aspects.

FIG. 7 is a conceptual diagram illustrating an example environment 700 for CLI mitigation according to some aspects. A shown in FIG. 7, the environment 700 may include a scheduling entity 702, an IRS 704 having a plurality of reconfigurable elements 706 (e.g., the squares), a victim UE 708, and an aggressor UE 710. The victim UE 708 may be receiving a downlink transmission 712 from the scheduling entity 702. At the same time, the aggressor UE 710 may be transmitting a message in a direct transmission 714 that causes CLI with receiving the downlink transmission 712. The aggressor UE 710 may also be transmitting the message in an IRS transmission 716 that is for reception by the IRS 704. Based on one or more IRS coefficients associated with one or more reconfigurable elements of the IRS 704, the IRS 702 may reflect the message in a reflected transmission 718 to the victim UE 708. In some aspects, the reflected transmission 718 may cause a low of level of CLI mitigation between the DL transmission 712 and the direct transmission 714 so that the victim UE 708 is unable to receive the DL transmission 712 from the scheduling entity 702.

The scheduling entity 702 may provide an indication to the victim UE 708 of one or more CLI measurement resource associated with the transmission 714 for determining one or more CLI measurement parameter. The victim UE 708 may identify the CLI measurement resources, determine one or more measurement parameters associated with each of the CLI measurement resources, and transmit one or more CLI measurement report to the scheduling entity 702 including the one or more measurement parameters and an indication (e.g., a sequency for determining) of a one or more IRS coefficients associated with each of the one or more measurement parameters. The scheduling entity 702 may determine one or more suitable configured IRS coefficients based on the CLI measurement report for mitigating the CLI caused by the direct transmission 714 from the aggressor UE 710. When the scheduling entity 702 transmits the DL transmission 712 to the victim UE 708 while the aggressor UE 710 transmit the IRS transmission 716 and the direct transmission 714, the IRS 704 may use the configured IRS coefficients to reflect the reflected transmission 718 to cause a higher of level of CLI mitigation between the DL transmission 712 and the direct transmission 714 so that the victim UE 708 is able to receive the DL transmission 712 from the scheduling entity 702.

In some aspects, the IRS 704 may be used to increase the reception power of the message transmitted in the direct transmission 714. For example, as shown in FIG. 7, the environment 700 may also include an obstruction 720 that is obstructing the pathway of the direct transmission 714. As similarly described herein, the scheduling entity 702 may determine one or more suitable configured IRS coefficients based on a CLI measurement report for increasing the reception power of the transmission 714 containing the message. When the aggressor UE 710 transmits the IRS transmission 716 and the direct transmission 714, the IRS 704 may use the configured IRS coefficients to reflect the reflected transmission 718 bypassing the obstruction 720 and increasing the reception power of the message so that the victim UE 708 is able to receive the message from the aggressor UE 710 even though the obstruction 720 is in the pathways of the direct transmission 714.

Figure 8:
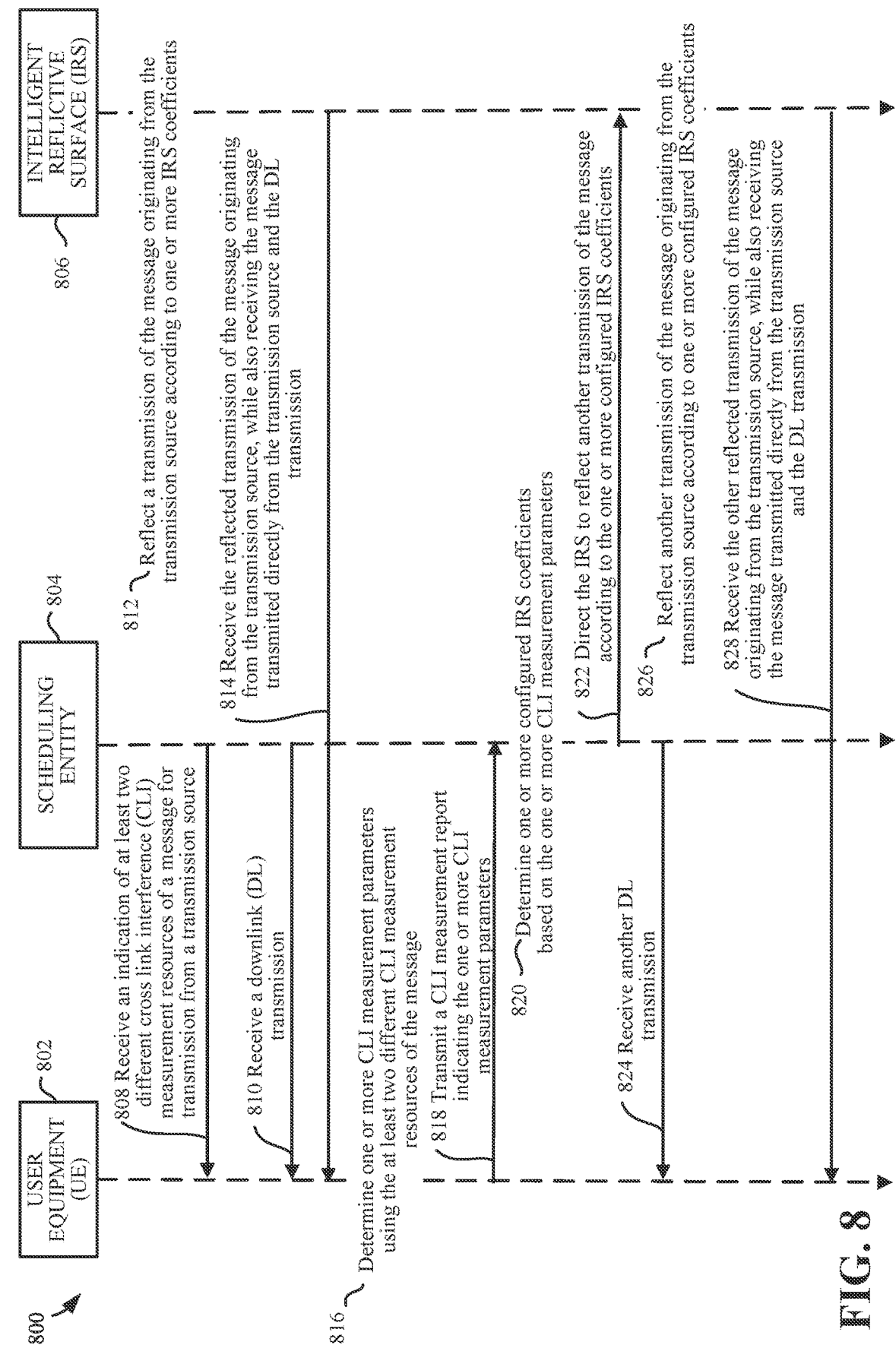
FIG. 8 is a conceptual diagram illustrating an example environment for CLI mitigation according to some aspects.

FIG. 8 is a conceptual diagram illustrating an example environment for CLI mitigation according to some aspects. In the example shown in FIG. 8, a user equipment (UE) 802 (e.g., a victim UE) is in wireless communication with a scheduling entity 804 over one or more wireless communication links. An intelligent reflective surface (IRS) 806 is in electronic communication with the scheduling entity 804 and is positioned to receive a transmitted message from an transmission source (e.g., an aggressor UE) and to reflect the transmitted message for reception by the UE 802. Each of the UE 802, the scheduling entity 804, and the IRS 806 may correspond to any of the entities, gNodeBs, UEs, or the like as shown in FIGS. 1-4 and 7.

At 808, the scheduling entity 804 may transmit to the UE 802 an indication of at least two different cross link interference (CLI) measurement resources of a message for transmission from a transmission source (e.g., an aggressor UE). In some aspects, the indication may be included in configuration information provided by the scheduling entity 804 in a downlink (DL) transmission to the UE 802. For example, the scheduling entity 804 may configure one or more CLI measurement resources for evaluating one or more different IRS coefficients and/or phases of the IRS. In some aspects, at least one CLI measurement resource may be an SRS. In at least this case, the at least one CLI measurement resource may be used to determine one or more CLI measurement parameters such as a CQI metric (e.g., an RSRP metric). In some aspects, the CLI measurement resource may be from a message that may be an uplink (UL) signal from the transmission source. In at least this case, the at least one CLI measurement resource may be used to determine one or more CLI measurement parameters such as a received signal strength metric (e.g., an RSSI metric). Based on the RSSI from different CLI measurement resources as reported by the UE 802, the scheduling entity 804 may be able to select one or more IRS coefficients for reflection of a message from the transmission source to mitigate CLI.

Figure 9:
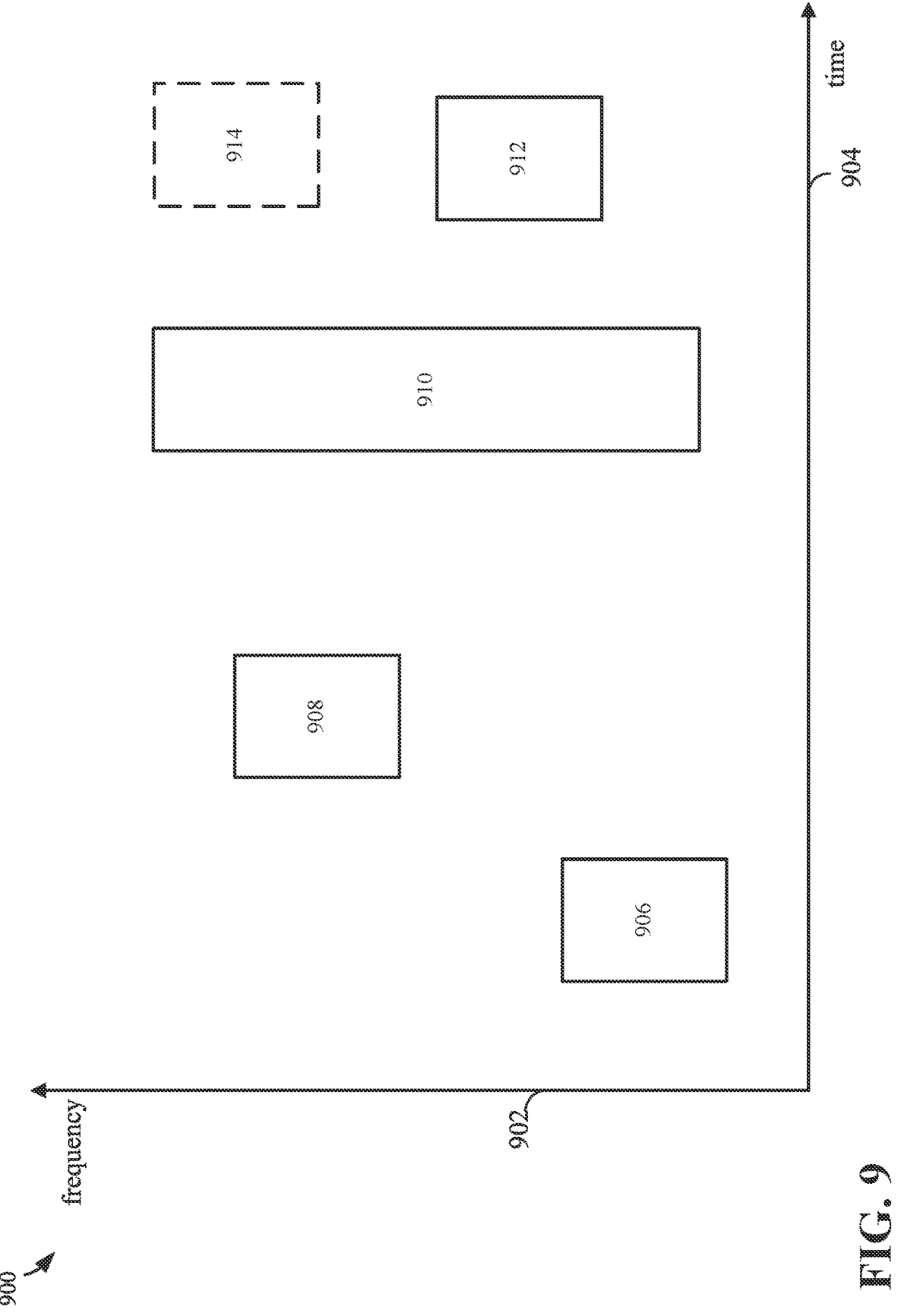
FIG. 9 illustrates an example graph of different CLI measurement resources according to some aspects.

In some aspects, when the one or more CLI measurement parameters includes an RSSI metric, different resource locations (e.g., time and/or frequency) may be with different configurations of IRS coefficients. FIG. 9 illustrates an example graph 900 of different CLI measurement resources according to some aspects. As shown in FIG. 9, the graph 900 includes a y-axis 902 representing frequency (e.g., the frequency domain), an x-axis 904 representing time (e.g., the time domain), a first CLI measurement resource 906, a second CLI measurement resource 908, a third CLI measurement resource 910, a fourth CLI measurement resource 912, and fifth CLI measurement resource 914. In some aspects, the first CLI measurement resource 906 and the third CLI measurement resource 910 may have a same IRS coefficient. Using L3 filtering, the first CLI measurement resource 906 and the third CLI measurement resource 910 may be measured and filtered using a same L3 filter. In some aspects, the second CLI measurement resource 908 and the fourth CLI measurement resource 912 may have a different IRS coefficients. In some aspects, the fifth CLI measurement resource 914 may be without an IRS reflected message (e.g., signal).

In some aspects, the scheduling entity 804 may configure one or more CLI measurement resources and one or more IRS patterns. For example, the UE 802 may use both the CLI measurement resources and the one or more IRS patterns for generating a measurement report. Each one or more CLI measurement parameters determined according to a particular IRS pattern may be filtered and reported while being correlated to a same IRS coefficient. In some aspects, the scheduling entity 804 (e.g., a network associated with the scheduling entity 804) may configure both the one or more CLI measurement resources and the related IRS patterns.

Figures 10A, 10B:
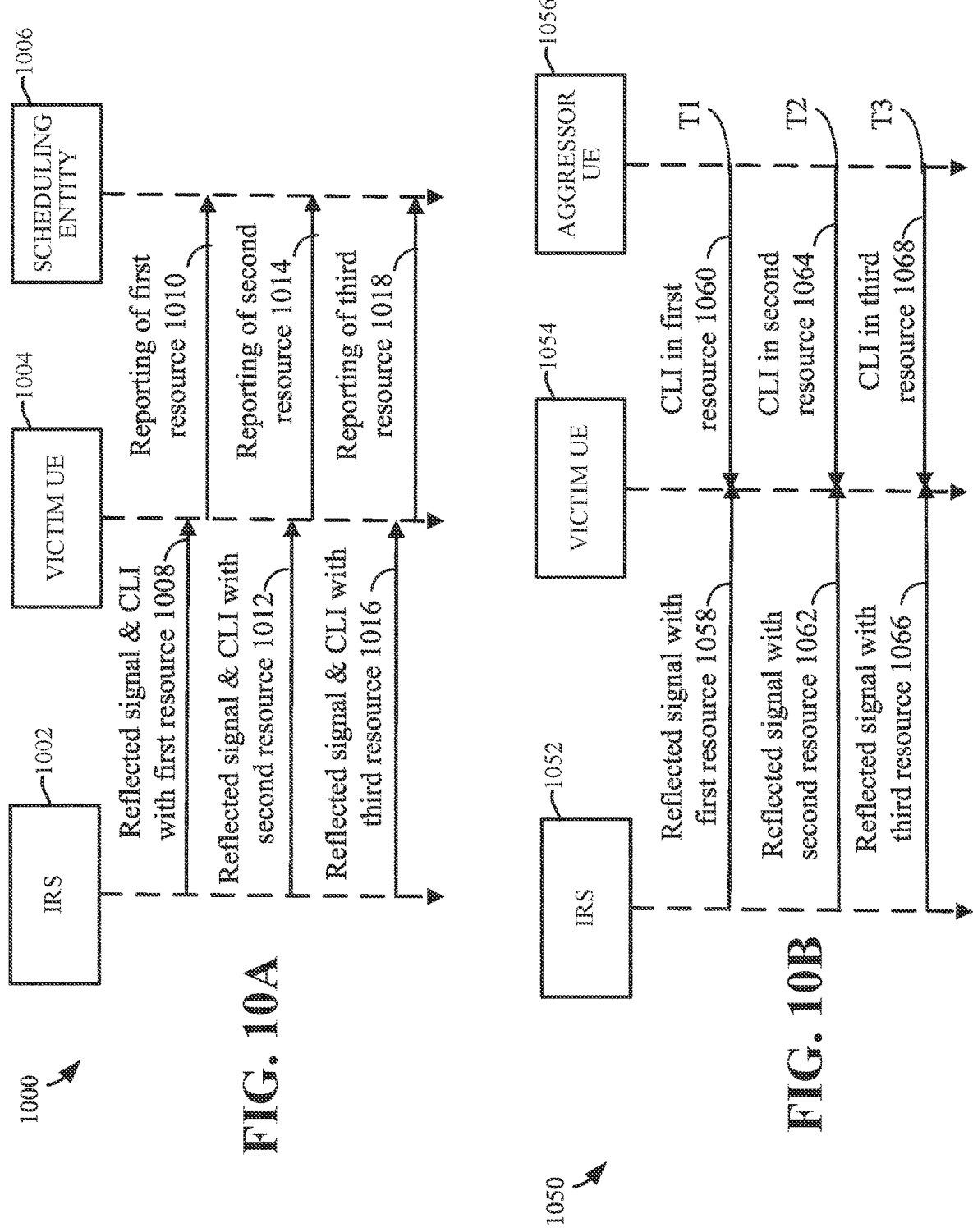
FIG. 10A illustrates a first example environment for configuring both CLI measurement resources and related IRS patterns for reporting according to some aspects.
FIG. 10B illustrates a second example environment for configuring both CLI measurement resources and related IRS patterns for reporting according to some aspects.

FIG. 10A illustrates a first example environment 1000 for configuring both CLI measurement resources and related IRS patterns for reporting according to some aspects. As shown in FIG. 10A, the environment 1000 may include an IRS 1002, a victim UE 1004, and a scheduling entity 1006. Each of the IRS 1002, the victim UE 1004, and the scheduling entity 1006 may correspond to any of the entities, gNodeBs, UEs, or the like as shown in FIGS. 1-4, 7, and 8. At 1008, the IRS 1002 may reflect a message to the victim UE 1004 having a first phase and a first amplitude in a first CLI measurement resource. At 1010, the victim UE 1004 may receive the message and report the first phase and the first amplitude for the first CLI measurement resource to the scheduling entity 1006. Subsequently, at 1012, the IRS 1002 may reflect the message to the victim UE 1004 having a second phase and a second amplitude in a second CLI measurement resource. At 1014, the victim UE 1004 may receive the message and report the second phase and the second amplitude for the second CLI measurement resource to the scheduling entity 1006. Subsequently, at 1016, the IRS 1002 may reflect the message to the victim UE 1004 having a third phase and a third amplitude in a third CLI measurement resource. At 1018, the victim UE 1004 may receive the message and report the third phase and the third amplitude for the third CLI measurement resource to the scheduling entity 1006. In some aspects, one IRS pattern may be defined and used for one CLI measurement resource. In some aspects, one CLI measurement resource may have an IRS pattern for evaluating multiple different IRS coefficients.

In some aspects, the one or more IRS patterns are indicated for different occasions of a CLI measurement resource. For example, the UE 802 may use one CLI measurement resource for measurement with one IRS pattern for evaluating different IRS coefficients. In some aspects, an IRS pattern identification (ID) may be used by the UE 802 and the scheduling entity 804 to identify a corresponding IRS pattern for applying an IRS coefficient.

FIG. 10B illustrates a second example environment 1050 for configuring both CLI measurement resources and related IRS patterns for reporting according to some aspects. As shown in FIG. 10B, the environment 1050 may include an IRS 1052, a victim UE 1054, and an aggressor UE 1056. Each of the IRS 1052, the victim UE 1054, and the aggressor UE 1056 may correspond to any of the entities, gNodeBs, UEs, or the like as shown in FIGS. 1-4, 7, 8, and 10A. At 1058, the IRS 1052 may reflect at a first time T1 a message to the victim UE 1054 originating from the aggressor UE 1056 and having a first phase and a first amplitude in a first CLI measurement resource. At 1060, the victim UE 1054 may receive at the first time T1 the first CLI measurement resource directly from the aggressor UE 1056. Subsequently, at 1062, the IRS 1052 may reflect at a second time T2 the message to the victim UE 1054 originating from the aggressor UE 1056 and having a second phase and a second amplitude in the first CLI measurement resource. At 1064, the victim UE 1054 may receive at the second time T2 the first CLI measurement resource directly from the aggressor UE 1056. Subsequently, at 1066, the IRS 1052 may reflect at a third time T3 the message to the victim UE 1054 originating from the aggressor UE 1056 and having a third phase and a third amplitude in the first CLI measurement resource. At 1068, the victim UE 1054 may receive at the third time T3 the first CLI measurement resource directly from the aggressor UE 1056. In some aspects, the scheduling entity 804 may apply three IRS patterns that correspond to as many as three IRS coefficients using the three occasions at T1, T2, and T3 of the first CLI measurement resource. The scheduling entity 804 may apply the three patterns that correspond to as many as three IRS coefficients by indicating which pattern may be paired with the first CLI measurement resource over which occasion of the three occasions.

In some aspects, a pattern of multiple IRS coefficients may be defined for one CLI measurement resource. For example, for a single CLI measurement resource, a time domain multiplex pattern of IRS coefficients may be included as a CLI-IRS resource configuration. In some aspects, the CLI-IRS resource configuration may be an extension of an existing 3GPP CLI measurement resource configuration with additional IRS pattern configuration included therewith. In some aspects, the IRS pattern configuration may include information such as a priority of the repetition of different IRS coefficients, a number of different IRS coefficients, an offset of the first occasion of the CLI measurement resource for each IRS coefficient, and/or the like. In some aspects, the UE 802 may reset the level 3 filter at the first occasion of a CLI measurement resource for each IRS coefficient to avoid a mixing and/or confusion of CLI measurement resources with different IRS coefficients in a same CLI measurement resource measurement.

In some aspects, a scheduling entity 804 may configure four (4) different IRS coefficient sequentially. In this case, every four consecutive occasions of a same CLI measurement resource may correspond with one IRS coefficient (e.g., over 80 ms worth of time for each IRS coefficient and an overall period of 320 ms). In some aspects, the UE 802 may reset the level 3 filter at the beginning of each set of four consecutive occasions of the same CLI measurement resources for the new IRS coefficient. In some aspects, the CLI measurement may be filtered on a per CLI measurement resource basis. In some aspect, the UE 802 may utilize multiple filterings for evaluating different IRS coefficients using a same CLI measurement resource.

Figure 11:
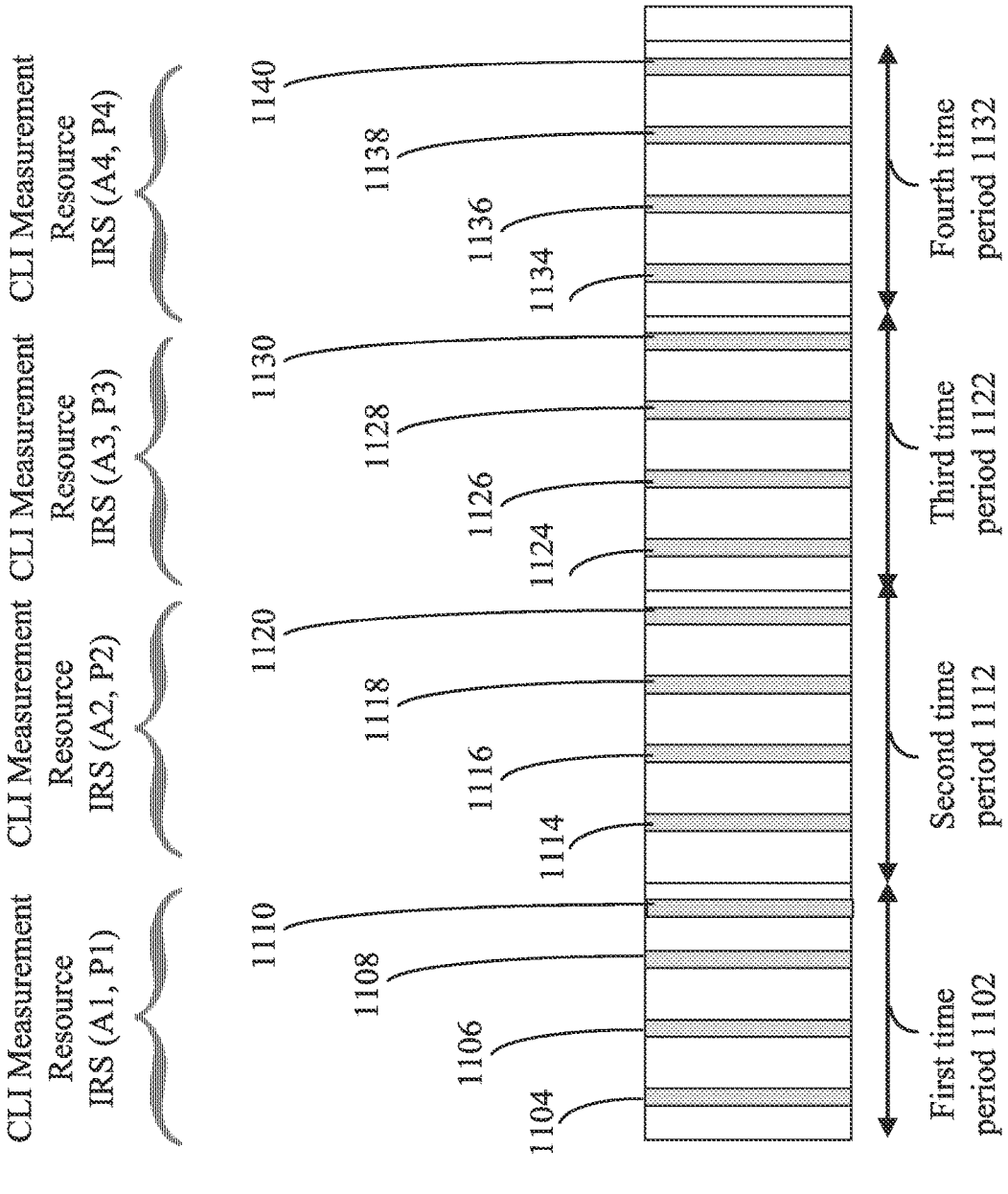
FIG. 11 illustrates an example period including multiple occasions of same consecutive CLI measurement resources for different IRS coefficients according to some aspects.

FIG. 11 illustrates an example period 1100 (e.g., 320 ms) including multiple occasions of same consecutive CLI measurement resources for different IRS coefficients according to some aspects. As shown in FIG. 11, the period 1100 includes a first time period 1102 (e.g., 80 ms) having a first instance of a CLI measurement resource 1104, a second instance of the CLI measurement resource 1106, a third instance of the CLI measurement resource 1108, and a fourth instance of the CLI measurement resource 1110. The first time period 1102 may be associated with a first IRS coefficient (e.g., a first phase and/or a first amplitude). At the beginning of the first time period 1102 (e.g., before (to the left of) the first instance of the CLI measurement resource 1104 within the first time period 1102), the UE 802 may reset the level 3 filter for measuring CLI measurement parameters from the CLI measurement resource associated with the first IRS coefficient. The period 1100 also includes a second time period 1112 (e.g., 80 ms) having a fifth instance of the CLI measurement resource 1114, a sixth instance of the CLI measurement resource 1116, a seventh instance of the CLI measurement resource 1118, and an eighth instance of the CLI measurement resource 1120. The second time period 1112 may be associated with a second IRS coefficient (e.g., a second phase and/or a second amplitude). At the beginning of the second time period 1112 (e.g., before (to the left of)

the fourth instance of the CLI measurement resource 1114 within the second time period 1112), the UE 802 may reset the level 3 filter for measuring CLI measurement parameters from the CLI measurement resource associated with the second IRS coefficient.

The period 1100 further includes a third time period 1122 (e.g., 80 ms) having a nineth instance of a CLI measurement resource 1124, a tenth instance of the CLI measurement resource 1126, an eleventh instance of the CLI measurement resource 1128, and a twelfth instance of the CLI measurement resource 1130. The third time period 1122 may be associated with a third IRS coefficient (e.g., a third phase and/or a third amplitude). At the beginning of the third time period 1122 (e.g., before (to the left of) the nineth instance of the CLI measurement resource 1124 within the third time period 1122), the UE 802 may reset the level 3 filter for measuring CLI measurement parameters from the CLI measurement resource associated with the third IRS coefficient. In addition, the period 1100 includes a fourth time period 1132 (e.g., 80 ms) having a thirteenth instance of the CLI measurement resource 1134, a fourteenth instance of the CLI measurement resource 11136, a fifteenth instance of the CLI measurement resource 1138, and a sixteenth instance of the CLI measurement resource 1140. The fourth time period 1132 may be associated with a fourth IRS coefficient (e.g., a fourth phase and/or a fourth amplitude). At the beginning of the fourth time period 1132 (e.g., before (to the left of) the thirteenth instance of the CLI measurement resource 1134 within the fourth time period 1132), the UE 802 may reset the level 3 filter for measuring CLI measurement parameters from the CLI measurement resource associated with the fourth IRS coefficient.

In some aspects, an IRS coefficient pattern identification (ID) may be used to describe a pattern of CLI instances for which measurements are collected and applied to a same filter and, thus, subject to a same IRS coefficient. The IRS coefficient pattern ID may be separately defined in the indication as an IRS pattern outside a CLI resource configuration described herein. For example, within a CLI resource configuration, an IRS pattern ID may be included to associate the IRS pattern with different occasions (e.g., instances) of a single CLI measurement resource. It should be understood that there may be multiple CLI resources from multiple aggressor UEs reflected by a same IRS coefficient.

In some aspects, the IRS coefficient pattern ID may be included in a new CLI resource configuration that includes an IRS pattern directly for measurement, filtering, and reporting. In this case, one CLI measurement resource may be used, an IRS pattern ID may be indexed to one IRS coefficient pattern, and the scheduling entity 804 (e.g., the network) may indicate a paring of the CLI measurement resource with an IRS pattern (e.g., use of an IRS coefficient). For example, an indication may include a new CLI resource configuration having a CLI resource configuration and an IRS coefficient pattern ID correlating to an IRS pattern configuration.

In some aspects, separate CLI measurement resources may be paired with different IRS coefficient patterns. For example, the scheduling entity 804 (e.g., the network) may configure different CLI measurement resources for the UE 802. These CLI measurement resources may correspond to a same CLI from the same transmission source (e.g., a same aggressor UE), but may be modified with different IRS coefficients. In this case, a current CLI measurement resource configuration may only support a simple periodic pattern. Additionally, or alternatively, the scheduling entity

804 may extend the CLI patterns allowing the UE 802 to run filters on join CLI-IRS measurement parameters. For example, one CLI measurement resource occasion may be associated with one slot every predetermined number (N) of slots. In some example, the scheduling entity 804 may not support one cluster of a predetermine cluster of a predetermined number (M) of consecutive CLI measurement resource occasions in the predetermined number of slots (M) every predetermine number (N) of slots. This time domain pattern may be included in the indication, for example, to avoid a scenario where an IRS changes an IRS coefficient frequently creating addition overhead.

Figures 12A, 12B:
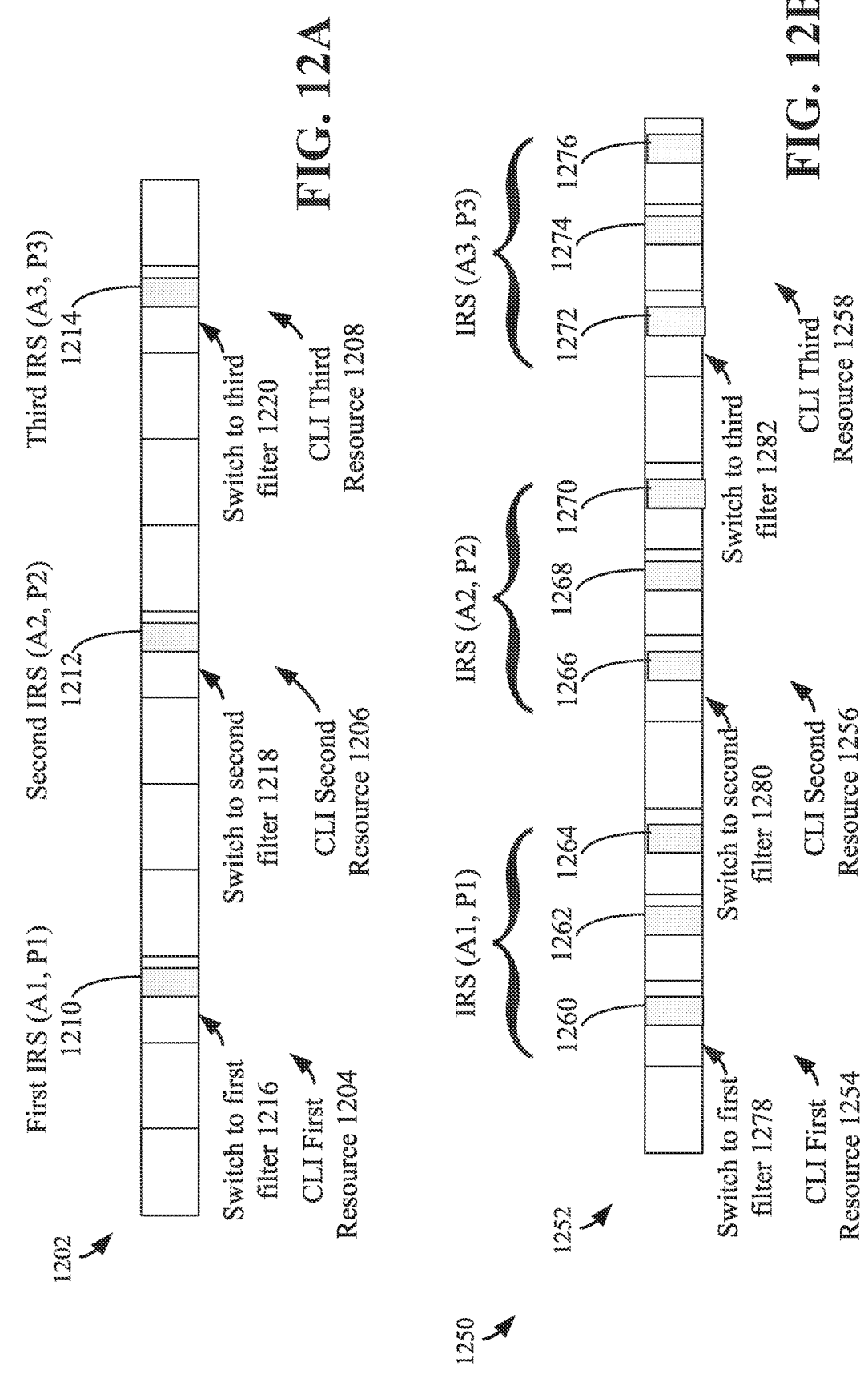
FIG. 12A illustrates an example CLI resource configuration according to some aspects.
FIG. 12B illustrates an example CLI resource configuration according to some aspects.

FIG. 12A illustrates an example CLI resource configuration 1200 according to some aspects. As shown in FIG. 12A, the CLI resource configuration 1200 include a plurality of slots 1202 including a first set of four slots 1204, a second set of four slots 1206, and a third set of four slots 1208. Each of the first set of four slots 1204, the second set of four slots 1206, and the third set of four slots 1208 include a CLI measurement resource. For example, the first set of four slots 1204 includes a first CLI measurement resource 1210, the second set of four slots 1206 includes a second CLI measurement resource 1212, and the third set of four slots 1208 includes a third CLI measurement resource 1214. The first CLI measurement resource 1210 may be associated with a first IRS coefficient (e.g., a first phase and/or a first amplitude). The second CLI measurement resource 1212 may be associated with a second IRS coefficient (e.g., a second phase and/or a second amplitude). The third CLI measurement resource 1214 may be associated with a third IRS coefficient (e.g., a third phase and/or a third amplitude). For each CLI measurement resource, the UE 802 may initiate a filter associated with the respective CLI measurement resource before (e.g., to the left of) the respective CLI measurement resource. For example, the UE 802 may initiate a first filter at a first time 1216 before the first CLI measurement resource 1210. As another example, the UE 802 may initiate a second filter at a second time 1218 before the second CLI measurement resource 1212. As yet anther example, the UE 802 may initiate a third filter at a third time 1220 before the third CLI measurement resource 1214. The CLI resource configuration 1200 may cause frequent filter resets and without the filtering gain.

FIG. 12B illustrates an example CLI resource configuration 1250 according to some aspects. As shown in FIG. 12B, the CLI resource configuration 1250 include a plurality of slots 1252 including a first set of four slots 1254, a second set of four slots 1256, and a third set of four slots 1258. Each of the first set of four slots 1254, the second set of four slots 1256, and the third set of four slots 1258 include three CLI measurement resources. For example, the first set of four slots 1254 includes a first CLI measurement resource 1260, a second CLI measurement resource 1262, and a third CLI measurement resource 1264. The second set of four slots 1256 includes a fourth CLI measurement resource 1266, a fifth CLI measurement resource 1268, and a sixth CLI measurement resource 1270. The third set of four slots 1258 includes a seventh CLI measurement resource 1272, an eighth CLI measurement resource 1274, and a nineth CLI measurement resource 1276. The first CLI measurement resource 1260, the second CLI measurement resource 1262, and the third CLI measurement resource 1264 may each be associated with a first IRS coefficient (e.g., a first phase and/or a first amplitude). The fourth CLI measurement resource 1266, the fifth CLI measurement resource 1268, and the sixth CLI measurement resource 1270 may each be associated with a second IRS coefficient (e.g., a second phase and/or a second amplitude). The seventh CLI measurement resource 1272, the eighth CLI measurement resource 1274, and the nineth CLI measurement resource 1276 may each be associated with a third IRS coefficient (e.g., a third phase and/or a third amplitude). For each set of three CLI measurement resources, the UE 802 may initiate a filter associated with the respective set of three CLI measurement resource before (e.g., to the left of) the initial CLI measurement resource of the set of three CLI measurement resources. For example, the UE 802 may initiate a first filter at a first time 1278 before the first CLI measurement resource 1260. As another example, the UE 802 may initiate a second filter at a second time 1280 before the fourth CLI measurement resource 1266. As yet another example, the UE 802 may initiate a third filter at a third time 1282 before the seventh CLI measurement resource 1272. The CLI resource configuration 1250 may provide increased filtering gain with three out of every four slots having a CLI measurement resource.

Continuing with FIG. 8, at 810, the scheduling entity 804 may transmit a downlink (DL) transmission for reception by the UE 802, at 812, the IRS 806 may reflect a transmission of the message originating from the transmission source according to one or more IRS coefficients and, at 814, the UE 702 may receive the reflected transmission of the message originating from the transmission source, while also receiving the message transmitted directly from the transmission source and the DL transmission. At 816, the UE 802 may determine one or more CLI measurement parameters using the at least two different CLI measurement resources of the message. For example, after the UE 802 receives the at least two different CLI measurement resources of the message, the UE 802 may determine one or more CLI measurements parameters of the message. The one or more CLI measurement parameters may include at least one of sound reference signal (SRS), a reference signal received power (RSRP), or a received signal strength indicator (RSSI).

At 818, the UE 802 may transmit a CLI measurement report including the one or more CLI measurements parameters to the scheduling entity 804. For example, after determining the one or more CLI measurement parameters, the UE 802 may transmit a measurement report to the scheduling entity 804 so that the scheduling entity 804 and/or a network associated with the scheduling entity 804 may determine one or more IRS coefficients (e.g., correlating with one or more optimal CLI measurement parameters of one or more CLI measurement resources) for reconfiguring one or more reconfigurable elements of the IRS 806.

Figure 13:
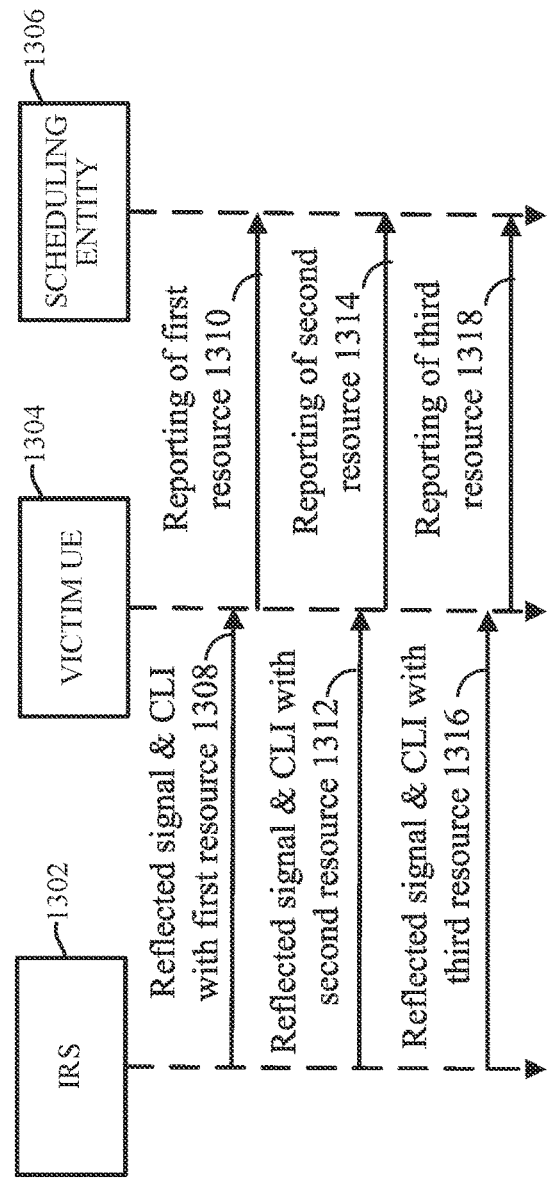
FIG. 13 illustrates an example environment for transmitting a CLI measurement report according to some aspects.

In some aspects, the CLI measurement report may include multiple occasions. FIG. 13 illustrates an example environment 1300 for transmitting a CLI measurement report according to some aspects. As shown in FIG. 13, the environment 1300 may include an IRS 1302, a victim UE 1304, and a scheduling entity 1306. Each of the IRS 1302, the victim UE 1304, and the scheduling entity 1306 may correspond to any of the entities, gNodeBs, UEs, or the like as shown in FIGS. 1-4, 7, 8, 10A, and 10B. The CLI measurement report may include multiple occasions with each CLI measurement resource having one IRS coefficient corresponding to one CLI measurement report. For example, at 1308, the IRS 1302 may reflect a message to the victim UE 1304 having a first phase and a first amplitude in a first CLI measurement resource. At 1310, the victim UE 1304 may receive the message and transmit a measurement report reporting the first phase and the first amplitude for the first CLI measurement resource to the scheduling entity 1306.

Subsequently, at 1312, the IRS 1302 may reflect the message to the victim UE 1304 having a second phase and a second amplitude in a second CLI measurement resource. At 1314, the victim UE 1304 may receive the message and transmit a measurement report reporting the second phase and the second amplitude for the second CLI measurement resource to the scheduling entity 1306. Subsequently, at 1316, the IRS 1302 may reflect the message to the victim UE 1304 having a third phase and a third amplitude in a third CLI measurement resource. At 1318, the victim UE 1304 may receive the message and transmit a measurement report reporting the third phase and the third amplitude for the third CLI measurement resource to the scheduling entity 1306. In some aspects, the victim UE 1304 may report at least one of a resource occasion, a resource index, or a resource location corresponding to a minimum CLI measurement strength. Additionally, or alternatively, the victim UE 1304 may report at least one of a maximum CLI measurement strength, a resource occasion, or a resource corresponding to the maximum CLI measurement strength, or the like.

In some aspects, the CLI measurement report may include each measurement parameter from each CLI measurement resource, occasions, and/or resource index. In some aspects, the CLI measurement report may transmitted in response to a trigger. For example, the scheduling entity 804 may determine one or more thresholds for triggering a transmission of a CLI measurement report. In some aspects, the threshold may be a high threshold signal strength or a low threshold signal strength. If a maximum signal strength is above a high threshold signal strength, this may be an indication that the corresponding coefficient should be avoided for usage by the IRS. If a minimum signal strength is below a low threshold signal strength, this may be an indication that the corresponding coefficient should be utilized by the IRS 806. In some aspects, the UE 802 may only report a resource index rather than a CLI measurement parameter. For example, the UE 802 may report for the scheduling entity 804 the CLI resource index (or occasion index) with the minimum value or the maximum value. As another example, the UE 802 may report for the scheduling entity 804 the CLI resource index (or occasion index) with values larger than a threshold or values smaller than a threshold. In some aspects, the UE 802 may report CLI measurement parameters. For example, the UE 802 may report for the scheduling entity 804 a corresponding RSSI or RSRP (or others) based on a CLI measurement resource type.

At 820, the scheduling entity 804 may determine one or more configured IRS coefficients based on the one or more CLI measurement parameters. For example, upon receiving the CLI measurement report for the UE 802, the scheduling entity 804 may determine which CLI measurement parameters are optimal for mitigating CLI caused by a transmission from a transmission source (e.g., an aggressor UE). Based on determining which CLI measurement parameter are optimal for mitigating CLI caused by a transmission from a transmission source, the scheduling entity 804 may determine one or more IRS coefficients that are correlated with the optimal CLI measurement parameters included in the CLI measurement report. At 822, the scheduling entity 804 may direct the IRS to reflect another transmission of the message according to the one or more configured IRS coefficients. At 824, the scheduling entity 804 may transmit another DL transmission to the UE 802, at 826, the IRS 806 may reflect another transmission of the message from the transmission source according to the one or more configured IRS coefficients, and, at 828, the UE 802 may receive the other reflected transmission of the message originating from the transmission source, while also receiving the message transmitted directly from the transmission source and the DL transmission.

For example, when the scheduling entity 804 transmits the DL transmission to the UE 802 while the transmission source transmit the message to the IRS 806 and directly to the UE 802, the IRS 806 may use the configured IRS coefficients to reflect the reflected transmission towards the UE 802 to cause a higher of level of CLI mitigation between the DL transmission and the transmission from the transmission source so that the UE 802 is able to receive the DL transmission from the scheduling entity 804. In some aspects, the IRS 806 may be used to increase the reception power of the message transmitted in the direct transmission from the transmission source to the UE 802. For example, an obstruction may be obstructing a transmission pathway between the UE 802 and the transmission source. As similarly described herein, the scheduling entity 804 may determine one or more suitable configured IRS coefficients based on a CLI measurement report for increasing the reception power of the message transmitted directly to the UE 802 from the transmission source. When the transmission source transmits the message to the IRS 806 and to the UE 802, the IRS 806 may use the configured IRS coefficients to reflect the transmission of message bypassing the obstruction and increasing the reception power of the message by the UE 802 so that the UE 802 is able to receive the message from the transmission source even though the obstruction is in the pathways of a direct transmission from the transmission source.

Figure 14:
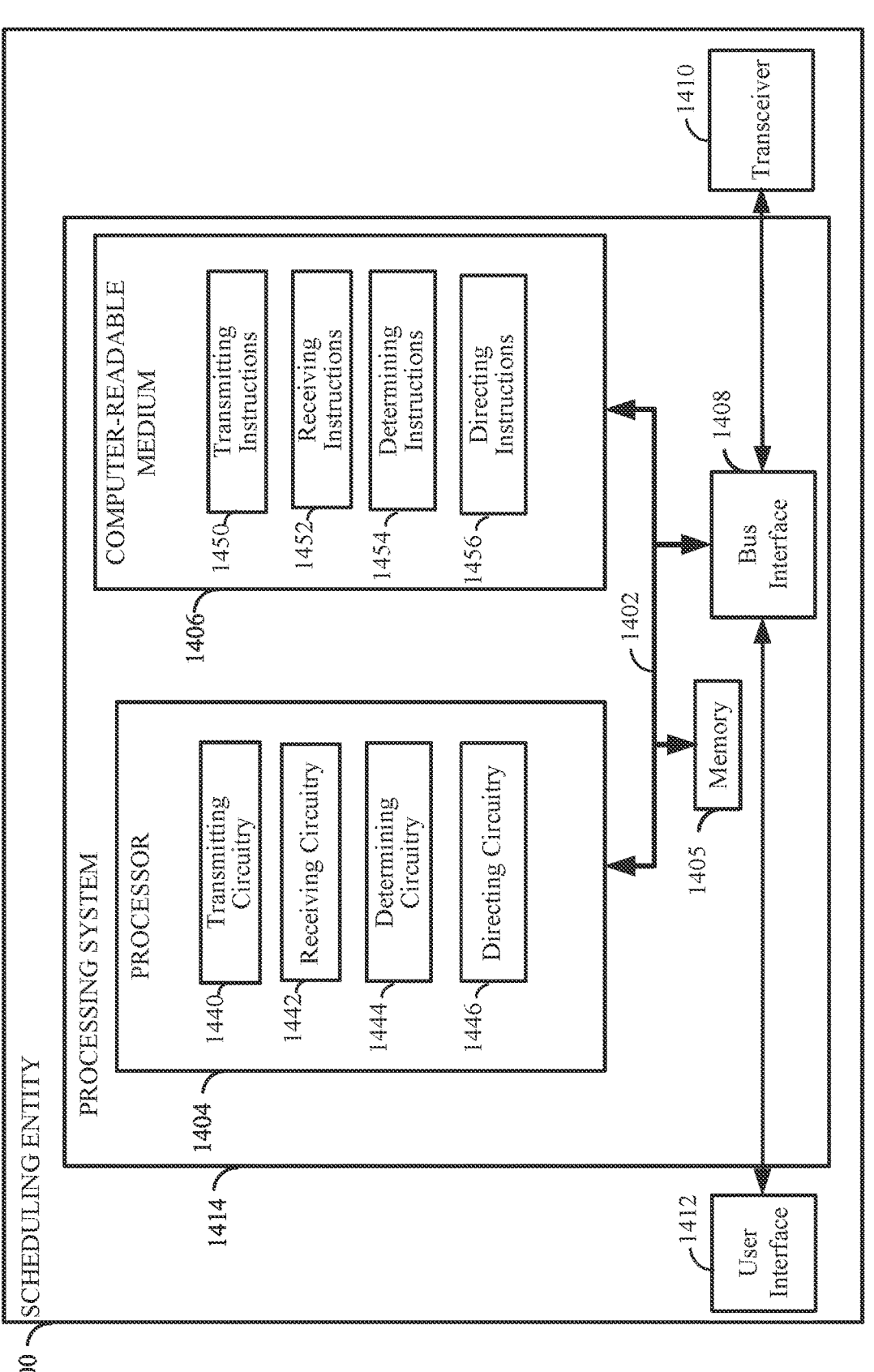
FIG. 14 is a block diagram conceptually illustrating an example of a hardware implementation for a scheduling entity according to some aspects.

FIG. 14 is a block diagram illustrating an example of a hardware implementation for a scheduling entity 1400 employing a processing system 1414. For example, the scheduling entity 1400 may be any of the user equipment (UEs) or base stations (e.g., gNB or eNB) illustrated in any one or more of FIGS. 1-4, 7, 8, 10A, 10B, and 13.

The scheduling entity 1400 may be implemented with a processing system 1414 that includes one or more processors 1404. Examples of processors 1404 include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. In various examples, the scheduling entity 1400 may be configured to perform any one or more of the functions described herein. That is, the processor 1404, as utilized in the scheduling entity 1400, may be used to implement any one or more of the processes described herein. The processor 1404 may in some instances be implemented via a baseband or modem chip and in other implementations, the processor 1404 may itself comprise a number of devices distinct and different from a baseband or modem chip (e.g., in such scenarios that may work in concert to achieve aspects discussed herein). And as mentioned above, various hardware arrangements and components outside of a baseband modem processor can be used in implementations, including RF-chains, power amplifiers, modulators, buffers, interleavers, adders/summers, etc.

In this example, the processing system 1414 may be implemented with a bus architecture, represented generally by the bus 1402. The bus 1402 may include any number of interconnecting buses and bridges depending on the specific application of the processing system 1414 and the overall design constraints. The bus 1402 communicatively couples together various circuits including one or more processors (represented generally by the processor 1404), and computer-readable media (represented generally by the computer-readable storage medium 1406). The bus 1402 may also link various other circuits such as timing sources, peripherals, voltage regulators, and power management circuits, which are well known in the art, and therefore, will not be described any further. A bus interface 1408 provides an interface between the bus 1402 and a transceiver 1410. The transceiver 1410 provides a means for communicating with various other apparatus over a transmission medium (e.g., air interface). A user interface 1412 (e.g., keypad, display, speaker, microphone, joystick) may also be provided.

The processor 1404 is responsible for managing the bus 1402 and general processing, including the execution of software stored on the computer-readable storage medium 1406. The software, when executed by the processor 1404, causes the processing system 1414 to perform the various functions described herein for any particular apparatus. The computer-readable storage medium 1406 may also be used for storing data that is manipulated by the processor 1404 when executing software.

One or more processors 1404 in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable storage medium 1406.

The computer-readable storage medium 1406 may be a non-transitory computer-readable medium. A non-transitory computer-readable medium includes, by way of example, a magnetic storage device (e.g., hard disk, floppy disk, magnetic strip), an optical disk (e.g., a compact disc (CD) or a digital versatile disc (DVD)), a smart card, a flash memory device (e.g., a card, a stick, or a key drive), a random access memory (RAM), a read only memory (ROM), a programmable ROM (PROM), an erasable PROM (EPROM), an electrically erasable PROM (EEPROM), a register, a removable disk, and any other suitable medium for storing software and/or instructions that may be accessed and read by a computer. The computer-readable storage medium 1406 may reside in the processing system 1414, external to the processing system 1414, or distributed across multiple entities including the processing system 1414. The computer-readable storage medium 1406 may be embodied in a computer program product. By way of example, a computer program product may include a computer-readable medium in packaging materials. Those skilled in the art will recognize how best to implement the described functionality presented throughout this disclosure depending on the particular application and the overall design constraints imposed on the overall system.

In some aspects of the disclosure, the processor 1404 may include circuitry configured for various functions. For example, the processor 1404 may include transmitting circuitry 1440 configured to transmit, to a user equipment (UE), an indication of at least two different cross link interference (CLI) measurement resources of a message for transmission from a transmission source. The transmitting circuitry 1440 may also be configured to transmit, to the UE, a downlink (DL) transmission, while the UE receives, from an intelligent reflecting surface (IRS), a reflected transmission of the message originating from the transmission source and the message transmitted directly from the transmission source, wherein the reflected transmission of the message is reflected by the IRS based on one or more IRS coefficients. The transmitting circuitry 1440 may be configured to execute transmitting instructions 1450 stored in the computer-readable storage medium 1406 to implement any of the one or more of the functions described herein.

The processor 1404 may also include receiving circuitry 1442 configured to receive, from the UE, a CLI measurement report indicating one or more measurements parameters from the at least two different CLI measurement resources of the message. The receiving circuitry 1442 may be configured to execute receiving instructions 1452 stored in the computer-readable storage medium 1406 to implement any of the one or more of the functions described herein. The processor 1404 may further include determining circuitry 1444 configured to determine one or more configured IRS coefficients based on one or more CLI measurement parameters. The determining circuitry 1444 may be configured to execute determining instructions 1454 stored in the computer-readable storage medium 1406 to implement any of the one or more of the functions described herein.

In addition, the processor 1404 may include directing circuitry 1446 configured to directing the IRS to reflect another reflected transmission of the message originating from the transmission source to the UE according to one or more configured IRS coefficients, while the UE also receives the message transmitted directly from the transmission source and the DL transmission from the scheduling entity, wherein the one or more configured IRS coefficients are configured based on the one or more CLI measurement parameters. The directing circuitry 1446 may be configured to execute directing instructions 1456 stored in the computer-readable storage medium 1406 to implement any of the one or more of the functions described herein.

FIG. 15 is a flow chart of a method 1500 for CLI mitigation according to some aspects. As described below, some or all illustrated features may be omitted in a particular implementation within the scope of the present disclosure, and some illustrated features may not be required for implementation of all aspects. In some examples, the method may be performed by the scheduling entity 1400, as described herein, and illustrated in FIG. 14, by a processor or processing system, or by any suitable means for carrying out the described functions.

At block 1502, the scheduling entity 1400 may transmit, to a user equipment (UE), an indication of at least two different cross link interference (CLI) measurement resources of a message for transmission from a transmission source. In some aspects, the indication may be included in configuration information provided by the scheduling entity 1400 in a downlink (DL) transmission to the UE. For example, the scheduling entity 804 may configure one or more CLI measurement resources for evaluating one or more different IRS coefficients and/or phases of the IRS. In some aspects, at least one CLI measurement resource may be an SRS. In at least this case, the at least one CLI measurement resource may be used to determine one or more CLI measurement parameters such as a CQI metric (e.g., an RSRP metric). In some aspects, the CLI measurement resource may be from a message that may be an uplink (UL) signal from the transmission source. In at least this case, the at least one CLI measurement resource may be used to determine one or more CLI measurement parameters such as a received signal strength metric (e.g., an RSSI metric). Based on the RSSI from different CLI measurement resources as reported by the UE, the scheduling entity 1400 may be able to select one or more IRS coefficients for reflection of a message from the transmission source to mitigate CLI.

In some aspects, when the one or more CLI measurement parameters includes an RSSI metric, different resource locations (e.g., time and/or frequency) may be with different configurations of IRS coefficients. In some aspects, the scheduling entity 1400 may configure one or more CLI measurement resources and one or more IRS patterns. For example, the UE may use both the CLI measurement resources and the one or more IRS patterns for generating a measurement report. Each one or more CLI measurement parameters determined according to a particular IRS pattern may be filtered and reported while being correlated to a same IRS coefficient. In some aspects, the scheduling entity 1400 (e.g., a network associated with the scheduling entity 1400) may configure both the one or more CLI measurement resources and the related IRS patterns.

In some aspects, one IRS pattern may be defined and used for one CLI measurement resource. In some aspects, one CLI measurement resource may have an IRS pattern for evaluating multiple different IRS coefficients. In some aspects, the one or more IRS patterns are indicated for different occasions of a CLI measurement resource. For example, the UE 802 may use one CLI measurement resource for measurement with one IRS pattern for evaluating different IRS coefficients. In some aspects, an IRS pattern identification (ID) may be used by the UE and the scheduling entity 1400 to identify a corresponding IRS pattern for applying an IRS coefficient.

In some aspects, a pattern of multiple IRS coefficients may be defined for one CLI measurement resource. For example, for a single CLI measurement resource, a time domain multiplex pattern of IRS coefficients may be included as a CLI-IRS resource configuration. In some aspects, the CLI-IRS resource configuration may be an extension of an existing 3GPP CLI measurement resource configuration with additional IRS pattern configuration included therewith. In some aspects, the IRS pattern configuration may include information such as a priority of the repetition of different IRS coefficients, a number of different IRS coefficients, an offset of the first occasion of the CLI measurement resource for each IRS coefficient, and/or the like. In some aspects, the UE may reset the level 3 filter at the first occasion of a CLI measurement resource for each IRS coefficient to avoid a mixing and/or confusion of CLI measurement resources with different IRS coefficients in a same CLI measurement resource measurement.

In some aspects, a scheduling entity 1400 may configure four (4) different IRS coefficient sequentially. In this case, every four consecutive occasions of a same CLI measurement resource may correspond with one IRS coefficient (e.g., over 80 ms worth of time for each IRS coefficient and an overall period of 320 ms). In some aspects, the UE 802 may reset the level 3 filter at the beginning of each set of four consecutive occasions of the same CLI measurement resources for the new IRS coefficient. In some aspects, the CLI measurement may be filtered on a per CLI measurement resource basis. In some aspect, the UE 802 may utilize multiple filterings for evaluating different IRS coefficients using a same CLI measurement resource.

In some aspects, an IRS coefficient pattern identification (ID) may be used to describe a pattern of CLI instances for which measurements are collected and applied to a same filter and, thus, subject to a same IRS coefficient. The IRS coefficient pattern ID may be separately defined in the indication as an IRS pattern outside a CLI resource configuration described herein. For example, within a CLI resource configuration, an IRS pattern ID may be included to associate the IRS pattern with different occasions (e.g., instances) of a single CLI measurement resource. It should be understood that there may be multiple CLI resources from multiple aggressor UEs reflected by a same IRS coefficient.

In some aspects, the IRS coefficient pattern ID may be included in a new CLI resource configuration that includes an IRS pattern directly for measurement, filtering, and reporting. In this case, one CLI measurement resource may be used, an IRS pattern ID may be indexed to one IRS coefficient pattern, and the scheduling entity 1400 (e.g., the network) may indicate a paring of the CLI measurement resource with an IRS pattern (e.g., use of an IRS coefficient). For example, an indication may include a new CLI resource configuration having a CLI resource configuration and an IRS coefficient pattern ID correlating to an IRS pattern configuration.

In some aspects, separate CLI measurement resources may be paired with different IRS coefficient patterns. For example, the scheduling entity 1400 (e.g., the network) may configure different CLI measurement resources for the UE. These CLI measurement resources may correspond to a same CLI from the same transmission source (e.g., a same aggressor UE), but may be modified with different IRS coefficients. In this case, a current CLI measurement resource configuration may only support a simple periodic pattern. Additionally, or alternatively, the scheduling entity 1400 may extend the CLI patterns allowing the UE to run filters on join CLI-IRS measurement parameters. For example, one CLI measurement resource occasion may be associated with one slot every predetermined number (N) of slots. In some example, the scheduling entity 1400 may not support one cluster of a predetermine cluster of a predetermined number (M) of consecutive CLI measurement resource occasions in the predetermined number of slots (M) every predetermine number (N) of slots. This time domain pattern may be included in the indication, for example, to avoid a scenario where an IRS changes an IRS coefficient frequently creating addition overhead.

The transmitting circuitry 1440 together with the transceiver 1410, shown and described above in connection with FIG. 14 may provide a means to transmit, to a user equipment (UE), an indication of at least two different cross link interference (CLI) measurement resources of a message for transmission from a transmission source.

At block 1504, the scheduling entity 1400 may transmit, to the UE, a downlink (DL) transmission, while the UE receives, from an intelligent reflecting surface (IRS), a reflected transmission of the message originating from the transmission source and the message transmitted directly from the transmission source, where the reflected transmission of the message is reflected by the IRS based on one or more IRS coefficients. The transmitting circuitry 1440 together with the transceiver 1410, shown and described above in connection with FIG. 14 may provide a means to transmit, to the UE, a downlink (DL) transmission, while the UE receives, from an intelligent reflecting surface (IRS), a reflected transmission of the message originating from the transmission source and the message transmitted directly from the transmission source, where the reflected transmission of the message is reflected by the IRS based on one or more IRS coefficients.

At block 1506, the scheduling entity 1400 may receive, from the UE, a CLI measurement report indicating one or more CLI measurements parameters from the at least two different CLI measurement resources of the message. For example, after determining the one or more CLI measurement parameters, the UE may transmit a measurement report to the scheduling entity 1400 so that the scheduling entity 804 and/or a network associated with the scheduling entity 1400 may determine one or more IRS coefficients (e.g., correlating with one or more optimal CLI measurement parameters of one or more CLI measurement resources) for reconfiguring one or more reconfigurable elements of the IRS. In some aspects, the CLI measurement report may include multiple occasions. In some aspects, the CLI measurement report may include each measurement parameter from each CLI measurement resource, occasions, and/or resource index. In some aspects, the CLI measurement report may transmitted in response to a trigger. For example, the scheduling entity 1400 may determine one or more thresholds for triggering a transmission of a CLI measurement report. In some aspects, the threshold may be a high threshold signal strength or a low threshold signal strength. If a maximum signal strength is above a high threshold signal strength, this may be an indication that the corresponding coefficient should be avoided for usage by the IRS. If a minimum signal strength is below a low threshold signal strength, this may be an indication that the corresponding coefficient should be utilized by the IRS.

In some aspects, the UE may only report a resource index rather than a CLI measurement parameter. For example, the UE may report for the scheduling entity 1400 the CLI resource index (or occasion index) with the minimum value or the maximum value. As another example, the UE may report for the scheduling entity 1400 the CLI resource index (or occasion index) with values larger than a threshold or values smaller than a threshold. In some aspects, the UE may report CLI measurement parameters. For example, the UE may report for the scheduling entity 1400 a corresponding RSSI or RSRP (or others) based on a CLI measurement resource type. In some aspects, the one or more CLI measurement parameters may include at least one of sound reference signal (SRS), a reference signal received power (RSRP), or a received signal strength indicator (RSSI). The determining circuitry 1444, shown and described above in connection with FIG. 14 may provide a means to determine one or more configured IRS coefficients based on the one or more CLI measurement parameters.

At block 1508, the scheduling entity 1400 may determine one or more configured IRS coefficients based on the one or more CLI measurement parameters, and, at block 1510, the scheduling entity 1400 may direct the IRS to reflect another transmission of the message originating from the transmission source according to the one or more configured IRS coefficients. The directing circuitry 1446, shown and described above in connection with FIG. 14 may provide a means to direct the IRS to reflect another transmission of the message originating from the transmission source according to the one or more configured IRS coefficients.

At block 1512, the scheduling entity 1400 may transmit, to the UE, another DL transmission, while the UE receives, from the IRS, a reflected transmission of the message originating from the transmission source and the message transmitted directly from the transmission source, where the reflected transmission of the message is reflected by the IRS using the one or more configured IRS coefficients. The transmitting circuitry 1440 together with the transceiver 1410, shown and described above in connection with FIG. 14 may provide a means to transmit, to the UE, another DL transmission, while the UE receives, from the IRS, a reflected transmission of the message originating from the transmission source and the message transmitted directly from the transmission source, where the reflected transmission of the message is reflected by the IRS using the one or more configured IRS coefficients.

When the scheduling entity 1400 transmits the DL transmission to the UE while the transmission source transmits the message to the IRS and directly to the UE, the IRS may use the configured IRS coefficients to reflect the reflected transmission towards the UE to cause a higher of level of CLI mitigation between the DL transmission and the transmission from the transmission source so that the UE is able to receive the DL transmission from the scheduling entity 1400. In some aspects, the IRS may be used to increase the reception power of the message transmitted in the direct transmission from the transmission source to the UE. For example, an obstruction may be obstructing a transmission pathway between the UE and the transmission source. As similarly described herein, the scheduling entity 1400 may determine one or more suitable configured IRS coefficients based on a CLI measurement report for increasing the reception power of the message transmitted directly to the UE from the transmission source. When the transmission source transmits the message to the IRS and to the UE, the IRS may use the configured IRS coefficients to reflect the transmission of message bypassing the obstruction and increasing the reception power of the message by the UE so that the UE is able to receive the message from the transmission source even though the obstruction is in the pathways of a direct transmission from the transmission source.

In one configuration, the scheduling entity 1400 includes means for performing the various functions and processes described in relation to FIG. 14. In one aspect, the aforementioned means may be the processor 1404 shown in FIG. 14 configured to perform the functions recited by the aforementioned means. In another aspect, the aforementioned means may be a circuit or any apparatus configured to perform the functions recited by the aforementioned means.

Of course, in the above examples, the circuitry included in the processor 1404 is merely provided as an example, and other means for carrying out the described functions may be included within various aspects of the present disclosure, including but not limited to the instructions stored in the computer-readable storage medium 1406, or any other suitable apparatus or means described in any one of the FIGS. 1-4, 7, 8, 10A, 10B, and 13 and utilizing, for example, the processes and/or algorithms described herein in relation to FIG. 14.

Figure 16:
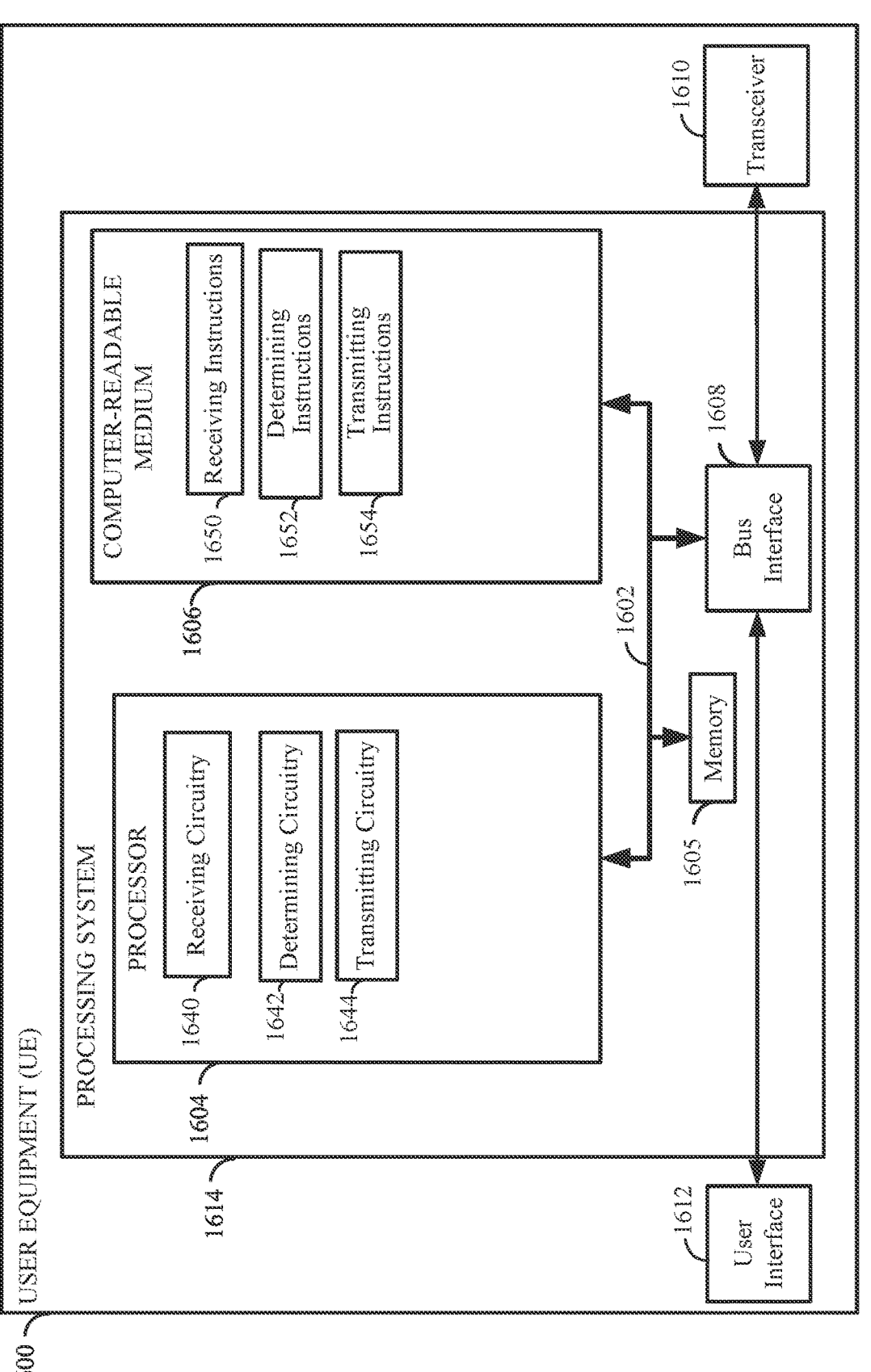
FIG. 16 is a block diagram conceptually illustrating an example of a hardware implementation for a user equipment (UE) according to some aspects of the disclosure.

FIG. 16 is a block diagram illustrating an example of a hardware implementation for a user equipment (UE) 1600 employing a processing system 1614 according to some aspects. For example, the UE 1600 may correspond to any of the devices or systems shown and described herein in any one or more of FIGS. 1-4, 7, 8, 10A, 10B, and 13.

In accordance with various aspects of the disclosure, an element, or any portion of an element, or any combination of elements may be implemented with a processing system 1614 that includes one or more processors 1604. The processing system 1614 may be substantially the same as the processing system 1414 illustrated in FIG. 14, including a bus interface 1608, a bus 1602, a processor 1604, and a computer-readable storage medium 1606. Furthermore, the UE 1600 may include a user interface 1612 and a transceiver 1610 substantially similar to those described above in FIG. 14. That is, the processor 1604, as utilized in the UE 1600, may be used to implement any one or more of the processes described herein.

In some aspects of the disclosure, the processor 1604 may include circuitry configured for various functions. For example, the processor 1604 may include receiving circuitry 1640 configured to receive, from a scheduling entity, an indication of at least two different cross link interference (CLI) measurement resources of a message for transmission from a transmission source. The receiving circuitry 1640 may also be configured to receive, from an intelligent reflecting surface (IRS), a reflected transmission of the message originating from the transmission source, while also receiving the message transmitted directly from the transmission source and a downlink (DL) transmission from the scheduling entity, wherein the reflected transmission of the message is reflected by the IRS based on one or more IRS coefficients. The receiving circuitry 1640 may be further configured to receive, from the IRS, another reflected transmission of the message originating from the transmission source, while also receiving the message transmitted directly from the transmission source and the DL transmission from the scheduling entity, wherein the reflected transmission of the message is reflected by the IRS using one or more configured IRS coefficients that are configured based on the one or more CLI measurement parameters. The receiving circuitry 1640 may be configured to execute receiving instructions 1650 stored in the computer-readable storage medium 1606 to implement any of the one or more of the functions described herein.

The processor 1604 may also include determining circuitry 1642 configured to determine one or more CLI measurement parameters using the at least two different CLI measurement resources of the message. The determining circuitry 1642 may further be configured to execute determining instructions 1652 stored in the computer-readable storage medium 1606 to implement any of the one or more of the functions described herein.

The processor 1604 may further include transmitting circuitry 1644 configured to transmit, to the scheduling entity, a CLI measurement report indicating the one or more CLI measurements parameters from the at least two different CLI measurement resources. The transmitting circuitry 1644 may be configured to execute transmitting instructions 1654 stored in the computer-readable storage medium 1606 to implement any of the one or more of the functions described herein.

FIG. 17 is a flow chart of a method 1700 for CLI mitigation according to some aspects. As described below, some or all illustrated features may be omitted in a particular implementation within the scope of the present disclosure, and some illustrated features may not be required for implementation of all aspects. In some examples, the method may be performed by the UE 1600, as described herein, and illustrated in FIG. 16, by a processor or processing system, or by any suitable means for carrying out the described functions.

At block 1702, the UE 1600 may receive, from a scheduling entity, an indication of at least two different cross link interference (CLI) measurement resources of a message for transmission from a transmission source. In some aspects, the indication may be included in configuration information provided by the scheduling entity in a downlink (DL) transmission to the UE 1600. For example, the scheduling entity may configure one or more CLI measurement resources for evaluating one or more different IRS coefficients and/or phases of the IRS. In some aspects, at least one CLI measurement resource may be an SRS. In at least this case, the at least one CLI measurement resource may be used to determine one or more CLI measurement parameters such as a CQI metric (e.g., an RSRP metric). In some aspects, the CLI measurement resource may be from a message that may be an uplink (UL) signal from the transmission source. In at least this case, the at least one CLI measurement resource may be used to determine one or more CLI measurement parameters such as a received signal strength metric (e.g., an RSSI metric). Based on the RSSI from different CLI measurement resources as reported by the UE 802, the scheduling entity may be able to select one or more IRS coefficients for reflection of a message from the transmission source to mitigate CLI.

In some aspects, when the one or more CLI measurement parameters includes an RSSI metric, different resource locations (e.g., time and/or frequency) may be with different configurations of IRS coefficients. In some aspects, the scheduling entity may configure one or more CLI measurement resources and one or more IRS patterns. For example, the UE 1600 may use both the CLI measurement resources and the one or more IRS patterns for generating a measurement report. Each one or more CLI measurement parameters determined according to a particular IRS pattern may be filtered and reported while being correlated to a same IRS coefficient. In some aspects, the scheduling entity (e.g., a network associated with the scheduling entity) may configure both the one or more CLI measurement resources and the related IRS patterns. In some aspects, the one or more IRS patterns are indicated for different occasions of a CLI measurement resource. For example, the UE 1600 may use one CLI measurement resource for measurement with one IRS pattern for evaluating different IRS coefficients. In some aspects, an IRS pattern identification (ID) may be used by the UE 1600 and the scheduling entity to identify a corresponding IRS pattern for applying an IRS coefficient.

In some aspects, a pattern of multiple IRS coefficients may be defined for one CLI measurement resource. For example, for a single CLI measurement resource, a time domain multiplex pattern of IRS coefficients may be included as a CLI-IRS resource configuration. In some aspects, the CLI-IRS resource configuration may be an extension of an existing 3GPP CLI measurement resource configuration with additional IRS pattern configuration included therewith. In some aspects, the IRS pattern configuration may include information such as a priority of the repetition of different IRS coefficients, a number of different IRS coefficients, an offset of the first occasion of the CLI measurement resource for each IRS coefficient, and/or the like. In some aspects, the UE 1600 may reset the level 3 filter at the first occasion of a CLI measurement resource for each IRS coefficient to avoid a mixing and/or confusion of CLI measurement resources with different IRS coefficients in a same CLI measurement resource measurement.

In some aspects, a scheduling entity may configure four (4) different IRS coefficient sequentially. In this case, every four consecutive occasions of a same CLI measurement resource may correspond with one IRS coefficient (e.g., over 80 ms worth of time for each IRS coefficient and an overall period of 320 ms). In some aspects, the UE 1600 may reset the level 3 filter at the beginning of each set of four consecutive occasions of the same CLI measurement resources for the new IRS coefficient. In some aspects, the CLI measurement may be filtered on a per CLI measurement resource basis. In some aspect, the UE 1600 may utilize multiple filterings for evaluating different IRS coefficients using a same CLI measurement resource.

In some aspects, an IRS coefficient pattern identification (ID) may be used to describe a pattern of CLI instances for which measurements are collected and applied to a same filter and, thus, subject to a same IRS coefficient. The IRS coefficient pattern ID may be separately defined in the indication as an IRS pattern outside a CLI resource configuration described herein. For example, within a CLI resource configuration, an IRS pattern ID may be included to associate the IRS pattern with different occasions (e.g., instances) of a single CLI measurement resource. It should be understood that there may be multiple CLI resources from multiple aggressor UEs reflected by a same IRS coefficient.

In some aspects, the IRS coefficient pattern ID may be included in a new CLI resource configuration that includes an IRS pattern directly for measurement, filtering, and reporting. In this case, one CLI measurement resource may be used, an IRS pattern ID may be indexed to one IRS coefficient pattern, and the scheduling entity (e.g., the network) may indicate a paring of the CLI measurement resource with an IRS pattern (e.g., use of an IRS coefficient). For example, an indication may include a new CLI resource configuration having a CLI resource configuration and an IRS coefficient pattern ID correlating to an IRS pattern configuration.

In some aspects, separate CLI measurement resources may be paired with different IRS coefficient patterns. For example, the scheduling entity (e.g., the network) may configure different CLI measurement resources for the UE 1600. These CLI measurement resources may correspond to a same CLI from the same transmission source (e.g., a same aggressor UE), but may be modified with different IRS coefficients. In this case, a current CLI measurement resource configuration may only support a simple periodic pattern. Additionally, or alternatively, the scheduling entity may extend the CLI patterns allowing the UE 1600 to run filters on join CLI-IRS measurement parameters. For example, one CLI measurement resource occasion may be associated with one slot every predetermined number (N) of slots. In some example, the scheduling entity may not support one cluster of a predetermine cluster of a predetermined number (M) of consecutive CLI measurement resource occasions in the predetermined number of slots (M) every predetermine number (N) of slots. This time domain pattern may be included in the indication, for example, to avoid a scenario where an IRS changes an IRS coefficient frequently creating addition overhead.

The receiving circuitry 1640 together with the transceiver 1610, shown and described above in connection with FIG. 16 may provide a means to receive, from a scheduling entity, an indication of at least two different cross link interference (CLI) measurement resources of a message for transmission from a transmission source.

At block 1704, the UE 1600 may receive, from an intelligent reflecting surface (IRS), a reflected transmission of the message originating from the transmission source, while also receiving the message transmitted directly from the transmission source and a downlink (DL) transmission from the scheduling entity, where the reflected transmission of the message is reflected by the IRS based on one or more IRS coefficients. The receiving circuitry 1640 together with the transceiver 1610, shown and described above in connection with FIG. 16 may provide a means to receive, from an intelligent reflecting surface (IRS), a reflected transmission of the message originating from the transmission source, while also receiving the message transmitted directly from the transmission source and a downlink (DL) transmission from the scheduling entity, where the reflected transmission of the message is reflected by the IRS based on one or more IRS coefficients.

At block 1706, the UE 1600 may determine one or more CLI measurement parameters using the at least two different CLI measurement resources of the message. For example, after the UE 1600 receives the at least two different CLI measurement resources of the message, the UE 1600 may determine one or more CLI measurements parameters of the message. The one or more CLI measurement parameters may include at least one of sound reference signal (SRS), a reference signal received power (RSRP), or a received signal strength indicator (RSSI). The determining circuitry 1642, shown and described above in connection with FIG. 16 may provide a means to determine one or more CLI measurement parameters using the at least two different CLI measurement resources of the message.

At block 1708, the UE 1600 may transmit, to the scheduling entity, a CLI measurement report indicating the one or more CLI measurements parameters from the at least two different CLI measurement resources. For example, after determining the one or more CLI measurement parameters, the UE 1600 may transmit a measurement report to the scheduling entity so that the scheduling entity and/or a network associated with the scheduling entity may determine one or more IRS coefficients (e.g., correlating with one or more optimal CLI measurement parameters of one or more CLI measurement resources) for reconfiguring one or more reconfigurable elements of the IRS. In some aspects, the CLI measurement report may include multiple occasions.

In some aspects, the CLI measurement report may include each measurement parameter from each CLI measurement resource, occasions, and/or resource index. In some aspects, the CLI measurement report may transmitted in response to a trigger. For example, the scheduling entity may determine one or more thresholds for triggering a transmission of a CLI measurement report. In some aspects, the threshold may be a high threshold signal strength or a low threshold signal strength. If a maximum signal strength is above a high threshold signal strength, this may be an indication that the corresponding coefficient should be avoided for usage by the IRS. If a minimum signal strength is below a low threshold signal strength, this may be an indication that the corresponding coefficient should be utilized by the IRS. In some aspects, the UE 1600 may only report a resource index rather than a CLI measurement parameter. For example, the UE 1600 may report for the scheduling entity the CLI resource index (or occasion index) with the minimum value or the maximum value. As another example, the UE 1600 may report for the scheduling entity the CLI resource index (or occasion index) with values larger than a threshold or values smaller than a threshold. In some aspects, the UE 1600 may report CLI measurement parameters. For example, the UE 1600 may report for the scheduling entity a corresponding RSSI or RSRP (or others) based on a CLI measurement resource type.

Upon receiving the CLI measurement report from the UE 1600, the scheduling entity may determine which CLI measurement parameters are optimal for mitigating CLI caused by a transmission from a transmission source (e.g., an aggressor UE). Based on determining which CLI measurement parameter are optimal for mitigating CLI caused by a transmission from a transmission source, the scheduling entity may determine one or more IRS coefficients that are correlated with the optimal CLI measurement parameters included in the CLI measurement report.

The transmitting circuitry 1644 together with the transceiver 1610, shown and described above in connection with FIG. 16 may provide a means to transmit, to the scheduling entity, a CLI measurement report indicating the one or more CLI measurements parameters from the at least two different CLI measurement resources.

At block 1710, the UE 1600 may receive, from the IRS, another reflected transmission of the message originating from the transmission source, while also receiving the message transmitted directly from the transmission source and the DL transmission from the scheduling entity, where the reflected transmission of the message is reflected by the IRS using one or more configured IRS coefficients that are configured based on the one or more CLI measurement parameters. For example, the scheduling entity may direct the IRS to reflect another transmission of the message according to the one or more configured IRS coefficients. The scheduling entity 804 may also transmit another DL transmission to the UE 1600 and the IRS may reflect another transmission of the message from the transmission source according to the one or more configured IRS coefficients. The UE 1600 may receive the other reflected transmission of the message originating from the transmission source, while also receiving the message transmitted directly from the transmission source and the DL transmission.

When the scheduling entity transmits the DL transmission to the UE 1600 while the transmission source transmits the message to the IRS and directly to the UE 1600, the IRS may use the configured IRS coefficients to reflect the reflected transmission towards the UE 1600 to cause a higher of level of CLI mitigation between the DL transmission and the transmission from the transmission source so that the UE 1600 is able to receive the DL transmission from the scheduling entity. In some aspects, the IRS may be used to increase the reception power of the message transmitted in the direct transmission from the transmission source to the UE 1600. For example, an obstruction may be obstructing a transmission pathway between the UE 1600 and the transmission source. As similarly described herein, the scheduling entity may determine one or more suitable configured IRS coefficients based on a CLI measurement report for increasing the reception power of the message transmitted directly to the UE 1600 from the transmission source. When the transmission source transmits the message to the IRS and to the UE 1600, the IRS may use the configured IRS coefficients to reflect the transmission of message bypassing the obstruction and increasing the reception power of the message by the UE 1600 so that the UE 1600 is able to receive the message from the transmission source even though the obstruction is in the pathways of a direct transmission from the transmission source.

The determining circuitry 1642 together with the transceiver 1610, shown and described above in connection with FIG. 16 may provide a means to receive, from the IRS, another reflected transmission of the message originating from the transmission source, while also receiving the message transmitted directly from the transmission source and the DL transmission from the scheduling entity, where the reflected transmission of the message is reflected by the IRS using one or more configured IRS coefficients that are configured based on the one or more CLI measurement parameters.

In one configuration, the UE 1600 includes means for performing the various functions and processes described in relation to FIG. 17. In one aspect, the aforementioned means may be the processor 1604 shown in FIG. 16 configured to perform the functions recited by the aforementioned means. In another aspect, the aforementioned means may be a circuit or any apparatus configured to perform the functions recited by the aforementioned means.

Of course, in the above examples, the circuitry included in the processor 1604 is merely provided as an example, and other means for carrying out the described functions may be included within various aspects of the present disclosure, including but not limited to the instructions stored in the computer-readable storage medium 1606, or any other suitable apparatus or means described in any one of the FIGS. 1-4, 7, 8, 10A, 10B, and 13 and utilizing, for example, the processes and/or algorithms described herein in relation to FIG. 17.

In a first aspect, a UE may receive, from a scheduling entity, an indication of at least two different cross link interference (CLI) measurement resources of a message for transmission from a transmission source, receive, from an intelligent reflecting surface (IRS), a reflected transmission of the message originating from the transmission source, while also receiving the message transmitted directly from the transmission source and a downlink (DL) transmission from the scheduling entity, wherein the reflected transmission of the message is reflected by the IRS based on one or more IRS coefficients, determine one or more CLI measurement parameters using the at least two different CLI measurement resources of the message, transmit, to the scheduling entity, a CLI measurement report indicating the one or more CLI measurements parameters from the at least two different CLI measurement resources, receive, from the IRS, another reflected transmission of the message originating from the transmission source, while also receiving the message transmitted directly from the transmission source and the DL transmission from the scheduling entity, wherein the reflected transmission of the message is reflected by the IRS based on one or more configured IRS coefficients that are configured using the one or more CLI measurement parameters.

In a second aspect, in combination with at least the first aspect, the indication further comprises one or more patterns of the one or more IRS coefficients.

In a third aspect, in combination with at least one of the second aspect, the CLI measurement report is configured based on the one or more patterns of the one or more IRS coefficients.

In a fourth aspect, in combination with at least one of the third aspect, the one or more patterns of the one or more IRS coefficients are provided using one or more IRS pattern identifications (IDs), and wherein the CLI measurement report indicates the one or more CLI measurement parameters from the at least two different CLI measurement resources according to the one or more patterns indicated by the one or more IRS pattern IDs.

In a fifth aspect, in combination with at least the second aspect, each of the at least two different CLI measurement resources is associated with at least one pattern for evaluating a plurality of different IRS coefficients.

In a sixth aspect, in combination with at least the second aspect, at least one pattern of the one or more patterns is associated with one or more different occasions of a CLI measurement resource.

In a seventh aspect, in combination with at least the second aspect, at least one pattern of the one or more patterns is indicated by at least one pattern identification (ID).

In an eighth aspect, in combination with at least the seventh aspect, the at least one pattern ID is indexed to one IRS pattern.

In a ninth aspect, in combination with at least the second aspect, at least one pattern of the one or more patterns is associated with a plurality of IRS coefficients for at least one CLI measurement resource.

In a tenth aspect, in combination with at least the ninth aspect, the at least one pattern comprises at least one of a periodicity of a repetition of different IRS coefficients, a number of different IRS coefficients, or an offset of a first instance of CLI for each IRS coefficient.

In an eleventh aspect, in combination with at least the second aspect, at least one pattern of the one or more patterns indicates a pattern of CLI instances for which measurements are collected and applied to a same filter associated with a specific IRS coefficient.

In a twelfth aspect, in combination with at least the second aspect, the one or more configured IRS coefficients comprise a plurality of the configured IRS coefficients, and wherein each of the at least two different CLI measurement resources is associated with at least one pattern of the one or more patterns for determining at least two different configured IRS coefficients of the plurality of configured IRS coefficients.

In a thirteenth aspect, in combination with at least the first aspect, before receiving, from the IRS, the other reflected transmission of the message originating from the transmission source, while also receiving the message transmitted directly from the transmission source and the DL transmission from the scheduling entity, the UE may further receive, from the scheduling entity, another indication of at least two different CLI measurement resources of the message for transmission from the transmission source for measuring one or more CLI measurement parameters.

In a fourteenth aspect, a scheduling entity may transmit, to a user equipment (UE), an indication of at least two different cross link interference (CLI) measurement resources of a message for transmission from a transmission source, transmit, to the UE, a downlink (DL) transmission, while the UE receives, from an intelligent reflecting surface (IRS), a reflected transmission of the message originating from the transmission source and the message transmitted directly from the transmission source, wherein the reflected transmission of the message is reflected by the IRS based on one or more IRS coefficients, receive, from the UE, a CLI measurement report indicating one or more measurements parameters from the at least two different CLI measurement resources of the message, and direct the IRS to reflect another reflected transmission of the message originating from the transmission source to the UE according to one or more configured IRS coefficients, while the UE also receives the message transmitted directly from the transmission source and the DL transmission from the scheduling entity, wherein the one or more configured IRS coefficients are configured based on the one or more CLI measurement parameters.

In a fifteenth aspect, in combination with at least the fourteenth aspect, the indication further comprises one or more patterns of the one or more IRS coefficients.

In a sixteenth aspect, in combination with at least the fifteenth aspect, the CLI measurement report is configured based on the one or more patterns of the one or more IRS coefficients.

In a seventeenth aspect, in combination with at least the sixteenth aspect, the one or more patterns of the one or more IRS coefficients are provided using one or more IRS pattern identifications (IDs), and wherein the CLI measurement report indicates the one or more CLI measurement parameters from the at least two different CLI measurement resources according to the one or more patterns indicated by the one or more IRS pattern IDs.

In an eighteenth aspect, in combination with at least the fifteenth aspect, each of the at least two different CLI measurement resources is associated with at least one pattern for evaluating a plurality of different IRS coefficients.

In a nineteenth aspect, in combination with at least the fifteenth aspect, at least one pattern of the one or more patterns is associated with one or more different occasions of a CLI measurement resource.

In a twentieth aspect, in combination with at least the fifteenth aspect, at least one pattern of the one or more patterns is indicated by at least one pattern identification (ID).

In a twenty-first aspect, in combination with at least the twentieth aspect, the at least one pattern ID is indexed to one IRS pattern.

In a twenty-second aspect, in combination with at least the fifteenth aspect, at least one pattern of the one or more patterns is associated with a plurality of IRS coefficients for at least one CLI measurement resource.

In a twenty-third aspect, in combination with at least the twenty-second aspect, the at least one pattern comprises at least one of a periodicity of a repetition of different IRS coefficients, a number of different IRS coefficients, or an offset of a first instance of CLI for each IRS coefficient.

In a twenty-fourth aspect, in combination with at least the fifteenth aspect, at least one pattern of the one or more patterns indicates a pattern of CLI instances for which measurements are collected and applied to a same filter associated with a specific IRS coefficient.

In a twenty-fifth aspect, in combination with at least the fifteenth aspect, the one or more configured IRS coefficients comprise a plurality of the configured IRS coefficients, and wherein each of the at least two different CLI measurement resources is associated with at least one pattern of the one or more patterns for determining at least two different configured IRS coefficients of the plurality of configured IRS coefficients.

In a twenty-sixth aspect, in combination with at least the fourteenth aspect, the one or more CLI measurements parameters of the CLI measurement report indicates at least one of a minimum CLI measurement strength or a maximum CLI measurement strength for each CLI measurement resource.

In a twenty-seventh aspect, in combination with at least the fourteenth aspect, the CLI measurement report is transmitted in response to one or more CLI measurement parameters being beyond a threshold measurement parameter.

In one configuration, a user equipment (UE) includes means for receiving, from a scheduling entity, an indication of at least two different cross link interference (CLI) measurement resources of a message for transmission from a transmission source, means for receiving, from an intelligent reflecting surface (IRS), a reflected transmission of the message originating from the transmission source, while also receiving the message transmitted directly from the transmission source and a downlink (DL) transmission from the scheduling entity, wherein the reflected transmission of the message is reflected by the IRS based on one or more IRS coefficients, means for determining one or more CLI measurement parameters using the at least two different CLI measurement resources of the message, means for transmitting, to the scheduling entity, a CLI measurement report indicating the one or more CLI measurements parameters from the at least two different CLI measurement resources, means for receiving, from the IRS, another reflected transmission of the message originating from the transmission source, while also receiving the message transmitted directly from the transmission source and the DL transmission from the scheduling entity, wherein the reflected transmission of the message is reflected by the IRS based on one or more configured IRS coefficients that are configured using the one or more CLI measurement parameters.

In one aspect, the aforementioned means for receiving, from a scheduling entity, an indication of at least two different cross link interference (CLI) measurement resources of a message for transmission from a transmission source, means for receiving, from an intelligent reflecting surface (IRS), a reflected transmission of the message originating from the transmission source, while also receiving the message transmitted directly from the transmission source and a downlink (DL) transmission from the scheduling entity, wherein the reflected transmission of the message is reflected by the IRS based on one or more IRS coefficients, means for determining one or more CLI measurement parameters using the at least two different CLI measurement resources of the message, means for transmitting, to the scheduling entity, a CLI measurement report indicating the one or more CLI measurements parameters from the at least two different CLI measurement resources, means for receiving, from the IRS, another reflected transmission of the message originating from the transmission source, while also receiving the message transmitted directly from the transmission source and the DL transmission from the scheduling entity, wherein the reflected transmission of the message is reflected by the IRS based on one or more configured IRS coefficients that are configured using the one or more CLI measurement parameters may be the processor(s) 1604 shown in FIG. 16 configured to perform the functions recited by the aforementioned means. For example, the aforementioned means for receiving, from a scheduling entity, an indication of at least two different cross link interference (CLI) measurement resources of a message for transmission from a transmission source may include the receiving circuitry 1640 and transceiver 1610 shown in FIG. 16. As another example, the aforementioned means for receiving, from an intelligent reflecting surface (IRS), a reflected transmission of the message originating from the transmission source, while also receiving the message transmitted directly from the transmission source and a downlink (DL) transmission from the scheduling entity, wherein the reflected transmission of the message is reflected by the IRS based on one or more IRS coefficients may include the receiving circuitry 1640 and transceiver 1610 shown in FIG. 16. As yet another example, the aforementioned means for determining one or more CLI measurement parameters using the at least two different CLI measurement resources of the message may include the determining circuitry 1642 shown in FIG. 16. As yet another example, the aforementioned means for transmitting, to the scheduling entity, a CLI measurement report indicating the one or more CLI measurements parameters from the at least two different CLI measurement resources may include the transmitting circuitry 1644 and transceiver 1610 shown in FIG. 16. As yet another example, the aforementioned means for receiving, from the IRS, another reflected transmission of the message originating from the transmission source, while also receiving the message transmitted directly from the transmission source and the DL transmission from the scheduling entity, wherein the reflected transmission of the message is reflected by the IRS based on one or more configured IRS coefficients that are configured using the one or more CLI measurement parameters may include the receiving circuitry 1640 together with the transceiver 1610 shown in FIG. 16. In another aspect, the aforementioned means may be a circuit or any apparatus configured to perform the functions recited by the aforementioned means.

In one configuration, a scheduling entity includes means for transmitting, to a user equipment (UE), an indication of at least two different cross link interference (CLI) measurement resources of a message for transmission from a transmission source, means for transmitting, to the UE, a downlink (DL) transmission, while the UE receives, from an intelligent reflecting surface (IRS), a reflected transmission of the message originating from the transmission source and the message transmitted directly from the transmission source, wherein the reflected transmission of the message is reflected by the IRS based on one or more IRS coefficients, means for receiving, from the UE, a CLI measurement report indicating one or more measurements parameters from the at least two different CLI measurement resources of the message, and means for directing the IRS to reflect another reflected transmission of the message originating from the transmission source to the UE according to one or more configured IRS coefficients, while the UE also receives the message transmitted directly from the transmission source and the DL transmission from the scheduling entity, wherein the one or more configured IRS coefficients are configured based on the one or more CLI measurement parameters.

In one aspect, the aforementioned means for transmitting, to a user equipment (UE), an indication of at least two different cross link interference (CLI) measurement resources of a message for transmission from a transmission source, means for transmitting, to the UE, a downlink (DL) transmission, while the UE receives, from an intelligent reflecting surface (IRS), a reflected transmission of the message originating from the transmission source and the message transmitted directly from the transmission source, wherein the reflected transmission of the message is reflected by the IRS based on one or more IRS coefficients, means for receiving, from the UE, a CLI measurement report indicating one or more measurements parameters from the at least two different CLI measurement resources of the message, and means for directing the IRS to reflect another reflected transmission of the message originating from the transmission source to the UE according to one or more configured IRS coefficients, while the UE also receives the message transmitted directly from the transmission source and the DL transmission from the scheduling entity, wherein the one or more configured IRS coefficients are configured based on the one or more CLI measurement parameters may be the processor(s) 1404 shown in FIG. 14 configured to perform the functions recited by the aforementioned means. For example, the aforementioned means for transmitting, to a user equipment (UE), an indication of at least two different cross link interference (CLI) measurement resources of a message for transmission from a transmission source may include the transmitting circuitry 1440 and transceiver 1410 shown in FIG. 14. As another example, the aforementioned means for transmitting, to the UE, a downlink (DL) transmission, while the UE receives, from an intelligent reflecting surface (IRS), a reflected transmission of the message originating from the transmission source and the message transmitted directly from the transmission source, wherein the reflected transmission of the message is reflected by the IRS based on one or more IRS coefficients, may include the transmitting circuitry 1440 and the transceiver 1410 shown in FIG. 14. As yet another example, the aforementioned means for receiving, from the UE, a CLI measurement report indicating one or more measurements parameters from the at least two different CLI measurement resources of the message may include the receiving circuitry 1442 and the transceiver 1410 shown in FIG. 14. As yet another example, the aforementioned means for directing the IRS to reflect another reflected transmission of the message originating from the transmission source to the UE according to one or more configured IRS coefficients, while the UE also receives the message transmitted directly from the transmission source and the DL transmission from the scheduling entity, wherein the one or more configured IRS coefficients are configured based on the one or more CLI measurement parameters may include the directing circuitry 1446 and the transceiver 1410 shown in FIG. 14. In another aspect, the aforementioned means may be a circuit or any apparatus configured to perform the functions recited by the aforementioned means.

Several aspects of a wireless communication network have been presented with reference to an exemplary implementation. As those skilled in the art will readily appreciate, various aspects described throughout this disclosure may be extended to other telecommunication systems, network architectures and communication standards.

By way of example, various aspects may be implemented within other systems defined by 3GPP, such as Long-Term Evolution (LTE), the Evolved Packet System (EPS), the Universal Mobile Telecommunication System (UMTS), and/or the Global System for Mobile (GSM). Various aspects may also be extended to systems defined by the 3rd Generation Partnership Project 2 (3GPP2), such as CDMA2000 and/or Evolution-Data Optimized (EV-DO). Other examples may be implemented within systems employing IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

Within the present disclosure, the word "exemplary" is used to mean "serving as an example, instance, or illustration." Any implementation or aspect described herein as "exemplary" is not necessarily to be construed as preferred or advantageous over other aspects of the disclosure. Likewise, the term "aspects" does not require that all aspects of the disclosure include the discussed feature, advantage or mode of operation. The term "coupled" is used herein to refer to the direct or indirect coupling between two objects. For example, if object A physically touches object B, and object B touches object C, then objects A and C may still be considered coupled to one another-even if they do not directly physically touch each other. For instance, a first object may be coupled to a second object even though the first object is never directly physically in contact with the second object. The terms "circuit" and "circuitry" are used broadly, and intended to include both hardware implementations of electrical devices and conductors that, when connected and configured, enable the performance of the functions described in the present disclosure, without limitation as to the type of electronic circuits, as well as software implementations of information and instructions that, when executed by a processor, enable the performance of the functions described in the present disclosure.

One or more of the components, steps, features and/or functions illustrated in FIGS. 1-9, 10A, 10B, 11, 12A, 12B, and 13-17 may be rearranged and/or combined into a single component, step, feature, or function or embodied in several components, steps, or functions. Additional elements, components, steps, and/or functions may also be added without departing from novel features disclosed herein. The apparatus, devices, and/or components illustrated in FIGS. 1-9, 10A, 10B, 11, 12A, 12B, and 13-17 may be configured to perform one or more of the methods, features, or steps described herein. The novel algorithms described herein may also be efficiently implemented in software and/or embedded in hardware.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but are to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b, and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

What is claimed is:

1. A method of wireless communication at a user equipment (UE), comprising:

receiving, from a scheduling entity, an indication of at least two different cross link interference (CLI) measurement resources of a message for transmission from a transmission source;

receiving, from an intelligent reflecting surface (IRS), a reflected transmission of the message originating from the transmission source, while also receiving the message transmitted directly from the transmission source and a downlink (DL) transmission from the scheduling entity, wherein the reflected transmission of the message is reflected by the IRS based on one or more IRS coefficients;

determining one or more CLI measurement parameters using the at least two different CLI measurement resources of the message;

transmitting, to the scheduling entity, a CLI measurement report indicating the one or more CLI measurements parameters from the at least two different CLI measurement resources; and receiving, from the IRS, another reflected transmission of the message originating from the transmission source, while also receiving the message transmitted directly from the transmission source and the DL transmission from the scheduling entity, wherein the reflected transmission of the message is reflected by the IRS based on one or more configured IRS coefficients that are configured using the one or more CLI measurement parameters.

2. The method of claim 1, wherein the indication further comprises one or more patterns of the one or more IRS coefficients.

3. The method of claim 2, wherein the CLI measurement report is configured based on the one or more patterns of the one or more IRS coefficients.

4. The method of claim 3, wherein the one or more patterns of the one or more IRS coefficients are provided using one or more IRS pattern identifications (IDs), and wherein the CLI measurement report indicates the one or more CLI measurement parameters from the at least two different CLI measurement resources according to the one or more patterns indicated by the one or more IRS pattern IDs.

5. The method of claim 2, wherein each of the at least two different CLI measurement resources is associated with at least one pattern for evaluating a plurality of different IRS coefficients.

6. The method of claim 2, wherein at least one pattern of the one or more patterns is associated with one or more different occasions of a CLI measurement resource.

7. The method of claim 2, wherein at least one pattern of the one or more patterns is indicated by at least one pattern identification (ID).

8. The method of claim 7, wherein the at least one pattern ID is indexed to one IRS pattern.

9. The method of claim 2, wherein at least one pattern of the one or more patterns is associated with a plurality of IRS coefficients for at least one CLI measurement resource.

10. The method of claim 9, wherein the at least one pattern comprises at least one of a periodicity of a repetition of different IRS coefficients, a number of different IRS coefficients, or an offset of a first instance of CLI for each IRS coefficient.

11. The method of claim 2, wherein at least one pattern of the one or more patterns indicates a pattern of CLI instances for which measurements are collected and applied to a same filter associated with a specific IRS coefficient.

12. The method of claim 2, wherein the one or more configured IRS coefficients comprise a plurality of the configured IRS coefficients, and wherein each of the at least two different CLI measurement resources is associated with at least one pattern of the one or more patterns for determining at least two different configured IRS coefficients of the plurality of configured IRS coefficients.

13. The method of claim 1, wherein before receiving, from the IRS, the other reflected transmission of the message originating from the transmission source, while also receiving the message transmitted directly from the transmission source and the DL transmission from the scheduling entity, the method further comprising:

receiving, from the scheduling entity, another indication of at least two different CLI measurement resources of the message for transmission from the transmission source for measuring one or more CLI measurement parameters.

14. The method of claim 13, wherein the other indication further comprises at least one pattern of the one or more configured IRS coefficients.

15. A user equipment (UE) for wireless communication in a wireless communication network, comprising:

a wireless transceiver;

a memory; and a processor communicatively coupled to the wireless transceiver and the memory, wherein the processor and the memory are configured to:

receive, from a scheduling entity, an indication of at least two different link interference (CLI) measurement resources of a message for cross transmission from a transmission source, receive, from an intelligent reflecting surface (IRS), a reflected transmission of the message originating from the transmission source, while also receiving the message transmitted directly from the transmission source and a downlink (DL) transmission from the scheduling entity, wherein the reflected transmission of the message is reflected by the IRS based on one or more IRS coefficients, determine one or more CLI measurement parameters using the at least two different CLI measurement resources of the message, transmit, to the scheduling entity, a CLI measurement report indicating the one or more CLI measurements parameters from the at least two different CLI measurement resources; and receive, from the IRS, another reflected transmission of the message originating from the transmission source, while also receiving the message transmitted directly from the transmission source and the DL transmission from the scheduling entity, wherein the reflected transmission of the message is reflected by the IRS based on one or more configured IRS coefficients that are configured using the one or more CLI measurement parameters.

16. A method of wireless communication at a scheduling entity, comprising:

transmitting, to a user equipment (UE), an indication of at least two different cross link interference (CLI) measurement resources of a message for transmission from a transmission source;

transmitting, to the UE, a downlink (DL) transmission, while the UE receives, from an intelligent reflecting surface (IRS), a reflected transmission of the message originating from the transmission source and the message transmitted directly from the transmission source, wherein the reflected transmission of the message is reflected by the IRS based on one or more IRS coefficients;

receiving, from the UE, a CLI measurement report indicating one or more measurements parameters from the at least two different CLI measurement resources of the message; and directing the IRS to reflect another reflected transmission of the message originating from the transmission source to the UE according to one or more configured IRS coefficients, while the UE also receives the message transmitted directly from the transmission source and the DL transmission from the scheduling entity, wherein the one or more configured IRS coefficients are configured based on the one or more CLI measurement parameters.

17. The method of claim 16, wherein the indication further comprises one or more patterns of the one or more IRS coefficients.

18. The method of claim 17, wherein the CLI measurement report is configured based on the one or more patterns of the one or more IRS coefficients.

19. The method of claim 18, wherein the one or more patterns of the one or more IRS coefficients are provided using one or more IRS pattern identifications (IDs), and wherein the CLI measurement report indicates the one or more CLI measurement parameters from the at least two different CLI measurement resources according to the one or more patterns indicated by the one or more IRS pattern IDs.

20. The method of claim 17, wherein each of the at least two different CLI measurement resources is associated with at least one pattern for evaluating a plurality of different IRS coefficients.

21. The method of claim 17, wherein at least one pattern of the one or more patterns is associated with one or more different occasions of a CLI measurement resource.

22. The method of claim 17, wherein at least one pattern of the one or more patterns is indicated by at least one pattern identification (ID).

23. The method of claim 22, wherein the at least one pattern ID is indexed to one IRS pattern.

24. The method of claim 17, wherein at least one pattern of the one or more patterns is associated with a plurality of IRS coefficients for at least one CLI measurement resource.

25. The method of claim 24, wherein the at least one pattern comprises at least one of a periodicity of a repetition of different IRS coefficients, a number of different IRS coefficients, or an offset of a first instance of CLI for each IRS coefficient.

26. The method of claim 17, wherein at least one pattern of the one or more patterns indicates a pattern of CLI instances for which measurements are collected and applied to a same filter associated with a specific IRS coefficient.

27. The method of claim 17, wherein the one or more configured IRS coefficients comprise a plurality of the configured IRS coefficients, and wherein each of the at least two different CLI measurement resources is associated with at least one pattern of the one or more patterns for determining at least two different configured IRS coefficients of the plurality of configured IRS coefficients.

28. The method of claim 16, wherein the one or more CLI measurements parameters of the CLI measurement report indicates at least one of a minimum CLI measurement strength or a maximum CLI measurement strength for each CLI measurement resource.

29. The method of claim 16, wherein the CLI measurement report is transmitted in response to one or more CLI measurement parameters being beyond a threshold measurement parameter.

30. A scheduling entity for wireless communication in a wireless communication network, comprising:

a wireless transceiver;

a memory; and a processor communicatively coupled to the wireless transceiver and the memory, wherein the processor and the memory are configured to:

transmit, to a user equipment (UE), an indication of at least two different cross link interference (CLI) measurement resources of a message for transmission from a transmission source, transmit, to the UE, a downlink (DL) transmission, while the UE receives, from an intelligent reflecting surface (IRS), a reflected transmission of the message originating from the transmission source and the message transmitted directly from the transmission source, wherein the reflected transmission of the message is reflected by the IRS based on one or more IRS coefficients, receive, from the UE, a CLI measurement report indicating one or more measurements parameters from the at least two different CLI measurement resources of the message, and direct the IRS to reflect another reflected transmission of the message originating from the transmission source to the UE according to one or more configured IRS coefficients, while the UE also receives the message transmitted directly from the transmission source and the DL transmission from the scheduling entity, wherein the one or more configured IRS coefficients are configured based on the one or more CLI measurement parameters.

* * * * *